United States Patent
Ueda et al.

(10) Patent No.: US 7,782,394 B2
(45) Date of Patent: Aug. 24, 2010

(54) DIGITAL CAMERA

(75) Inventors: Hiroshi Ueda, Osaka (JP); Kenichi Honjo, Osaka (JP); Naoto Yumiki, Osaka (JP); Toshio Makabe, Kyoto (JP); Kenji Maeda, Osaka (JP); Kaoru Mokunaka, Hyogo (JP); Kazuhiko Ishimaru, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/540,543

(22) Filed: Aug. 13, 2009

(65) Prior Publication Data

US 2009/0303374 A1 Dec. 10, 2009

Related U.S. Application Data

(63) Continuation of application No. 11/567,076, filed on Dec. 5, 2006, now Pat. No. 7,646,421.

(30) Foreign Application Priority Data

Dec. 6, 2005 (JP) .............................. 2005-351936

(51) Int. Cl.
*H04N 5/225* (2006.01)
(52) U.S. Cl. ...................................... 348/372
(58) Field of Classification Search ................. 348/372
See application file for complete search history.

(56) References Cited

U.S. PATENT DOCUMENTS 3,682,060 A 8/1972 Furuta
4,786,929 A * 11/1988 Hamada et al. ............. 396/283
4,881,799 A 11/1989 Ohno et al.
5,122,880 A 6/1992 Nagano
5,640,225 A 6/1997 Nakata
6,392,702 B1 5/2002 Arai et al.
6,453,124 B2 9/2002 Morimoto et al.
6,536,960 B2 3/2003 Kubo et al.
6,810,207 B2 10/2004 Sato et al.

(Continued)

FOREIGN PATENT DOCUMENTS

EP 1 133 167 A1 9/2001

(Continued)

OTHER PUBLICATIONS

Co-pending U.S. Appl. No. 12/557,859, filed Sep. 11, 2009.

(Continued)

*Primary Examiner*—James M Hannett

(57) ABSTRACT

A digital camera of the present invention includes a microcomputer 110 having a live view mode controlling so that image data generated by a CMOS sensor 133 or image data obtained by subjecting the image data generated by the CMOS sensor 133 to predetermined processing is displayed on a liquid crystal monitor 150 as a moving image in real time, wherein the microcomputer 110 controls so that, when the live view mode is set, the digital camera comes out of the live view mode, and setting information on the digital camera is displayed on the liquid crystal monitor 150, in accordance with the manipulation of the manipulation portion 140. Due to this configuration, in a digital camera that includes a movable mirror and is capable of displaying a subject image in a live view through an electronic viewfinder, the operability thereof can be enhanced.

3 Claims, 40 Drawing Sheets

U.S. PATENT DOCUMENTS

| | | |
|---|---|---|
| 6,882,369 B1 | 4/2005 | Ito |
| 6,888,574 B1 * | 5/2005 | Asakura .................... 348/372 |
| 6,906,744 B1 | 6/2005 | Hoshuyama et al. |
| 6,958,779 B2 | 10/2005 | Kubo |
| 6,961,089 B2 | 11/2005 | Kubo |
| 6,963,374 B2 | 11/2005 | Nakamura et al. |
| 7,006,140 B2 | 2/2006 | Shono |
| 7,129,984 B1 * | 10/2006 | Okada et al. ................ 348/372 |
| 7,218,345 B2 | 5/2007 | Hatano |
| 7,355,154 B2 | 4/2008 | Washisu |
| 7,408,586 B2 | 8/2008 | Ueda et al. |
| 7,443,425 B2 | 10/2008 | Ogawa |
| 7,463,303 B2 | 12/2008 | Ito |
| 7,483,073 B2 * | 1/2009 | Takai ......................... 348/372 |
| 7,511,757 B2 | 3/2009 | Mokunaka et al. |
| 7,542,092 B2 * | 6/2009 | Ohsawa ...................... 348/372 |
| 7,646,421 B2 | 1/2010 | Ueda et al. |
| 2001/0003466 A1 | 6/2001 | Kubo |
| 2001/0005231 A1 | 6/2001 | Kubo |
| 2001/0019362 A1 | 9/2001 | Nakamura et al. |
| 2001/0026683 A1 | 10/2001 | Morimoto et al. |
| 2001/0055488 A1 | 12/2001 | Shono |
| 2002/0081114 A1 * | 6/2002 | Aizawa et al. .............. 396/376 |
| 2002/0085100 A1 | 7/2002 | Takahashi |
| 2002/0186316 A1 | 12/2002 | Baron |
| 2003/0071907 A1 | 4/2003 | Karasaki et al. |
| 2003/0107346 A1 | 6/2003 | Bean et al. |
| 2004/0155976 A1 | 8/2004 | Suda |
| 2004/0165105 A1 * | 8/2004 | Takai ......................... 348/372 |
| 2005/0162541 A1 | 7/2005 | Ito |
| 2005/0168613 A1 | 8/2005 | Taniguchi |
| 2005/0168621 A1 | 8/2005 | Kageyama et al. |
| 2005/0185064 A1 | 8/2005 | Ogawa |
| 2005/0219406 A1 * | 10/2005 | Ohsawa ...................... 348/372 |
| 2005/0237398 A1 | 10/2005 | Fujii et al. |
| 2006/0035652 A1 | 2/2006 | Kim et al. |
| 2006/0127080 A1 | 6/2006 | Mori et al. |
| 2006/0263080 A1 | 11/2006 | Okumura |
| 2007/0153112 A1 | 7/2007 | Ueda et al. |
| 2007/0153113 A1 | 7/2007 | Ueda et al. |
| 2008/0055461 A1 | 3/2008 | Ito |
| 2008/0056699 A1 | 3/2008 | Ito |
| 2009/0310012 A1 | 12/2009 | Ueda et al. |

FOREIGN PATENT DOCUMENTS

| | | |
|---|---|---|
| EP | 1 133 169 A1 | 9/2001 |
| JP | 62-245231 A | 10/1987 |
| JP | 11-352585 A | 12/1999 |
| JP | 1999-352585 A | 12/1999 |
| JP | 2000-241873 A | 9/2000 |
| JP | 2000-308019 A | 11/2000 |
| JP | 2000-333064 A | 11/2000 |
| JP | 2001-103508 A | 4/2001 |
| JP | 2001-117542 A | 4/2001 |
| JP | 2001-136546 A | 5/2001 |
| JP | 2001-169180 A | 6/2001 |
| JP | 2001-169222 A | 6/2001 |
| JP | 2001-177761 A | 6/2001 |
| JP | 2001-186041 A | 7/2001 |
| JP | 2001-186401 A | 7/2001 |
| JP | 2001-238106 A | 8/2001 |
| JP | 2001-272593 | 10/2001 |
| JP | 2001-281530 A | 10/2001 |
| JP | 2001-339630 A | 12/2001 |
| JP | 2002-006208 A | 1/2002 |
| JP | 2002-034053 A | 1/2002 |
| JP | 2002-090823 A | 3/2002 |
| JP | 2002-112104 A | 4/2002 |
| JP | 2002-139772 A | 5/2002 |
| JP | 2002-209125 A | 7/2002 |
| JP | 2002-290823 A | 10/2002 |
| JP | 2002-290828 A | 10/2002 |
| JP | 2003-125273 A | 4/2003 |
| JP | 2003-333400 A | 11/2003 |
| JP | 2004-069922 A | 3/2004 |
| JP | 2004-117488 A | 4/2004 |
| JP | 2004-201104 A | 7/2004 |
| JP | 2004-264832 | 9/2004 |
| JP | 2004-274284 A | 9/2004 |
| JP | 2004-326002 A | 11/2004 |
| JP | 2004-336816 A | 11/2004 |
| JP | 2004-357123 A | 12/2004 |
| JP | 2004-363810 A | 12/2004 |
| JP | 2005-20199 | 1/2005 |
| JP | 2005-020397 A | 1/2005 |
| JP | 2005-024843 A | 1/2005 |
| JP | 2005-037963 A | 2/2005 |
| JP | 2005-045544 A | 2/2005 |
| JP | 2005-086283 A | 3/2005 |
| JP | 2005-221602 A | 8/2005 |
| JP | 2005-244311 A | 9/2005 |
| JP | 2005-244870 A | 9/2005 |
| JP | 2005-311764 A | 11/2005 |
| JP | 2006-203707 A | 8/2006 |
| JP | 2006-313250 A | 11/2006 |
| JP | 2006-323273 A | 11/2006 |
| JP | 2007-060131 A | 3/2007 |
| JP | 2007-142868 A | 6/2007 |
| SU | 1120400 A1 | 10/1984 |

OTHER PUBLICATIONS

Co-pending U.S. Appl. No. 12/557,905, filed Sep. 11, 2009.
Co-pending U.S. Appl. No. 12/557,966, filed Sep. 11, 2009.
Co-pending U.S. Appl. No. 12/558,012, filed Sep. 11, 2009.

* cited by examiner

DIGITAL CAMERA

This application is a continuation of U.S. application Ser. No. 11/567,076, filed Dec. 5, 2006, which application is incorporated herein by reference.

BACKGROUND OF THE INVENTION

1. Field of the Invention

The present invention relates to a digital camera. In particular, the present invention relates to a digital camera having a movable mirror, which enables a subject image to be observed through an electronic viewfinder.

2. Description of Related Art

A digital single-lens reflex camera has an electronic viewfinder and an optical viewfinder, so that a subject image formed by an image pickup optical system is switched with a movable mirror, and can be observed through the optical viewfinder. Because of this, displacement does not occur between a subject image in a recording image and a subject image displayed with the optical viewfinder, whereby an image pickup manipulation can be performed satisfactorily.

However, the digital single-lens reflex camera needs to switch the movable mirror in accordance with an operation state. This requires a user's manual manipulation, and a time therefor needs to be kept. Particularly, in a camera with a "live view mode" in which an image generated by an image pickup element is displayed on a display portion in real time, the movable mirror needs to be switched frequently in accordance with an autofocus operation, a diaphragm adjustment operation, and an image pickup operation.

A digital single-lens reflex camera with a live view mode is disclosed by, for example, Patent Document 1 (JP 2001-272593 A).

However, in the digital single-lens reflex camera disclosed by Patent Document 1, the operability involved in switching of the movable mirror is not improved sufficiently. Therefore, even if the live view mode is set to be executable, it is difficult for a user to use it, and consequently, the user captures an image while observing it with the optical viewfinder.

SUMMARY OF THE INVENTION

The object of the present invention is to provide a digital camera with operability thereof enhanced, which includes a movable mirror and is capable of displaying a subject image in a live view through an electronic viewfinder.

A first digital camera according to the present invention having a movable mirror provided so as to enter or retract with respect to an optical path of an image pickup optical system for purpose of guiding a subject image to an optical viewfinder includes: an image pickup element that captures the subject image formed by the image pickup optical system to generate image data; a setting manipulation portion that receives an instruction of a user regarding display of setting information on the digital camera; a display portion that displays the setting information on the digital camera in accordance with the manipulation of the setting manipulation portion, together with the image data generated by the image pickup element or image data obtained by subjecting the image data generated by the image pickup element to predetermined processing; and a control portion having a live view mode controlling so that the image data generated by the image pickup element or the image data obtained by subjecting the image data generated by the image pickup element to predetermined processing is displayed on the display portion as a moving image in real time, wherein when the live view mode is set, the control portion controls so that the digital camera comes out of the live view mode and the setting information on the digital camera is displayed on the display portion, in accordance with the manipulation of the setting manipulation portion.

When the setting information display screen is displayed so as to overlap the live view screen, the live view screen is difficult to see. In such a case, it is convenient to display both the screens separately so that the setting information display screen is observed by the display portion, and the live view screen is observed through the optical viewfinder. However, in such a case, both the manipulation of the setting portion and the manual switching to the optical viewfinder mode are required, which is inconvenient. In accordance with the manipulation of the setting manipulation portion, the digital camera comes out of the live view mode, and the setting information on the digital camera is displayed on the display portion, whereby the operability is enhanced.

Furthermore, a second digital camera according to the present invention having a movable mirror provided so as to enter or retract with respect to an optical path of an image pickup optical system for purpose of guiding a subject image to an optical viewfinder includes: an image pickup element that captures the subject image formed by the image pickup optical system to generate image data; a battery cover that opens/closes a battery accommodating portion accommodating a battery; a display portion that displays the generated image data or image data obtained by subjecting the generated image data to predetermined processing; and a control portion having a live view mode controlling so that the generated image data or the image data obtained by subjecting the generated image data to predetermined processing is displayed on the display portion as a moving image in real time, wherein when the battery cover is opened when the live view mode is set, the control portion controls so that the digital camera comes out of the live view mode, and the movable mirror enters the optical path of the image pickup optical system.

According to the above configuration, the digital camera is shifted to the OVF mode before the battery is pulled out, whereby the movable mirror is moved down. Therefore, even when the power supply is turned off after that, the subject image can be observed through the optical viewfinder. Furthermore, it is not necessary to switch to the OVF mode manually, which enhances the operability.

Furthermore, a third digital camera to which an interchangeable lens included in an image pickup optical system is attachable/detachable, having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; and a control portion having a live view mode controlling so that the generated image data or the image data obtained by subjecting the generated image data to predetermined processing is displayed on the display portion as a moving image in real time, wherein when the attached interchangeable lens is removed when the live view mode is set, the control portion controls so that the digital camera comes out of the live view mode, and the movable mirror enters the optical path of the image pickup optical system.

When the interchangeable lens is removed in the live view mode, the image pickup element is exposed, and dust and the like are likely to adhere to the image pickup element. Therefore, it is necessary to shift the digital camera from the live view mode to the OVF mode before removing the interchangeable lens; however, time and labor are needed for switching to the OVF mode manually. When the attached interchangeable lens is removed when the live view mode is set, the digital camera comes out of the live view mode, and the movable mirror enters the optical path of the image pickup optical system, as described above. Consequently, the movable mirror can be moved down automatically when the interchangeable lens is removed, so that the operability becomes satisfactory. Furthermore, the movable mirror can be moved down exactly even without a manipulation of moving down the movable mirror when the user removes the interchangeable lens. Therefore, dust and the like become unlikely to adhere to the movable mirror.

According to the present invention, in a digital camera that includes a movable mirror and is capable of displaying a subject image in a live view through an electronic viewfinder, the operability thereof can be enhanced.

DETAILED DESCRIPTION OF THE INVENTION

Figure 1:
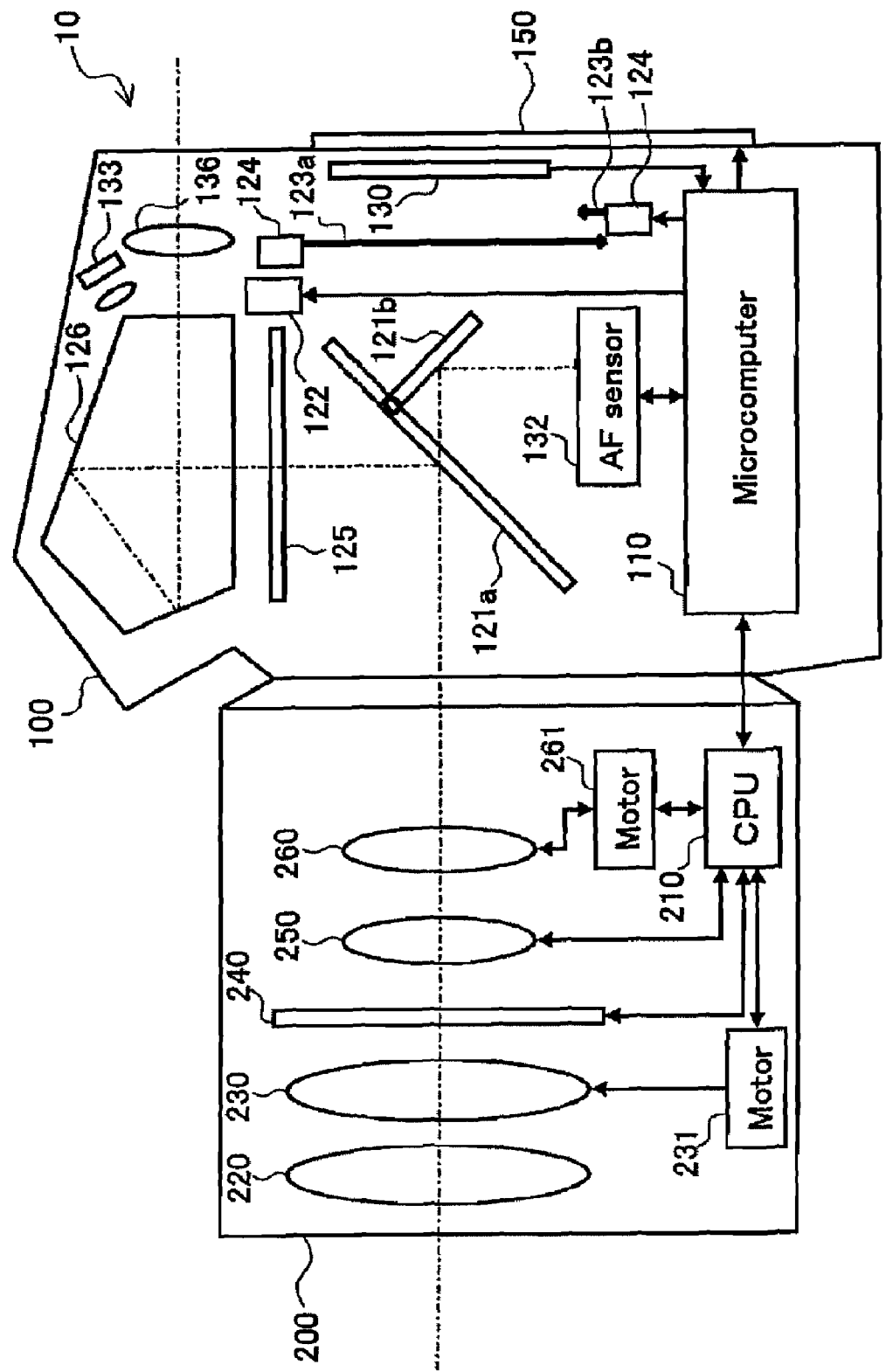
FIG. 1 is a schematic view illustrating an outline of a camera according to Embodiments 1-5.

[Contents]
1. Embodiment 1
1-1 Configuration of digital camera
    1-1-1 Outline of entire configuration
    1-1-2 Configuration of camera body
    1-1-3 Configuration of interchangeable lens
    1-1-4 State of mirror box 1-1-5 Correspondence between configuration of present embodiment and configuration of present invention
1-2 Operation of digital camera
    1-2-1 Display operation of real-time image
        1-2-1-1 Operation during use of optical viewfinder
        1-2-1-2 Operation during use of liquid crystal monitor
    1-2-2 Adjustment of diaphragm and display operation of real-time image
        1-2-2-1 Operation during use of optical viewfinder
        1-2-2-2 Operation during use of liquid crystal monitor
    1-2-3 Image pickup operation of image for recording
        1-2-3-1 Image pickup operation using manual focus
            1-2-3-1-1 Operation during use of optical viewfinder
            1-2-3-1-2 Operation during use of liquid crystal monitor
        1-2-3-2 Image pickup operation using single focus
            1-2-3-2-1 Operation during use of optical viewfinder
            1-2-3-2-2 Operation during use of liquid crystal monitor
        1-2-3-3 Image pickup operation using continuous focus
            1-2-3-3-1 Operation during use of optical viewfinder
            1-2-3-3-2 Operation during use of liquid crystal monitor
    1-2-4 Autofocus operation during shift to live view mode
    1-2-5 Display operation of distance-measuring point
    1-2-6 Dust automatic removing operation
    1-2-7 Stroboscopic image pickup operation in live view mode
        1-2-7-1 Photometric operation using only AE sensor
        1-2-7-2 Photometric operation using AE sensor and CMOS sensor
        1-2-7-3 Photometric operation using only CMOS sensor
2. Embodiment 2
    2-1 Operation during shift to live view mode by diaphragm adjustment
    2-2 Operation during shift to live view mode by remote control manipulation
    2-3 Operation during shift to live view mode by fixing tripod
    2-4 Operation during shift to live view mode by rotation of liquid crystal monitor
    2-5 Operation during shift to live view mode by connection to external terminal
    2-6 Operation during shift to live view mode by setting of aspect ratio other than 4:3
    2-7 Operation during shift to live view mode by operation of diaphragm ring
3. Embodiment 3
    3-1 Operation of canceling live view mode by menu button manipulation
    3-2 Operation of canceling live view mode in accordance with power supply turn-off manipulation
    3-3 Operation of canceling live view mode in accordance with opening of battery cover
    3-4 Operation of canceling live view based on detection of low battery
    3-5 Operation of canceling live view mode in accordance with removal of lens
    3-6 Operation of canceling live view mode in accordance with connection to external terminal
4. Embodiment 4
    4-1 Operation of shifting from continuous focus mode to single focus mode
    4-2 Operation of shifting from live view mode to OVF mode
5. Embodiment 5 Live view display of multi-screen
6. Embodiment 6 Other embodiments Embodiment 1

(1-1 Configuration of Digital Camera).

[1-1-1 Outline of Entire Configuration]

FIG. 1 is a schematic view illustrating a configuration of a camera 10. The camera 10 is composed of a camera body 100 and an interchangeable lens 200 attachable/detachable with respect to the camera body 100.

The camera body 100 captures a subject image condensed by an optical system included in the interchangeable lens 200, and records it as image data. The camera body 100 includes a mirror box 120. The mirror box 120 switches an optical path of an optical signal from the optical system included in the interchangeable lens 200 so as to allow the subject image to be incident selectively upon either a CMOS sensor 130 (complementary metal-oxide semiconductor) or an eyepiece 136. The mirror box 120 includes movable mirrors 121a, 121b, a mirror driving portion 122, a shutter 123, a shutter driving portion 124, a focusing glass 125, and a prism 126.

The movable mirror 121a is placed so as to enter/retract with respect to the optical path of an image pickup optical system so as to guide the subject image to an optical viewfinder. The movable mirror 121b is placed so as to enter/retract with respect to the optical path of the image pickup optical system together with the movable mirror 121a. The movable mirror 121b reflects a part of the optical signal input from the optical system included in the interchangeable lens 200 to allows it to be incident upon an AF sensor 132 (AF: auto focus). The AF sensor 132 is, for example, a light-receiving sensor for autofocusing of a phase difference detection system. When the AF sensor 132 is of the phase difference detection system, the AF sensor 132 detects a defocus amount of the subject image.

When the movable mirror 121a is positioned in the optical path of the image pickup optical system, a part of the optical signal input from the optical system included in the interchangeable lens 200 is incident upon the eyepiece 136 via the focusing glass 125 and the prism 126. Furthermore, the optical signal reflected by the movable mirror 121a is diffused by the focusing glass 125. Then, a part of the diffused optical signal is incident upon an AE sensor 133 (AE: automatic exposure). On the other hand, when the movable mirrors 121a and 121b are not positioned in the optical path of the image pickup optical system, the optical signal input from the optical system included in the interchangeable lens 200 is incident upon the CMOS sensor 130.

The mirror driving portion 122 includes mechanical components such as a motor and a spring. Furthermore, the mirror driving portion 122 drives the movable mirrors 121a, 121b based on the control of a microcomputer 110.

The shutter 123 can switch between the interruption and the passage of the optical signal incident via the interchangeable lens 200. The shutter driving portion 124 includes mechanical components such as a motor and a spring. Furthermore, the shutter driving portion 124 drives the shutter 123 based on the control of the microcomputer 110. The mirror driving portion 122 and the shutter driving portion 124 may use separate motors or have one motor in common.

At the back of the camera body 100, a liquid crystal monitor 150 is placed. The liquid crystal monitor 150 is capable of displaying image data generated by the CMOS sensor 130 or image data obtained by subjecting the image data generated by the CMOS sensor 130 to predetermined processing.

The optical system in the interchangeable lens 200 includes an objective lens 220, a zoom lens 230, a diaphragm 240, an image fluctuation correcting unit 250, and a focus motor 260. A CPU 210 controls the optical system. The CPU 210 is capable of transmitting/receiving a control signal and information on the optical system with respect to the microcomputer 110 on the camera body 100 side.

In the specification, a function of displaying a subject image on the liquid crystal monitor 150 in real time and a display thereof will be referred to as a "live view" or "LV". Furthermore, a control mode of the microcomputer 110 for allowing a live view operation to be performed as such will be referred to as a "live view mode" or an "LV mode". Furthermore, a function in which an optical image incident via the interchangeable lens 200 can be recognized visually through the eyepiece 136 will be referred to as a "finder view" or an "OVF". Furthermore, a control mode of the microcomputer 110 for allowing the OVF function to be operated as such will be referred to as an "OVF mode".

[1-1-2 Configuration of Camera Body]

Figure 2:
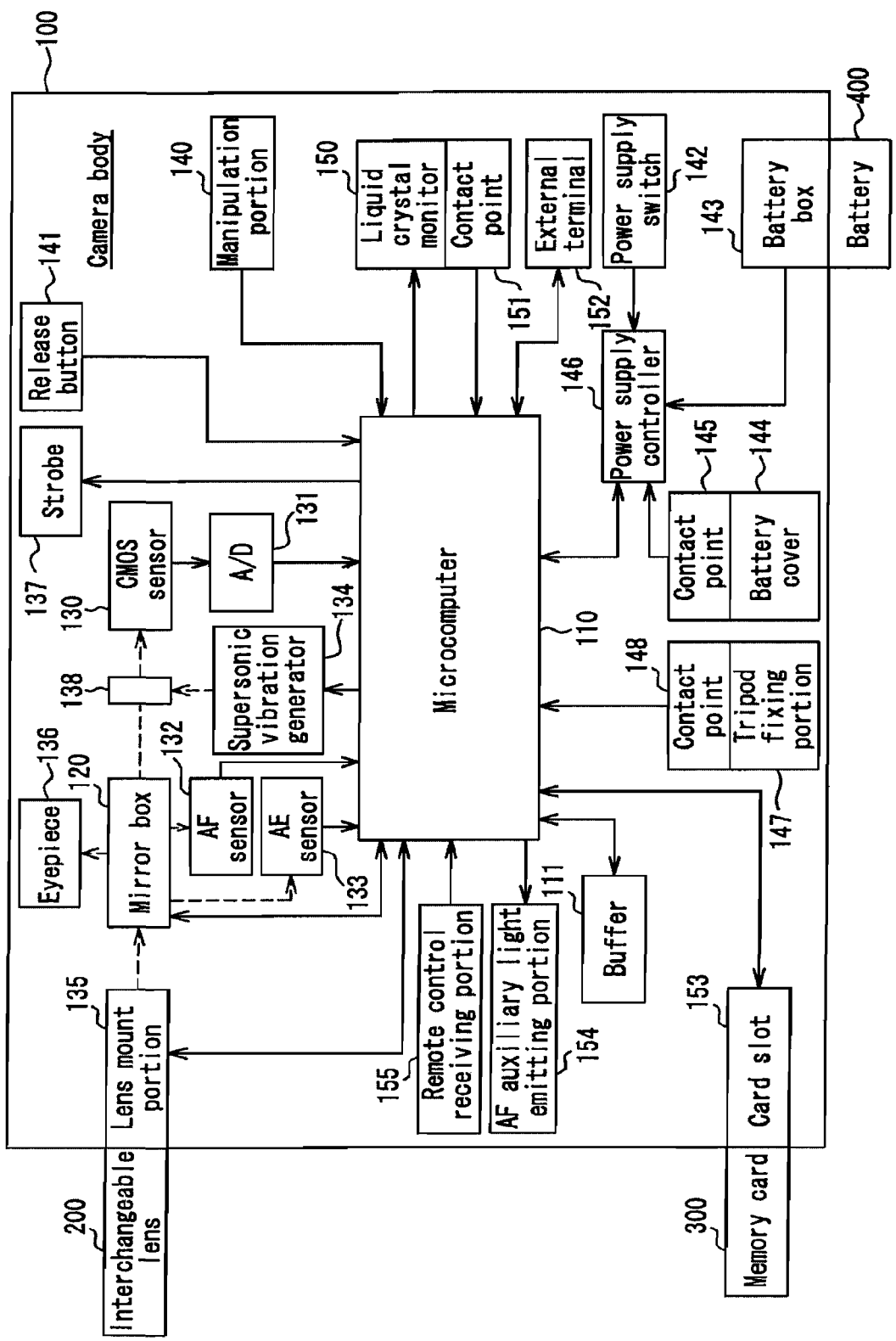
FIG. 2 is a block diagram showing a configuration of a camera body according to Embodiments 1-5.

FIG. 2 shows a configuration of the camera body 110. As shown in FIG. 2, the camera body 110 has various sites, and the microcomputer 110 controls them. In the present embodiment, a description will be made in which one microcomputer 110 controls the entire camera body 100. However, even if the present embodiment is configured so that a plurality of control portions control the camera body 100, the camera body 100 is operated similarly.

A lens mount portion 135 is a member that attaches/detaches the interchangeable lens 200. The lens mount portion 125 can be electrically connected to the interchangeable lens 200 using a connection terminal or the like, and also can be mechanically connected thereto using a mechanical member such as an engagement member. The lens mount portion 135 can output a signal from the interchangeable lens 200 to the microcomputer 110, and can output a signal from the microcomputer 110 to the interchangeable lens 200. The lens mount portion 135 has a hollow configuration. Therefore, the optical signal incident from the optical system included in the interchangeable lens 200 passes through the lens mount portion 135 to reach the mirror box 120.

The mirror box 120 guides the optical signal having passed through the lens mount portion 135 to the CMOS sensor 130, the eyepiece lens 136, the AF sensor 132, and the AE sensor 133 in accordance with the inside state. The switching of the optical signal by the mirror box will be described in "1-1-4 State of mirror box".

The CMOS sensor 130 electrically converts the optical signal incident through the mirror box 120 to generate image data. The generated image data is converted from an analog signal to a digital signal by an A/D converter 131 to be output to the microcomputer 110. The generated image data may be subjected to predetermined image processing while being output from the CMOS sensor 130 to the A/D converter 131 or while being output from the A/D converter 131 to the microcomputer 110.

The eyepiece lens 136 passes the optical signal incident through the mirror box 120. At this time, in the mirror box 120, as shown in FIG. 1, the optical signal incident from the interchangeable lens 200 is reflected by the movable mirror 121a to form a subject image on the focusing glass 125. Then, the prism 126 reflects the subject image to output it to the eyepiece 136. Consequently, a user visually can recognize the subject image from the mirror box 120. Herein, the eyepiece 136 may be composed of a single lens or a lens group including a plurality of lenses. Furthermore, the eyepiece 136 may be held on the camera body 100 in a fixed manner, or held thereon movably for the purpose of adjusting a visibility or the like. The optical viewfinder is composed of the focusing glass 125, the prism 126, and the eyepiece 136, and is configured in an optimum shape for displaying an image having a composition with an aspect ratio of 4:3. It should be noted that the optical viewfinder may be configured in an optimum shape for displaying an image having a composition with another aspect ratio. For example, the optical viewfinder may have an optimum shape for displaying an image having a composition with an aspect ratio of 16:9, or an optimum shape for displaying an image having a composition with an aspect ratio of 3:2.

A protective material 138 protects the surface of the CMOS sensor 130. By placing the protective material 138 on the front surface of the CMOS sensor 130, foreign matter such as dust can be prevented from adhering to the surface of the CMOS sensor 130. The protective material 138 can be formed of a transparent material such as glass or plastic.

An supersonic vibration generator 134 is activated in accordance with a signal from the microcomputer 110 to generate an supersonic vibration. The supersonic vibration generated in the supersonic vibration generator 134 is transmitted to the protective material 138. Because of this, the protective material 138 can vibrate to shake off foreign matter such as dust adhering to the protective material 138. The supersonic vibration generator 134 can be realized, for example, by attaching a piezoelectric element to the protective material 138. In this case, the piezoelectric element can be vibrated by supplying an AC current to the piezoelectric element attached to the protective material 138.

A strobe 137 flashes in accordance with an instruction of the microcomputer 110. The strobe 137 may be contained in the camera body 100, or may be of a type attachable/detachable with respect to the camera body 100. In the case of an attachable/detachable strobe, it is necessary to provide a strobe attachment portion such as a hot shoe on the camera body 100.

A release button 141 receives an instruction from the user regarding the activation of an autofocus operation and a photometric operation, and also receives an instruction from the user regarding the start of capturing an image for recording by the CMOS sensor 130. The release button 141 can receive halfway depression and full depression. When the release button 141 is pressed halfway by the user in an autofocus mode, the microcomputer 110 instructs the interchangeable lens 200 to perform the autofocus operation based on a signal from the AF sensor 132. Furthermore, when the release button 141 is pressed halfway by the user in an automatic exposure mode, the microcomputer 110 instructs the interchangeable lens 200 to perform the photometric operation based on a signal from the AE sensor 133. On the other hand, when the release button 141 is pressed fully by the user, the microcomputer 110 controls the mirror box 120, the CMOS sensor 130, and the like to capture the image for recording. Then, the microcomputer 110 subjects the captured image for recording to YC conversion processing, resolution conversion processing, compression processing, or the like, if required, thereby generating image data for recording. The microcomputer 110 records the generated image data for recording on a memory card 300 via a card slot 153. The release button 141 can has a function of responding to the halfway depression and a function of responding to the full depression by allowing the release button 141 to contain two switches. In this case, one of the switches is switched to an ON state by the halfway depression, and the other switch is switched to an ON state by the full depression.

Figure 3:
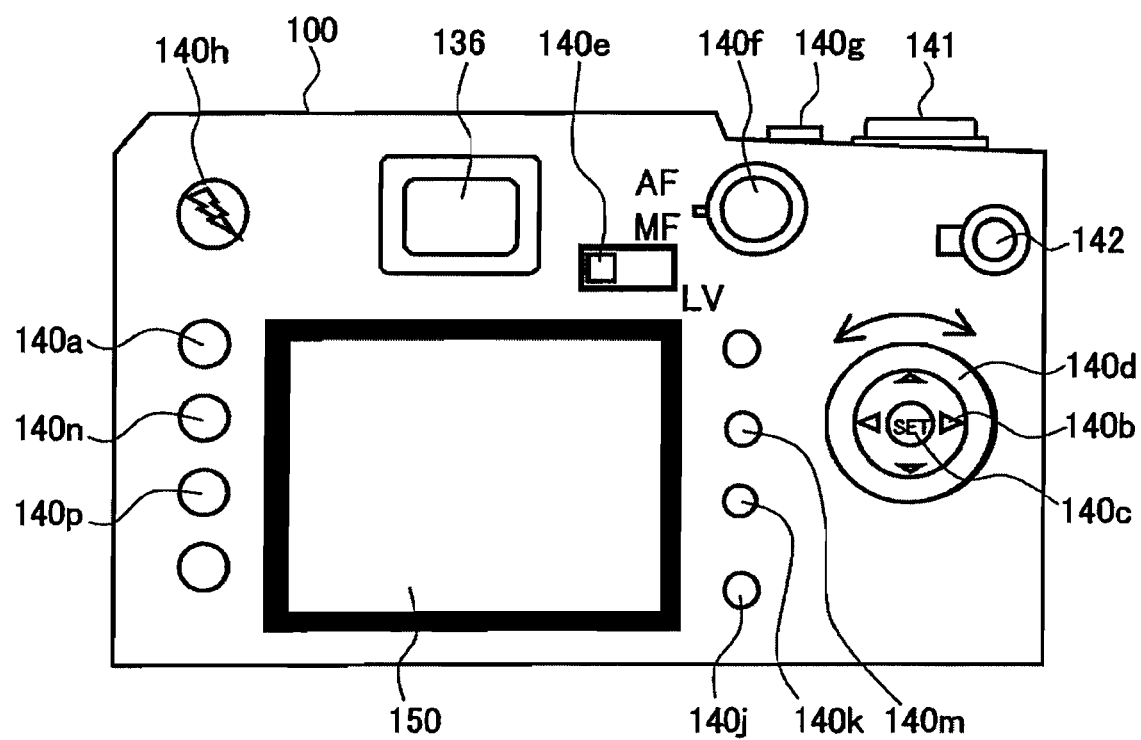
FIG. 3 is a back view of the camera body according to Embodiments 1-5.

A manipulation portion 140 can receive various instructions from the user. An instruction received by the manipulation portion 140 is transmitted to the microcomputer 110. FIG. 3 is a back view of the camera body 100. As shown in FIG. 3, the back surface of the camera body 100 includes a menu button 140*a*, a cross key 140*b*, a set button 140*c*, a rotation dial 140*d*, a viewfinder switch 140*e*, a focus mode switch 140*f*, a strobe activation button 140*h*, an LV preview button 140*j*, a stop-down button 140*k*, an AV button 140*m*, and a power supply switch 142. On the upper surface of the camera body 100, a hand shaking correction mode switch button 140*g* and the release button 141 are placed.

The menu button 140 allows the liquid crystal monitor 150 to display setting information on the camera body 10, thereby enabling the user to change the setting. The cross key 140*b* selects various settings, items, images, or the like displayed on the liquid crystal monitor 150, and for example, can move a cursor or the like. The set button 140*c* determines the selected various settings, items, images, or the like displayed on the liquid crystal monitor 150. The rotation dial 140*d* is an operation member that selects various settings, items, images, or the like displayed on the liquid crystal monitor 150 in the same way as in the cross key 140*b*, and can move a cursor or the like, for example, by rotating. The viewfinder switch 140*e* selects either guiding an optical image to the eyepiece 136 or displaying a captured electric image on the liquid crystal monitor 150. The focus mode switch 140*f* selects either setting a focus mode in a manual focus mode or setting the focus mode in an autofocus mode. The hand shaking correction mode switch 140*g* is capable of selecting whether hand shaking correction should be performed. Furthermore, the hand shaking correction mode switch 140*g* can select a control mode of hand shaking correction. The stop-down button 140*k* adjusts the diaphragm in the live view mode. The LV preview button 140*j* adjusts the diaphragm and displays a part of an image displayed on the liquid crystal monitor 150 in an enlarged state, in the live view mode. The AV button 140*m* adjusts the diaphragm in the OVF mode.

As shown in FIG. 2, the liquid crystal monitor 150 receives a signal from the microcomputer 110 and displays an image or information on various settings. The liquid crystal monitor 150 is capable of displaying image data generated by the CMOS sensor 130, or image data obtained by subjecting the image data generated in the CMOS sensor 130 to predetermined processing. The liquid crystal monitor 150 is capable of displaying the image data held in the memory card 300 after subjecting the image data to predetermined processing such as decompression processing in the microcomputer 110, if required. As shown in FIG. 3, the liquid crystal monitor 150 is placed on the back surface of the camera body 100. The liquid crystal monitor 150 is placed rotatably with respect to the camera body 100. A contact point 151 detects the rotation of the liquid crystal monitor 150. The liquid crystal monitor 150 has an optimum shape for displaying an image having a composition with an aspect ratio of 4:3. It should be noted that the liquid crystal monitor 150 is also capable of displaying an image having a composition with another aspect ratio (e.g., 3:2 or 16:9).

An external terminal 152 outputs image data and information on various settings to an external apparatus. The external terminal 152 is, for example, a USB terminal (USB: universal serial bus), a terminal for an interface pursuant to an IEEE 139 specification (IEEE: Institute of Electrical and Electronic Engineers), or the like. Furthermore, when a connection terminal from the external apparatus is connected to the external terminal 152, the microcomputer 110 is notified of the connection.

A power supply controller 146 controls the supply of power from a battery 400 contained in a battery box 143 to a member in a camera 10, such as the microcomputer 110. When the power supply switch 142 is switched on, the power supply controller 146 starts supplying the power from the battery 400 to the member in the camera 10. Furthermore, the power supply controller 146 includes a sleep function, and when the power supply switch 142 remains unoperated for a predetermined period of time keeping an ON state, the power supply switch 142 stops the supply of power (excluding partial members in the camera 10). Furthermore, the power supply controller 146 notifies the microcomputer 110 that the battery cover 144 is opened, based on a signal from the contact point 145 that monitors the opening/closing of the battery cover 144. The battery cover 144 is a member that opens/closes an opening of the battery box 143. In FIG. 2, the power supply controller 146 is configured so as to supply power to each member in the camera 10 through the microcomputer 110. However, even if the power supply controller 146 is configured so as to supply power directly from the power supply controller 146, the camera 10 is operated similarly.

A tripod fixing portion 147 is a member that fixes a tripod (not shown) to the camera body 100, and is composed of a screw or the like.

The contact point 148 monitors whether or not the tripod is fixed to the tripod fixing portion 147, and notifies the microcomputer 110 of the result. The contact point 148 can be composed of a switch or the like.

The card slot 153 is a connector for accepting the memory card 300. The card slot 153 may be not only configured so as to include a mechanical portion for placing the memory card 300, but also be configured so as to include a control portion and/or software for controlling the memory card 300.

A buffer 111 is a memory used when signal processing is performed in the microcomputer 110. Although a signal stored temporarily in the buffer 111 mainly is image data, a control signal and the like may be stored in the buffer 111. The buffer 111 may be means capable of storing, such as a DRAM (dynamic random access memory), an SRAM (static random access memory), a flash memory, or a ferroelectric memory. The buffer 11 also may be a memory specialized in storage.

An AF auxiliary light emitting portion 154 is a member that emits auxiliary light when an autofocus operation is performed in a dark photographing place. The AF auxiliary light emitting portion 154 emits light based on the control of the microcomputer 110. The AF auxiliary light emitting portion 154 includes a red LED (light-emitting diode) and the like.

A remote control receiving portion 155 receives a signal from a remote controller (not shown) and transmits the received signal to the microcomputer 110. The remote control receiving portion 155 typically includes a photodetector that receives infrared light from the remote controller.

[1-1-3 Configuration of Interchangeable Lens]

Figure 4:
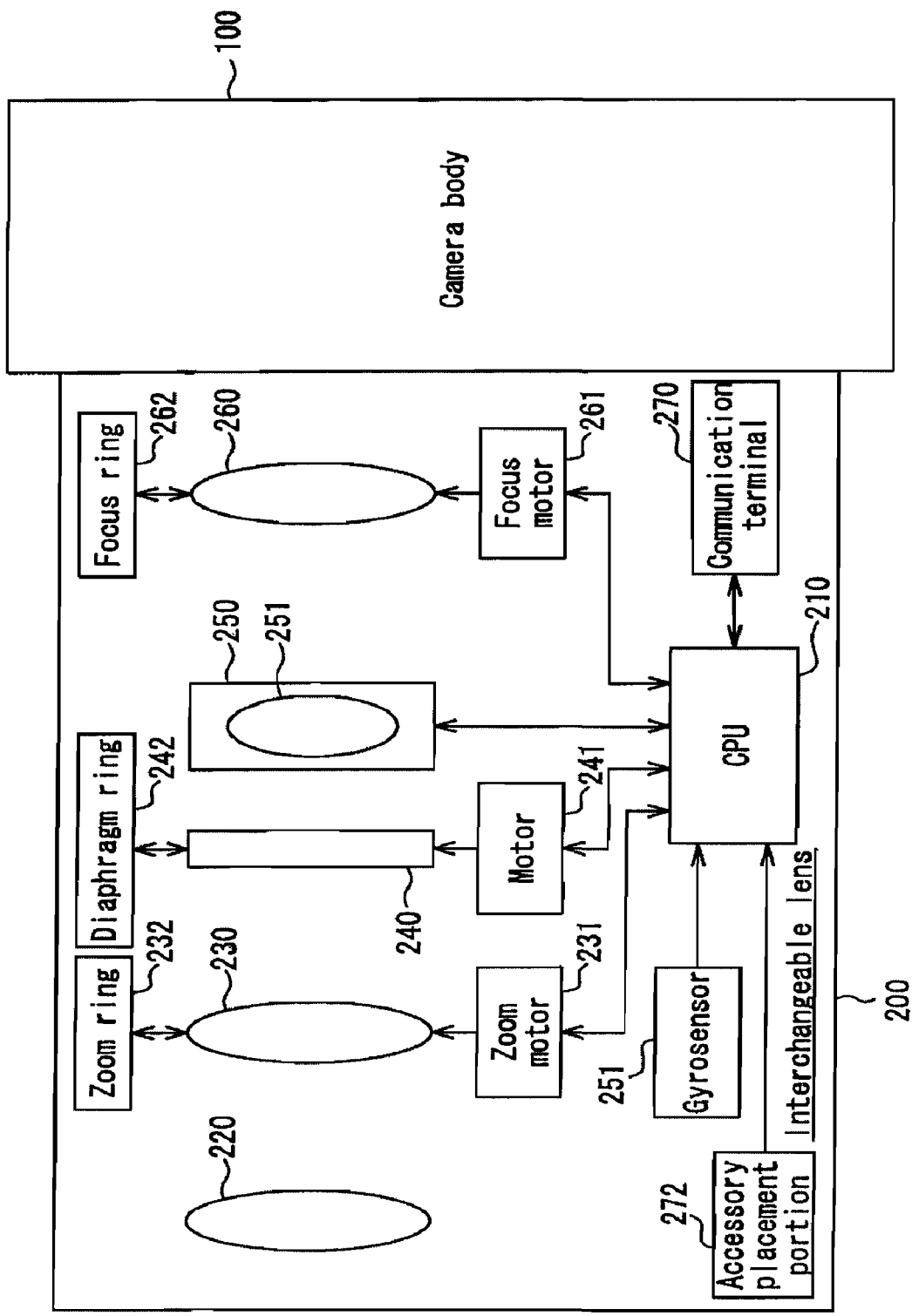
FIG. 4 is a block diagram showing a configuration of an interchangeable lens according to Embodiments 1-5.

FIG. 4 is a block diagram showing a configuration of the interchangeable lens 200.

As shown in FIG. 4, the interchangeable lens 200 includes an image pickup optical system. Furthermore, the image pickup optical system and the like of the interchangeable lens 200 are controlled by the CPU 210.

The CPU 210 controls the operations of actuators such as a zoom motor 231, a diaphragm motor 241, the hand shaking correction unit 250, and a focus motor 261, thereby controlling the image pickup optical system. The CPU 210 sends information representing the states of the image pickup optical system, an accessory placement portion 272, and the like to the camera body 100 via a communication terminal 270.

Furthermore, the CPU 210 receives a control signal or the like from the camera body 100, and controls the image pickup optical system and the like based on the received control signal or the like.

The objective lens 220 is placed closest to the subject side. The objective lens 220 may be movable in an optical axis direction or may be fixed.

The zoom lens 230 is placed on the image surface side from the objective lens 220. The zoom lens 230 is movable in the optical axis direction. By moving the zoom lens 230, the magnification of the subject image can be varied. The zoom lens 230 is driven with the zoom motor 231. The zoom motor 231 may be any motor such as a stepping motor or a servo motor, as long as it drives at least the zoom lens 230. The CPU 210 monitors the state of the zoom motor 231 or the state of another member to monitor the position of the zoom lens 230.

The diaphragm 240 is placed on the image surface side from the zoom lens 231. The diaphragm 240 has an aperture with the optical axis at the center. The size of the aperture can be changed by the diaphragm motor 241 and a diaphragm ring 242. The diaphragm motor 241 is synchronized with a mechanism that changes the aperture size of the diaphragm to drive the mechanism, thereby changing the aperture size of the diaphragm. The diaphragm ring 242 also is synchronized with a mechanism that changes the aperture size of the diaphragm to drive the mechanism, thereby changing the aperture size of the diaphragm. An electrical control signal is given to the microcomputer 110 or the CPU 210 by the user, and the diaphragm motor 241 is driven based on the control signal. In contrast, the diaphragm ring 242 receives a mechanical manipulation from the user, and transmits this manipulation to the diaphragm 240. Furthermore, whether or not the diaphragm ring 242 has been operated can be detected by the CPU 210.

The hand shaking correction unit 250 is placed on the image surface side from the diaphragm 240. The hand shaking correction unit 250 includes a correction lens 251 that corrects hand shaking and an actuator that drives the correction lens 251. The actuator included in the hand shaking correction unit 250 can move the correction lens 251 in a plane orthogonal to an optical axis. A gyrosensor 252 measures an angular speed of the interchangeable lens 200. For convenience, in FIG. 4, although the gyrosensor 252 is shown with one block, the interchangeable lens 200 includes two gyrosensors 252. One of the two gyrosensors measures an angular speed with a vertical axis of the camera 10 being the center. Furthermore, the other gyrosensor measures an angular speed with a horizontal axis of the camera 10 perpendicular to the optical axis being the center. The CPU 210 measures a hand shaking direction and a hand shaking amount of the interchangeable lens 200 based on the angular speed information from the gyrosensor 252. The CPU 210 controls an actuator so as to move the correction lens 251 in a direction of canceling a hand shaking amount. Because of this, the subject image formed with the image pickup optical system of the interchangeable lens 200 becomes a subject image with hand shaking corrected.

The focus lens 260 is placed closest to the image surface side. The focus motor 261 drives the focus lens 260 in the optical axis direction. This can adjust the focus of the subject image.

The accessory placement portion 272 is a member that places an accessory such as a light-shielding hood at a tip end of the interchangeable lens 200. The accessory placement portion 272 is composed of mechanical members such as a screw and a bayonet. Furthermore, the accessory placement portion 272 includes a detector that detects whether or not an accessory has been placed. When the accessory is placed, the accessory placement portion 272 notifies the CPU 210 of the placement of the accessory.

[1-1-4 State of Mirror Box]

The state in the mirror box 120 in each operation state will be described with reference to FIGS. 1, 5, and 6.

FIG. 1 is a schematic view showing the state in the mirror box 120 in a mode of observing a subject image using the optical viewfinder. In the present specification, for convenience, this state will be referred to as a "state A". In the state A, the movable mirrors 121a, 121b are positioned in the optical path of the optical signal incident from the interchangeable lens 200. Therefore, a part of the optical signal from the interchangeable lens 200 is reflected by the movable mirror 121a, and the remaining part thereof is transmitted through the movable mirror 121a. The reflected optical signal passes through the focusing glass 125, the prism 126, and the eyepiece 136 to reach the user's eye. Furthermore, the optical signal reflected by the movable mirror 121a is reflected by the focusing glass 125, and a part of the reflected optical signal is incident upon the AE sensor 133. On the other hand, a part of the optical signal transmitted through the movable mirror 121a is reflected by the movable mirror 121b to reach the AF sensor 132. Furthermore, in the state A, a first shutter 123a is closed. Therefore, the optical signal from the interchangeable lens 200 does not reach the CMOS sensor 130. Thus, in the state A, the observation of the subject image using the optical viewfinder, the autofocus operation using the AF sensor 132, and the photometric operation using the AE sensor 133 can be performed. However, the observation of the subject image using the liquid crystal monitor 150, the recording of the image data generated by the CMOS sensor 130, and the autofocus operation using the contrast of the image data generated by the CMOS sensor 130 cannot be performed.

Figure 5:
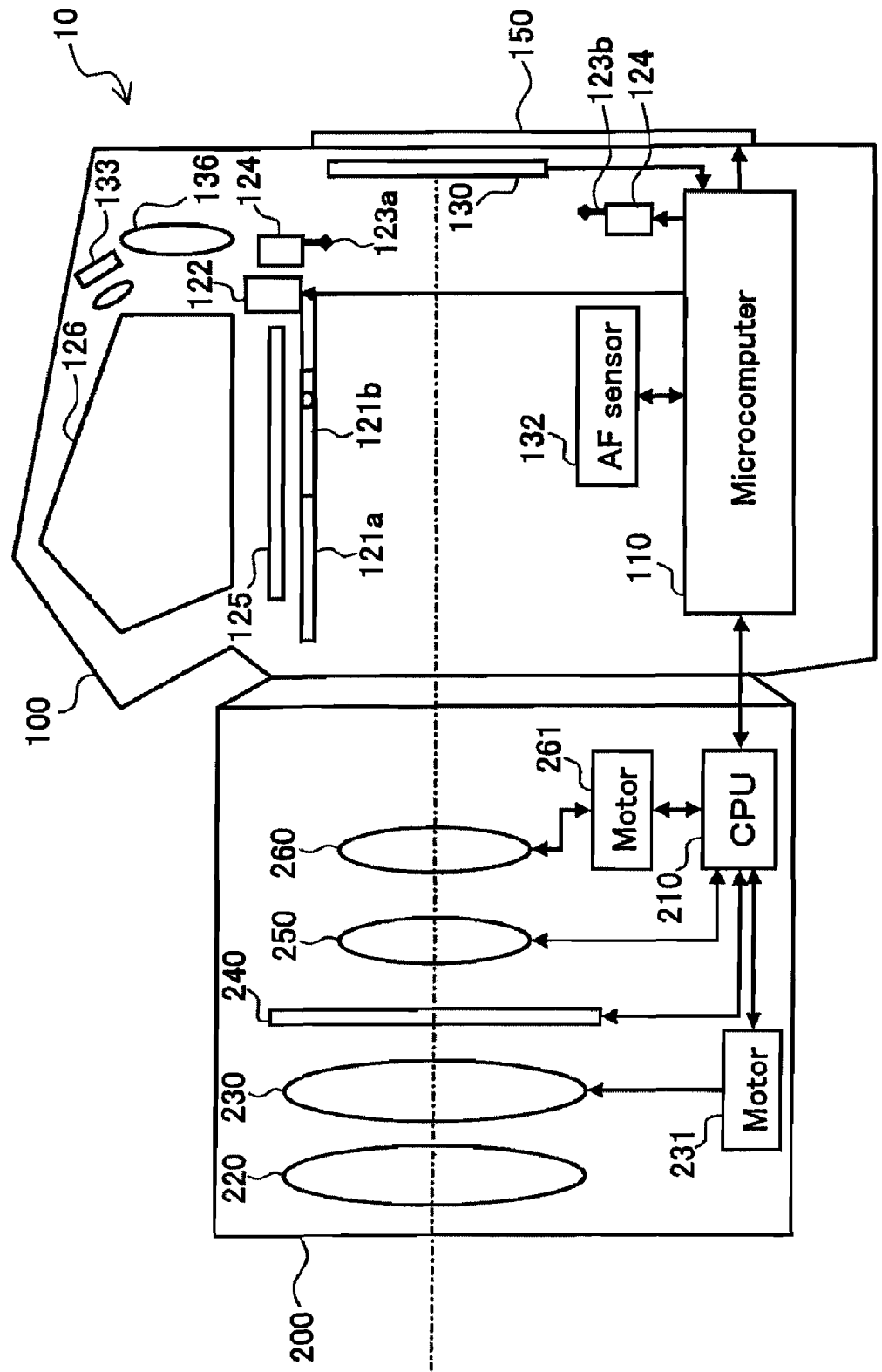
FIG. 5 is a schematic view when the inside of a mirror box of the camera according to Embodiments 1-5 is in a state B.

FIG. 5 is a schematic view showing the state in the mirror box 120 in a mode in which the subject image is input to the CMOS sensor 130. In the specification, for convenience, this state will be referred to as a "state B". In the state B, the movable mirrors 121a, 121b are not positioned in the optical path of the optical signal incident from the interchangeable lens 200. Therefore, the optical signal from the interchangeable lens 200 does not pass through the focusing glass 125, the prism 126, and the eyepiece 136 to reach the user's eye, and does not reach the AF sensor 132 and the AE sensor 133, either. Furthermore, in the state B, the first shutter 123a and the second shutter 123b are opened. Therefore, the optical signal from the interchangeable lens 200 reaches the CMOS sensor 130. Thus, in the state B, contrary to the state A, the observation of the subject image using the liquid crystal monitor 150, the recording of the image data generated by the CMOS sensor 130, and the autofocus operation using the contrast of the image data generated by the CMOS sensor 130 can be performed. However, the observation of the subject image using the optical viewfinder, the autofocus operation using the AF sensor 132, and the photometric operation using the AE sensor 133 cannot be performed. The movable mirrors 121a, 121b, and the first shutter 123a are biased in a direction in which the state A is shifted to the state B by biasing means such as a spring. Therefore, the state A can be shifted to the state B instantaneously, which is preferable for starting exposure.

Figure 6:
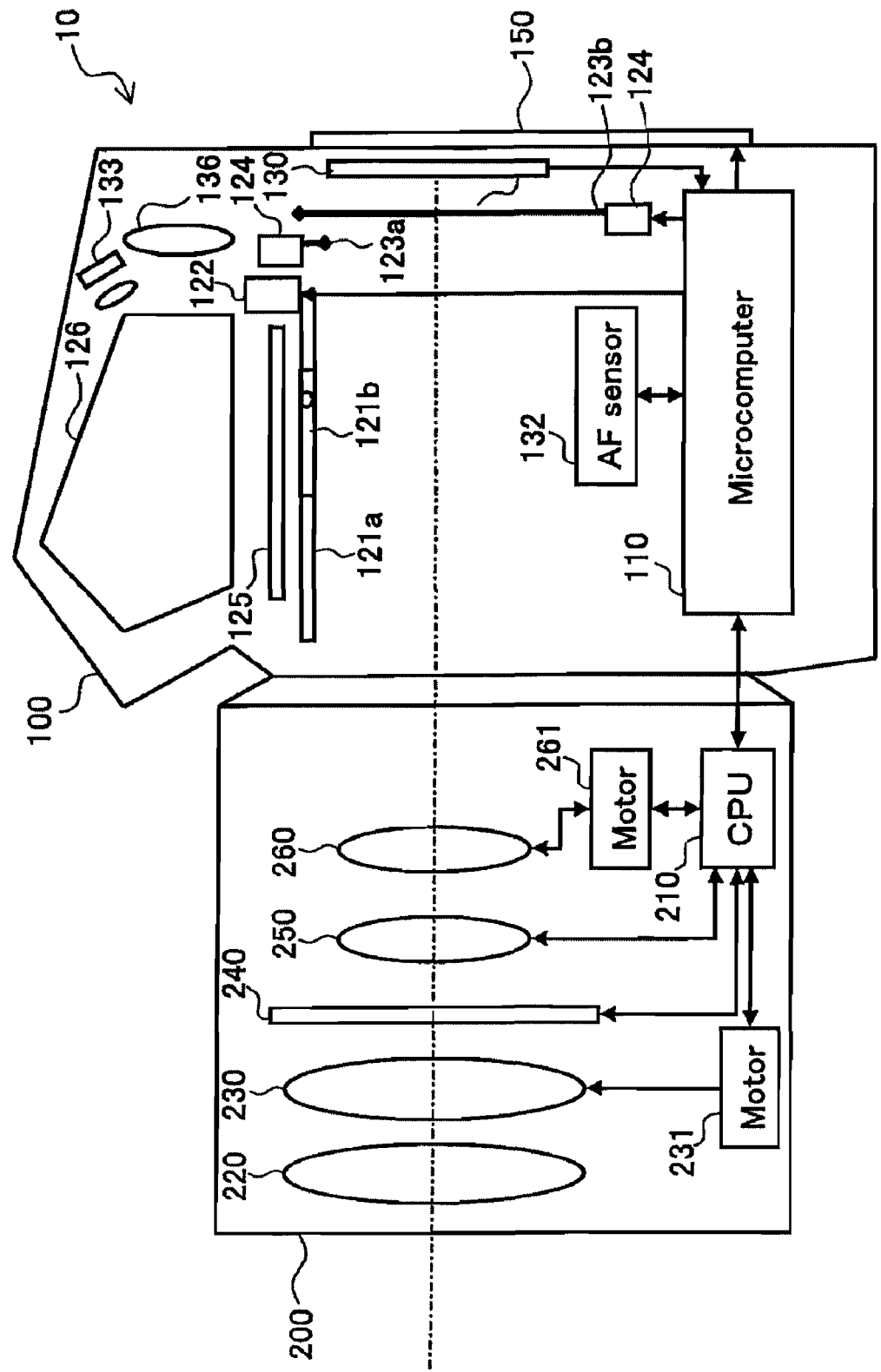
FIG. 6 is a schematic view when the inside of the mirror box of the camera according to Embodiments 1-5 is in a state C.

FIG. 6 is a schematic view showing the state in the mirror box 120 immediately after the exposure of the subject image with respect to the CMOS sensor 130 is completed. In the present specification, for convenience, this state will be referred to as a "state C". In the state C, the movable mirrors 121a, 121b are not positioned in the optical path of the optical signal incident from the interchangeable lens 200. Therefore, the optical signal from the interchangeable lens 200 does not pass through the focusing glass 125, the prism 126, and the eyepiece 136 to reach the user's eye, and does not reach the AF sensor 132 and the AE sensor 133, either. Furthermore, in the state C, the second shutter 123b is closed while the first shutter 123a is opened. Therefore, the optical signal from the interchangeable lens 200 does not reach the CMOS sensor 130. Thus, in the state C, the observation of the subject image using the liquid crystal monitor 150, the recording of the image data generated by the CMOS sensor 130, the autofocus operation using the contrast of image data generated by the CMOS sensor 130, the observation of the subject image using the optical viewfinder, the autofocus operation using the AF sensor, and the photometric operation using the AE sensor 133 cannot be performed. The second shutter 123b is biased in the closing direction, so that the state B can be shifted to the state C instantaneously. Therefore, the state C is in a state optimum for completing the exposure of the CMOS sensor 130.

As described above, the state A can be shifted to the state B directly. In contrast, the state B cannot be shifted to the state A without the state C, in terms of the constriction of the mechanism of the mirror box 120. However, this is a technical problem in the mechanism in the mirror box 120, so that a mechanism capable of directly shifting the state B to the state A without the state C may be adopted.

[1-1-5 Correspondence Between Configuration of Present Embodiment and Configuration of Present Invention]

The configuration including the focusing glass 125, the prism 126, and the eyepiece 136 is an example of an optical viewfinder of the present invention. The optical system including the objective lens 220, the zoom lens 230, the correction lens 251, and the focus lens 260 is an example of an image pickup optical system of the present invention. The movable mirrors 121a, 121b are examples of a movable mirror of the present invention. The CMOS sensor 130 is an example of an image pickup element of the present invention. The liquid crystal monitor 150 is an example of a display portion of the present invention. The microcomputer 110 is an example of a control portion of the present invention. In this case, the control portion may include the CPU 210 in addition to the microcomputer 110. The LV preview button 140j is an example of a diaphragm adjustment instruction receiving portion of the present invention. The microcomputer 110 is an example of image processing means of the present invention. The full depression manipulation receiving function of the release button 141 is an example of a release portion of the present invention. Similarly, the remote control receiving portion 155 that receives an instruction for the start of capturing an image for recording from the remote controller is an example of the release portion of the present invention. The AF sensor 132 is an example of a distance-measuring portion of the present invention. The configuration including the microcomputer 110, the CPU 210, the focus motor 261, and the focus lens 260 is an example of an autofocus portion of the present invention. The configuration including the focus lens 260 and the focus ring 262 is an example of manual focus means of the present invention. The memory card 300 is an example of a recording portion of the present invention. The halfway depression receiving function of the release button 141 is an example of an AF start instruction receiving portion of the present invention. Similarly, the remote control receiving portion 155 that receives an instruction for the start of autofocusing from the remote controller is an example of an AF start instruction receiving portion of the present invention. The buffer 111 is an example of storage means of the present invention. The supersonic vibration generator 134 is an example of a foreign matter removing portion of the present invention. The diaphragm ring 242 is an example of a diaphragm manipulation portion of the present invention. The menu button 140a is an example of a setting manipulation portion of the present invention. The battery box 143 is an example of a battery accommodating portion of the present invention. The power supply switch 142 is an example of a power supply manipulation portion of the present invention. The external terminal 152 is an example of an output terminal of the present invention. The gyrosensor 252 is an example of a shock detecting portion of the present invention.

[1-2 Operation of Camera 10]

The operation of the camera 10 in Embodiment 1 will be described with reference to FIGS. 7-24.

[1-2-1 Display Operation of Real-time Image]

The display operation for observing the subject image formed by the interchangeable lens 200 in real time will be described. As the display operation, two operations are set. The first one is an operation using the optical viewfinder, and the second one is an operation using the liquid crystal monitor 150. These operations will be described below in detail.

In the live view, a subject image only needs to be displayed on the liquid crystal monitor 150 in real time, and the image data displayed on the liquid crystal monitor 150 may or may not be stored simultaneously in storage means such as the memory card 300.

Furthermore, when the live view is displayed, it is necessary to allow the optical signal from the interchangeable lens 200 to reach the CMOS sensor 130, so that the inside of the mirror box 120 needs to be shifted to the state B shown in FIG. 5. However, even if the microcomputer 110 is set in the live view mode, it is necessary to set the inside of the mirror box 120 to the state A or the state C in addition to the state B, in accordance with each state of the image pickup operation, autofocus operation, automatic exposure control operation, or the like, and a period during which the liquid crystal monitor 150 cannot display a live view also occurs.

Furthermore, as described above, in the live view, a subject image is displayed on the liquid crystal monitor 250 in real time. However, the term "real time" does not have a strict meaning, and there may be some time delay from an actual operation of a subject as long as the user can feel real time in a common sense. The liquid crystal monitor 150 generally is considered to perform a live view display with a time delay of about 0.1 seconds (this time may be some longer or shorter depending upon hardware and the like of the camera 10), and the case of a delay of about 1 to 5 seconds may be included in the concept of the live view display as a subject image display in real time.

[1-2-1-1 Operation During Use of Optical Viewfinder]

The user can switch between the live view mode and the optical viewfinder mode (hereinafter, for convenience, referred to as an OVF mode) by sliding the viewfinder switch 140e shown in FIG. 3.

When the user slides the viewfinder switch 140e to the OVF mode side, the microcomputer 110 is set in the OVF mode. Then, the microcomputer 110 controls the mirror driving portion 122 and the shutter driving portion 124 to shift the inside of the mirror box 120 to the state A shown in FIG. 1. Consequently, the user can observe a subject image in real time through the eyepiece 136. Furthermore, in the state A, as described above, the autofocus operation using the AF sensor 132 and the photometric operation using the AE sensor 133 can be performed.

[1-2-1-2 Operation During Use of Liquid Crystal Monitor]

In the OVF mode, when the user slides the viewfinder switch 140e to the live view mode side, the microcomputer 110 is set in the live view mode. More specifically, the microcomputer 110 controls the mirror driving portion 122 and the shutter driving portion 124 to shift the inside of the mirror box 120 to the state B shown in FIG. 5. Because of this, the user can observe the subject image in real time, using the liquid crystal monitor 150.

[1-2-2 Adjustment of Diaphragm and Display Operation of Real-Time Image]

[1-2-2-1 Operation During Use of Optical Viewfinder]

In the state A, generally, the diaphragm 240 is opened. When an image pickup operation is started from the state A, the diaphragm 240 is stopped down in accordance with the amount of light incident upon the interchangeable lens 200. Thus, the opened state of the diaphragm 240 varies between the ordinary state of the state A and the image pickup operation. When the opened state of the diaphragm 240 varies, the depth of field becomes different. Therefore, in the ordinary state of the state A, the depth of field when an image for recording is captured cannot be observed. In order to solve this problem, the AV button 140m is provided. The user can observe the depth of field when an image for recording is captured with the optical viewfinder by pressing the AV button 140m. This operation will be described with reference to FIG. 7.

Figure 7:
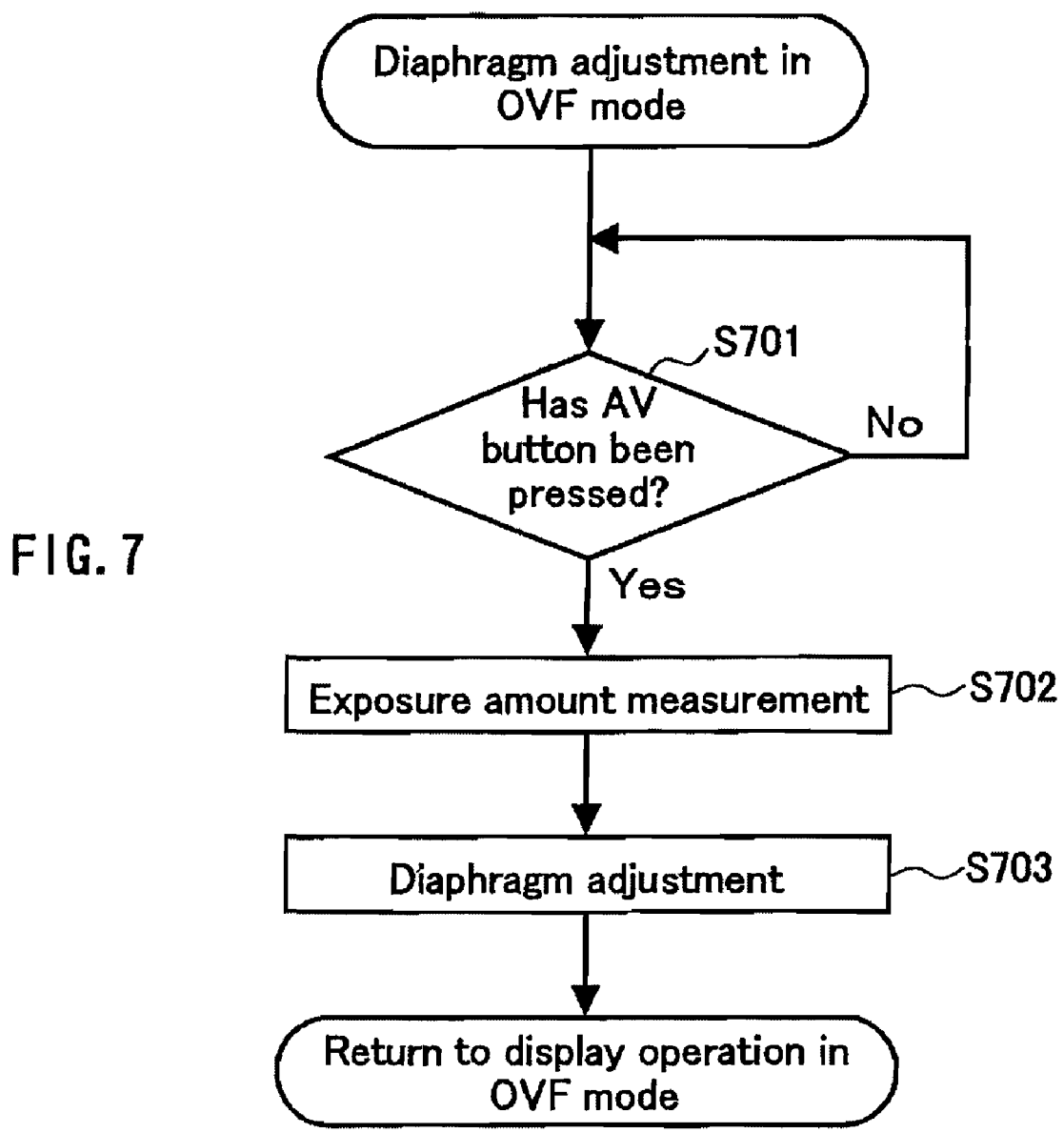
FIG. 7 is a flowchart illustrating an operation when an AV button is pressed in an OVF mode.

FIG. 7 is a flowchart illustrating an operation when the AV button 140m is pressed in the OVF mode. In FIG. 7, the microcomputer 110 originally is set in the OVF mode. At this time, the inside of the mirror box 120 is in the state A shown in FIG. 1. Furthermore, the microcomputer 110 monitors whether or not the AV button 140m is pressed (S701). When the user presses the AV button 140m in this state, the microcomputer 110 detects that the AV button 140m has been pressed, and starts measuring an exposure amount (S702). Specifically, the microcomputer 110 allows the AE sensor 133 to measure the light amount of the optical signal that is incident upon the interchangeable lens 200, is reflected by the movable mirror 121b, and is incident upon the AE sensor 133. The microcomputer 110 calculates an appropriate aperture value (f-number) of the diaphragm 240 and a shutter speed while an image for recording is being captured, based on the measurement results and the current opened state of the diaphragm 240. The microcomputer 110 sends the calculated f-number to the CPU 210. The CPU 210 controls the motor 241 based on the received f-number. The motor 241 adjusts the diaphragm 240 based on the control of the CPU 210 (S703).

In the case where the above operation is performed in the autofocus mode using the AF sensor 132, the autofocus operation as well as the photometric operation can be performed in Steps S702 and S703.

Thus, by providing the AV button 140m, the depth of field can be observed instantaneously with respect to a subject image while an image for recording is being captured, so that the operability is satisfactory.

[1-2-2-2 Operation During Use of Liquid Crystal Monitor]

In the case where the inside of the mirror box 120 is in the state B, generally, the diaphragm 240 is opened. When an image pickup operation is started from the state B, the degree of opening of the diaphragm 240 is controlled to be small in accordance with the amount of light incident upon the interchangeable lens 200. Thus, the opened state of the diaphragm 240 varies between the ordinary state of the state B and the image pickup operation. When the opened state of the diaphragm 240 varies, the depth of field becomes different. Therefore, the depth of field while an image for recording is being captured cannot be observed in the ordinary state of the state B. In order to solve this problem, the stop-down button 140k and the LV preview button 140j are provided. The user can observe the depth of field while an image for recording is being captured in a live view display by pressing the stop-down button 140k or the LV preview button 140j. Each operation will be described with reference to FIGS. 8 and 9.

Figure 8:
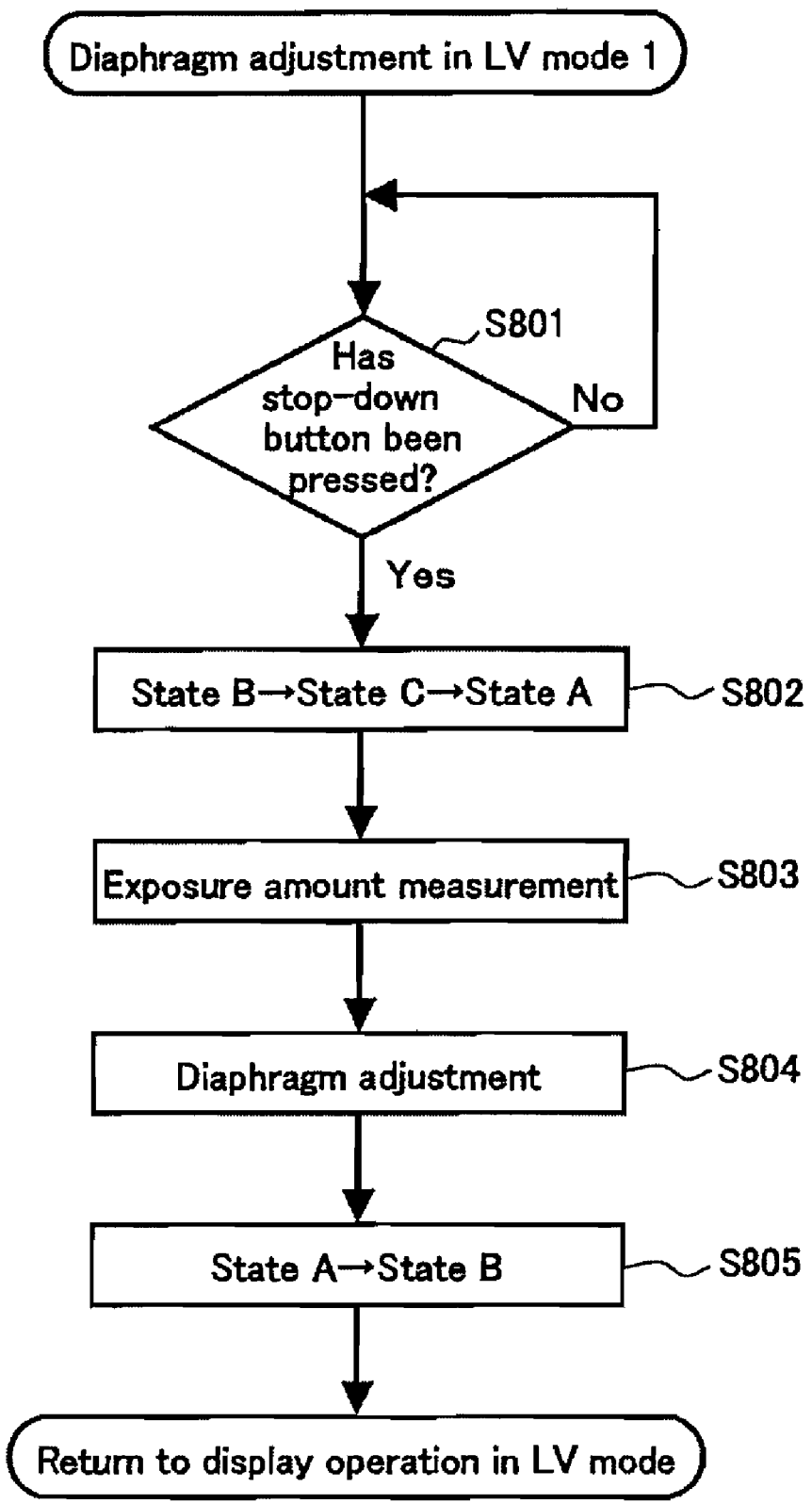
FIG. 8 is a flowchart illustrating an operation when a diaphragm stop-down button is pressed in a live view mode.

FIG. 8 is a flowchart illustrating an operation when the stop-down button 140k is pressed in the live view mode. In FIG. 8, the microcomputer 110 originally is set in the live view mode. At this time, the inside of the mirror box 120 is in the state B shown in FIG. 5. Furthermore, the microcomputer 110 monitors whether or not the stop-down button 140k is pressed (S801). When the user presses the stop-down button 140k in this state, the microcomputer 110 detects that the stop-down button 140k has been pressed, and shifts the state of the mirror box 120 from the state B to the state A via the state C (S802). When the shift to the state A is completed, the measurement by the AE sensor 133 becomes possible, so that the microcomputer 110 starts measuring an exposure amount (S803). Specifically, the microcomputer 110 allows the AE sensor 133 to measure the light amount of the optical signal that is incident upon the interchangeable lens 200, is reflected by the movable mirror 121a, is diffused by the focusing glass 125, and is incident upon the AE sensor 133. The microcomputer 110 calculates an appropriate aperture value (f-number) of the diaphragm 240 and a shutter speed while an image for recording is being captured, based on the measurement results, and the current opened state of the diaphragm 240. The microcomputer 110 sends the calculated f-number to the CPU 210. The CPU 210 controls the motor 241 based on the received f-number. The motor 241 adjusts the diaphragm 240 based on the control of the CPU 210 (S804). After that, the microcomputer 110 returns the inside of the mirror box 120 from the state A to the state B, and restarts a live view operation (S805).

During a period from Step S802 to Step S804 shown in FIG. 8, a live view display cannot be performed. During this period, no image may be displayed on the liquid crystal monitor 150 (this state is referred to as a "blackout state"), or the setting information on the camera 10 may be displayed, or the information on the current states of the automatic exposure control operation and the autofocus operation may be displayed, or the image data displayed in the immediately proceeding live view may be displayed, or the predetermined image data may be displayed. In order to display the image data displayed in the immediately proceeding live view, the microcomputer 110 always needs to save the image data obtained during the live view operation in the buffer 111 temporarily, and update the image data in the buffer 111.

Furthermore, in the case where the above operation is performed in the autofocus mode using the AF sensor 132, the autofocus operation as well as the automatic exposure control operation are performed in Steps S803 and S804.

Thus, by providing the stop-down button 140k, in the case of capturing an image for recording, it can be checked instantaneously what depth of field the subject image has, so that the operability is satisfactory.

Figure 9:
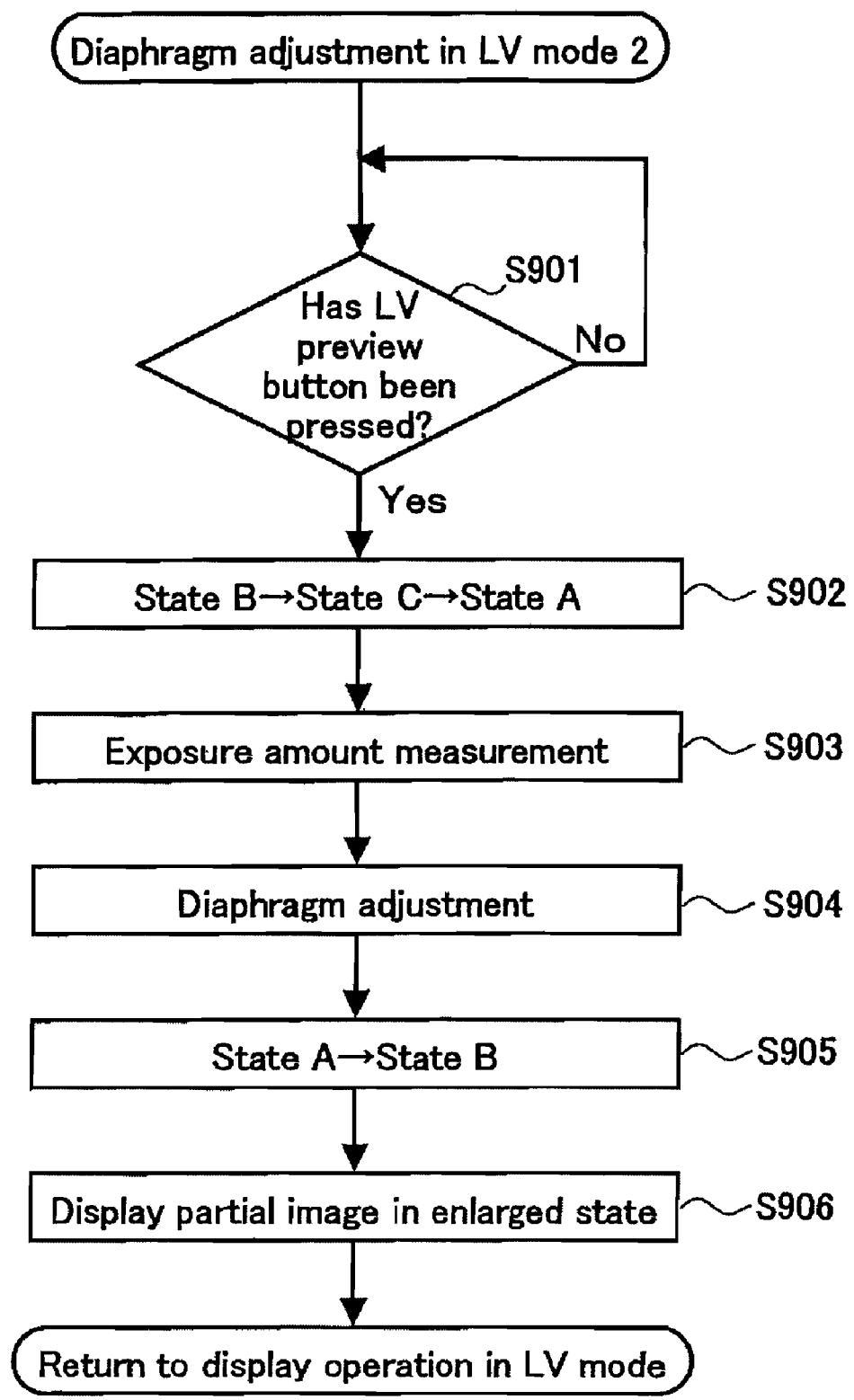
FIG. 9 is a flowchart illustrating an operation when a live view preview button is pressed in the live view mode.
Figure 10:
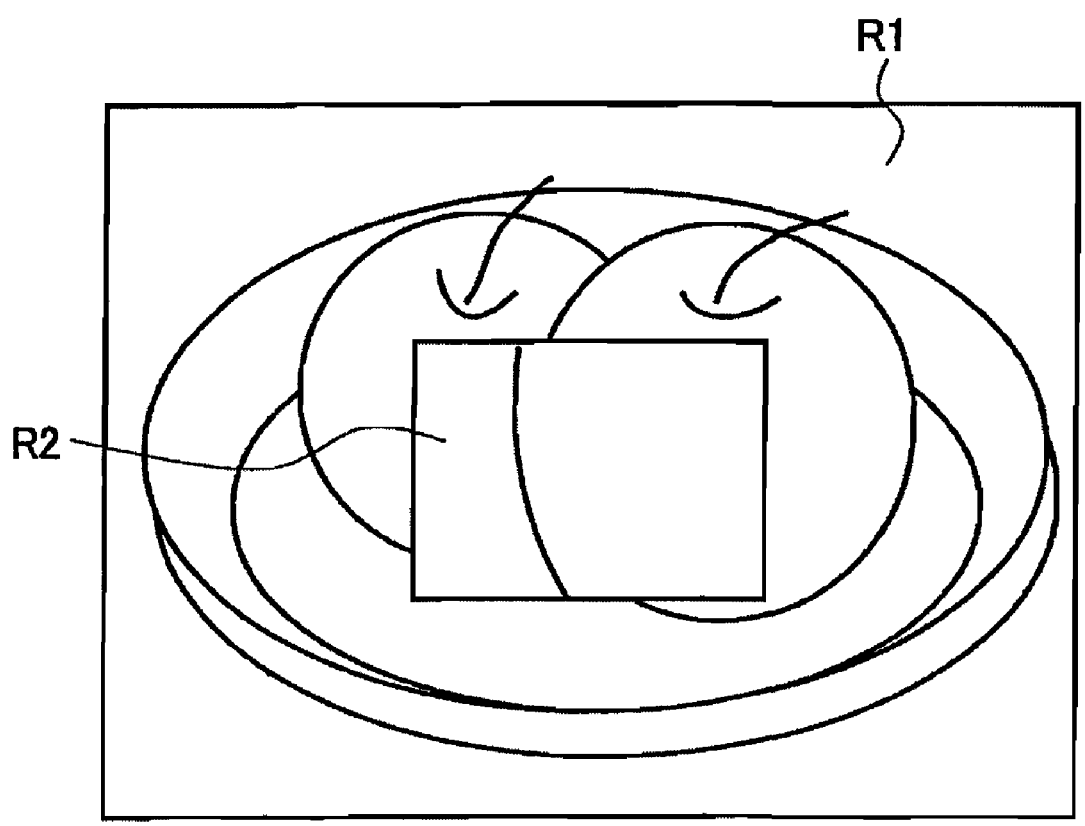
FIG. 10 is a schematic view showing an example when a part is displayed in an enlarged state on a liquid crystal monitor.

FIG. 9 is a flowchart illustrating an operation when the live view preview button 140j is pressed in the live view mode. In FIG. 9, the operations shown in Steps S901 to S905 are similar to those shown in Steps S801 to S805, so that the description thereof will be omitted. When the shift from the state A to the state B is completed in Step S905, the microcomputer 110 displays a region R2 that is a part of the image data generated by the CMOS sensor 130 in an enlarged state as shown in FIG. 10. The part in the screen that is set to be the region R to be enlarged can be changed by operating the cross key 140b and the like.

Thus, by providing the live view preview button 140j, a place whose depth of field is required to be checked can be enlarged instantaneously, so that the depth of field can be checked easily.

[1-2-3 Image Pickup Operation of Image for Recording]

Next, an operation in the case of capturing an image for recording will be described. In order to capture an image for recording, it is necessary to adjust a focus intended by the user previously. As a method for adjusting a focus, there are a manual focus system, a single focus system, a continuous focus system, and the like.

By operating the focus mode switch 140f shown in FIG. 3, the manual focus mode and the autofocus mode can be switched therebetween. Furthermore, by pressing the menu button 140a to call up a menu screen, either the signal focus mode or the continuous focus mode can be selected in the autofocus mode.

[1-2-3-1 Manual Focus Image Pickup Operation]

According to the manual focus system, a focus state is changed in accordance with the operation of the focus ring 262 by the user, and a focus can be set according to the user's preference. On the other hand, according to the manual focus system, if the user is not familiar with a manipulation, there is a problem that time and labor are needed for adjusting a focus. The case of capturing an image while visually recognizing the image through the optical viewfinder and the case of capturing an image while visually recognizing the image on the liquid crystal monitor 150 will be described with reference to FIGS. 11 and 13.

[1-2-3-1-1 Image Pickup Operation Using Optical Viewfinder]

Figure 11:
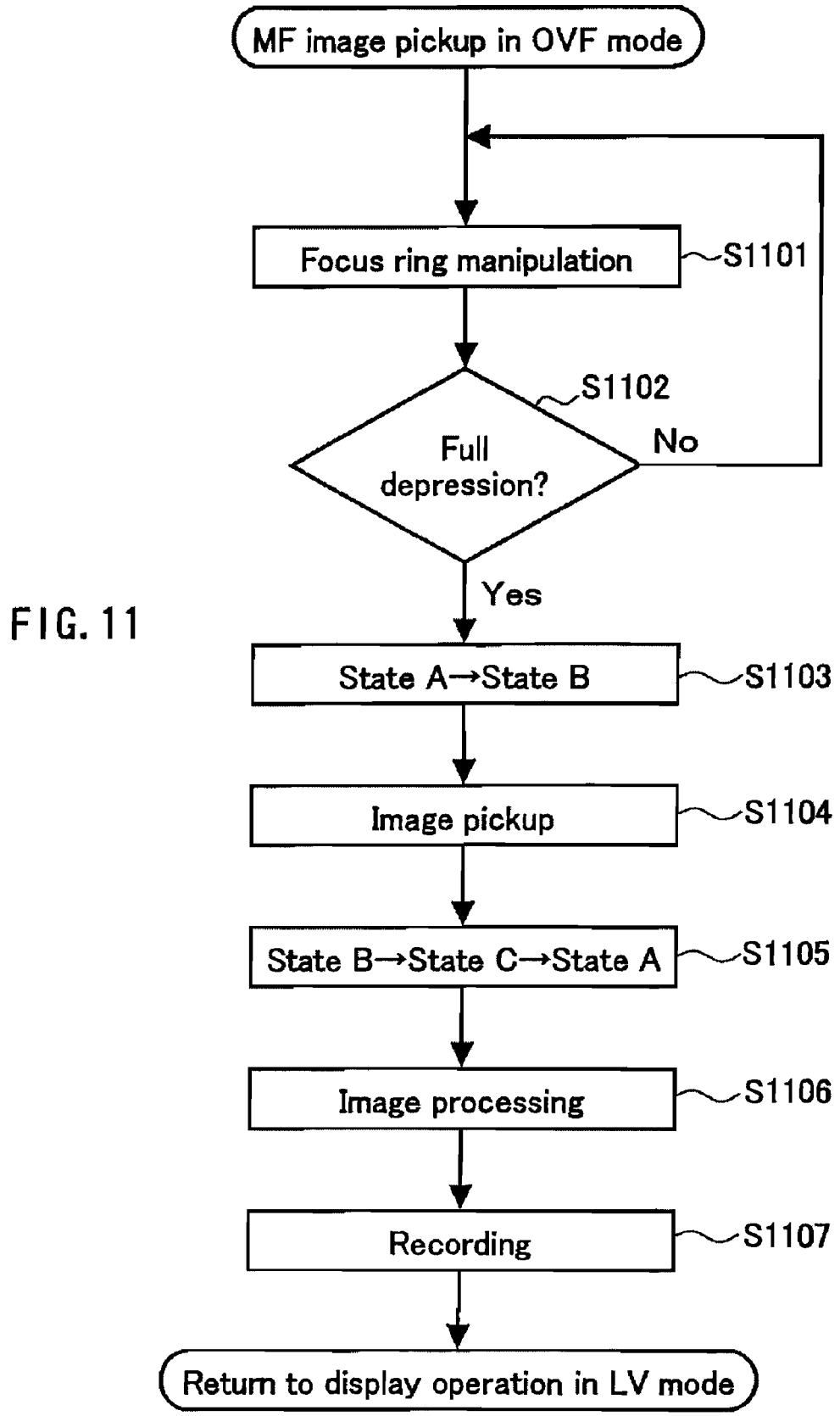
FIG. 11 is a flowchart illustrating an operation when an image is captured using an optical viewfinder in a manual focus mode.

FIG. 11 is a flowchart illustrating an operation when an image is captured using the optical viewfinder in the manual focus mode.

In FIG. 11, in the case of capturing an image in the OVF mode, the inside of the mirror box 120 is in the state A shown in FIG. 1. The user adjusts a focus and a composition while checking a subject image through the eyepiece 136 before capturing the image. The user can adjust a focus by manipulating the focus ring 262 (S1101).

The microcomputer 110 monitors whether or not the release button 141 has been pressed fully in parallel with Step S1101 (S1102).

In the case of detecting that the release button 141 has been pressed fully, the microcomputer 110 controls the mirror driving portion 122 and the shutter driving portion 124 to shift the inside of the mirror box 120 from the state A to the state B (S1103).

Next, the microcomputer 110 exposes an optical signal from the interchangeable lens 200 to the CMOS sensor 130, thereby allowing an image for recording to be captured (S1104).

When a time corresponding to a shutter speed has elapsed, the microcomputer 100 controls the shutter driving portion 124 so as to close the second shutter 123b, and completes the exposure (State C). After that, the microcomputer 110 controls so that the inside of the mirror box 120 is returned to the state A (S1105).

The microcomputer 110 receives the image data generated by the CMOS sensor 130, and temporarily stores it in the buffer 111. The image data stored at this time is, for example, image data composed of an RGB component. The microcomputer 110 subjects the image data stored in the buffer 111 to predetermined image processing such as YC conversion processing, resizing processing, and compression processing, thereby generating image data for recording (S1106).

The microcomputer 110 finally generates an image file pursuant to, for example, an Exif (Exchangeable image file format) specification. The microcomputer 110 allows the generated image file to be stored in the memory card 300 via the card slot 153 (S1107).

Hereinafter, the image file finally created by the microcomputer 110 will be described.

Figure 12:
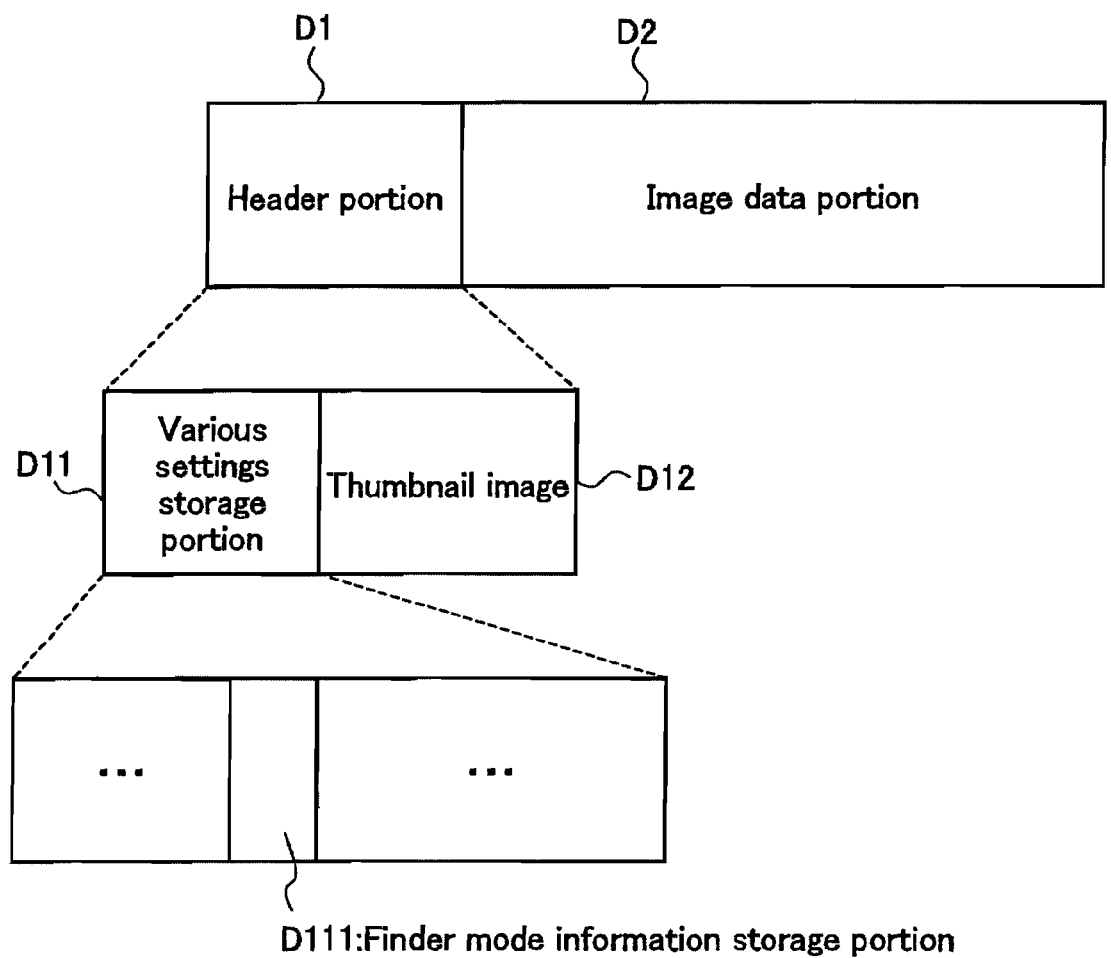
FIG. 12 is a schematic view showing a configuration of an image file storing an image for recording.

FIG. 12 is a schematic view showing a configuration of the image file. As shown in FIG. 12, the image file contains a header portion D1 and an image data portion D2. The image data portion D2 stores image data for recording. The header portion D1 contains various pieces of information storage portion D11 and a thumbnail image D12. The various pieces of information storage portion D11 include a plurality of storage portions storing various pieces of information such as image pickup conditions (e.g., an exposure condition, a white balance condition, an image pickup date, etc.). One of the storage portions includes a finder mode information storage portion D111. The finder mode storage portion D111 stores either "LV" or "OVF" as information. When an image pickup operation is performed in the case where the live view mode is set, the microcomputer 110 stores "LV" information in the finder mode information storage portion D111 of an image file thus generated. In contrast, when an image pickup operation is performed under the condition that the OVF mode is set, the microcomputer 110 stores "OVF" information in the finder mode information storage portion D111 of an image file thus generated.

Consequently, by analyzing the header portion D1 of the generated image file, it can be understood easily whether the image data contained in the image file is generated in the live view mode or in the OVF mode. Using this, the user can grasp the relationship between the quality of his/her own captured image and the finder mode. This can contribute to the enhancement of a photographic technique and the like.

Although "LV" or "OVF" is selected to be stored, it may be determined whether or not an image has been captured in the live view mode based on whether or not "LV" or "OVF" is stored, using only either one of "LV" and "OVF". For example, the following may be possible: in the case where an image is captured in the live view mode, "LV" information is stored, and in the case where an image is captured in the OVF mode, no information is stored.

Furthermore, in Step S1104, various displays can be performed on the liquid crystal monitor 150. For example, at the beginning of Step S1104, the image data generated by the CMOS sensor 130 may be read to the microcomputer 110 prior to the image data for recording, and the read image data may be displayed. Furthermore, the liquid crystal monitor 150 may be set to be a blackout display. Furthermore, a live view image stored in the buffer 111 may be displayed before full depression is performed. Furthermore, the setting information on the camera 10, information representing an operation state, and the like may be displayed.

Furthermore, in Steps S1103 and S1105, various displays can be performed on the liquid crystal monitor 150. For example, the liquid crystal monitor 150 may be set to be a blackout display. Furthermore, a live view image stored in the buffer 111 may be displayed before full depression is performed. Furthermore, the setting information on the camera 10, information showing an operation state, and the like may be displayed.

Furthermore, in Steps S1101 and S1102, the inside of the mirror box 120 is in the state A. Therefore, the AF sensor 132 is in a state capable of measuring a distance. The microcomputer 110 can control so as to display the measurement results (a defocus value, etc.) measured in the AF sensor 132 or information based on the measurement results on the liquid crystal monitor 150. Due to such control, the user can check if a focus is adjusted based on the information displayed on the liquid crystal monitor 150 as well as an image during the manual focus manipulation. Therefore, a focus can be adjusted exactly even in the manual manipulation. As a method for displaying measurement results measured by the AF sensor 132 or information based on the measurement results, the display of numerical values, display of a bar graph, display of a line graph, display of a mark representing the degree of a defocus value, and the like are considered.

[1-2-3-1-2 Image Pickup Operation Using Liquid Crystal Monitor]

Figure 13:
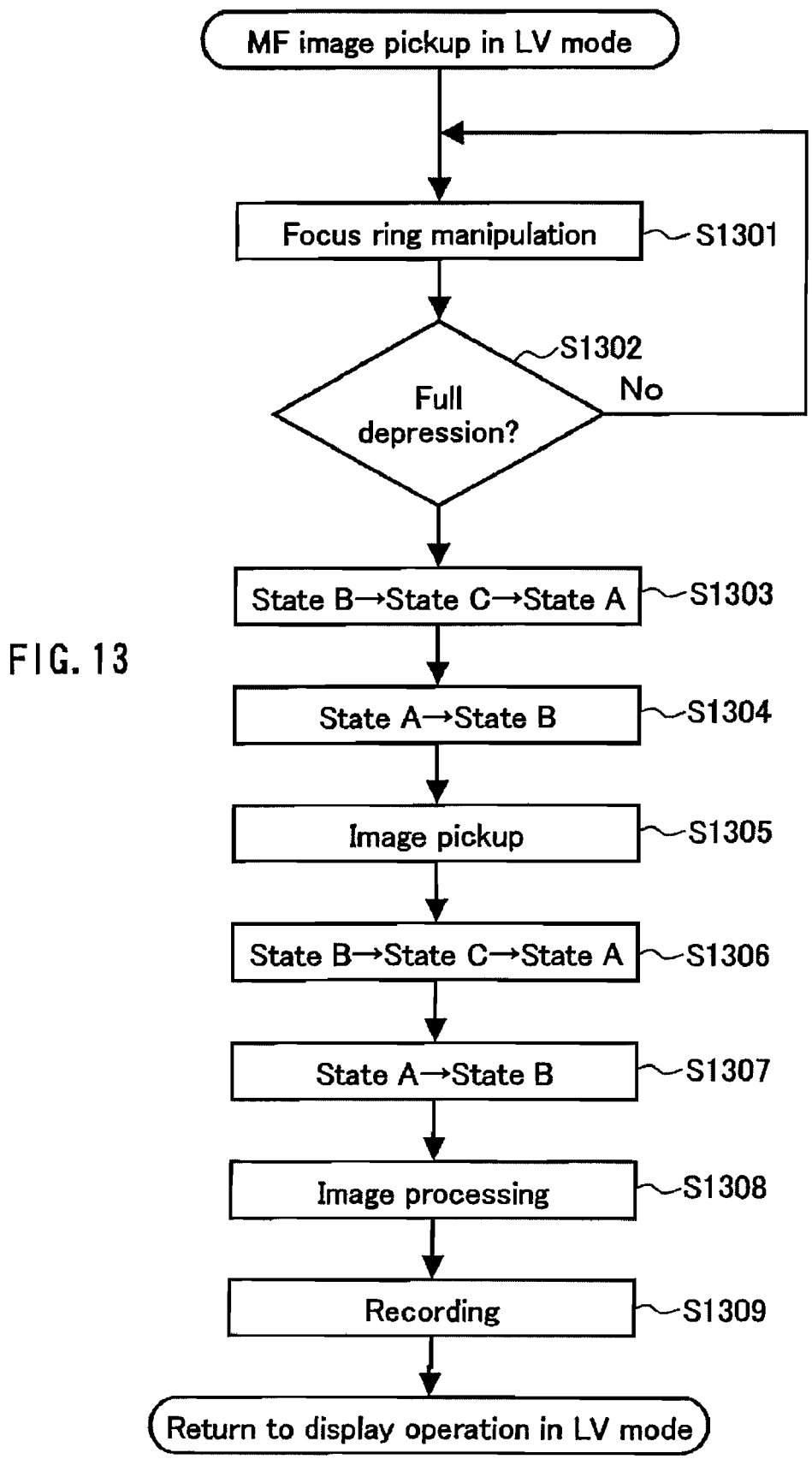
FIG. 13 is a flowchart illustrating an operation when an image is captured using a liquid crystal monitor 150 in the manual focus mode.

FIG. 13 is a flowchart illustrating an operation when an image is captured using the liquid crystal monitor 150 in the manual focus mode.

In FIG. 13, in the case of capturing an image in the live view mode, the inside of the mirror box 120 is in the state B shown in FIG. 5. The user adjusts a focus and a composition while checking a subject image through the liquid crystal monitor 150 before capturing the image. In order to adjust a focus, the user manipulates the focus ring 262 (S1301).

The microcomputer 110 monitors whether or not the release button 141 has been pressed fully in parallel with Step S1301 (S1302).

In the case of detecting that the release button 141 has been pressed fully, the microcomputer 110 controls the mirror driving portion 122 and the shutter driving portion 124 to shift the inside of the mirror box 120 from the state B to the state A via the state C (S1303).

The reason why the inside of the mirror box 120 is first set to be in the state A is to disconnect the optical signal incident upon the CMOS sensor 130 with the shutter 123 first and allow the CMOS sensor 130 to prepare for the start of exposure. Examples of the preparation for the start of exposure include the removal of unnecessary charge in each pixel.

The subsequent operations shown in Steps S1304 to S1306 are similar to those shown in Steps S1103 to S1105 in FIG. 11, so that the description thereof will be omitted.

When the exposure is completed, and the inside of the mirror box 120 is set to be in the state A (S1306), the microcomputer 110 returns the inside of the mirror box 120 to the state B again, and restarts a live view display (S1307).

The microcomputer 110 performs image processing and recording of an image for recording in parallel with Step S1307 (S1308, S1309). The operations shown in Steps S1308 and S1309 are similar to those shown in Steps 1106 and 1107 in FIG. 11, so that the detailed description will be omitted.

During the operations shown in Steps S1303 to S1309, various displays can be performed on the liquid crystal monitor 150. This is similar to the case in the operations shown in Steps S1103 to S1107 in FIG. 11, so that the description will be omitted.

Furthermore, even in Steps S1308 and S1309, various displays can be performed on the liquid crystal monitor 150 in addition to the live view display.

As described above, in Steps S1308 and S1309, since the inside of the mirror box 120 is in the state B, a live view display can be performed. However, in Steps S1308 and S1309, a large part of the control ability of the microcomputer 110 is assigned to image processing and recording processing. Therefore, in Steps S1308 and S1309, it is preferable that the burden on the microcomputer 110, other than the image processing and recording processing, is minimized. In Steps S1308 and S1309, a live view display is avoided. Because of this, the microcomputer 110 is not required to assign the processing ability for a live view display, so that image processing and recording processing can be performed rapidly.

As the form in which a live view display is not performed, for example, the liquid crystal monitor 150 may be set to be a blackout display. Furthermore, a live view image stored in the buffer 111 may be displayed before full depression is performed. Furthermore, the setting information on the camera 10, information representing an operation state, and the like may be displayed.

Furthermore, in Steps S1301 and S1302, the inside of the mirror box 120 is in the state B. Therefore, the microcomputer 110 can calculate the degree of contrast of image data generated by the CMOS sensor 130. As the method for calculating the degree of contrast, a method for integrating a high frequency component in a spatial frequency of a brightness signal of image data over the entire surface or in a predetermined range of the image data, and the like are considered. The microcomputer 110 can control so that the degree of contrast of the calculated image data or information based thereon are displayed on the liquid crystal monitor 150 so as to overlap the live view display. Due to such control, the user can check if a focus is adjusted based on the information displayed on the liquid crystal monitor 150 as well as the image during a manual manipulation. Therefore, a focus can be adjusted exactly even in the manual operation. As the method for displaying the degree of contrast of the calculated image data or the information based thereon, the display of numerical values, display of a bar graph, display of a line graph, display of a mark representing the degree of a defocus value, and the like are considered.

[1-2-3-2 Single Focus Image Pickup Operation]

According to the single focus system, an autofocus operation is performed in accordance with the halfway depression of the release button 141, and the focus state thus obtained is retained. The retention of the focus state is referred to as "focus lock". The focus lock is kept until image pickup of an image for recording is completed or the halfway depression of the release button 141 is cancelled. The user selects the single focus system to first adjust a focus to a point where the user desires to adjust the focus, and thereafter, adjusts a composition, thereby capturing a favorite image. Hereinafter, an operation in the case of capturing an image using the optical viewfinder and an operation in the case of capturing an image using the liquid crystal monitor 150 will be described with reference to FIGS. 14 and 15.

[1-2-3-2-1 Image Pickup Operation Using Optical Viewfinder]

Figure 14:
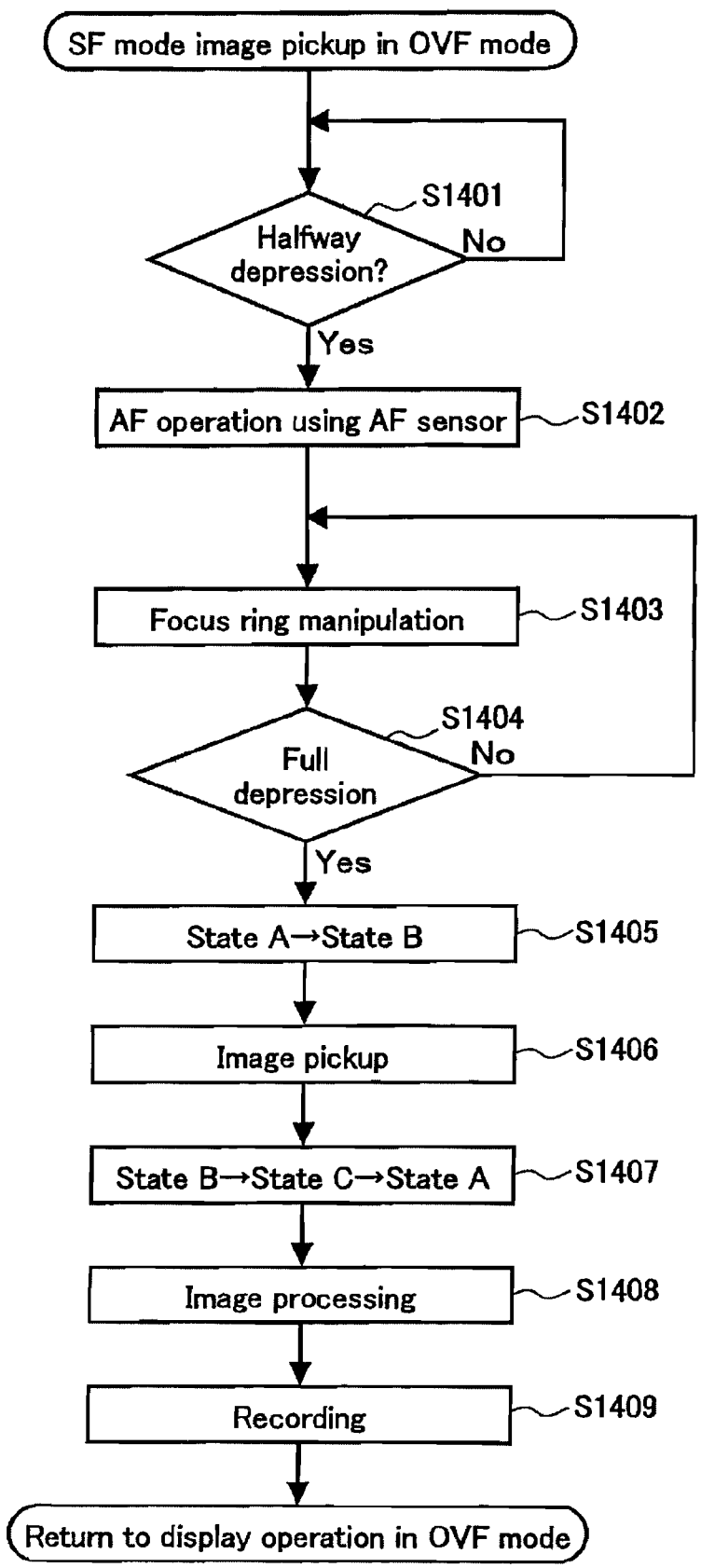
FIG. 14 is a flowchart illustrating an operation when an image is captured using an optical viewfinder in a single focus mode.

FIG. 14 is a flowchart illustrating an operation when an image is captured using the optical viewfinder in the single focus mode.

In FIG. 14, in the case of capturing an image in the OVF mode, the inside of the mirror box 120 is in the state A shown in FIG. 1. The user adjusts a focus and a composition while checking a subject image through the eyepiece 136. The microcomputer 110 monitors whether or not the user presses the release button 141 halfway so as to adjust a focus (S1401).

When the user presses the release button 141 halfway, the autofocus operation based on the measurement results of the AF sensor 132 is started, and the focus state thus obtained is locked (S1402).

Even after the focus state is locked, the user can adjust a focus manually using the focus ring 262 (S1403).

During Step S1403, the microcomputer 110 monitors whether or not the release button 141 is pressed fully (S1404).

When the halfway depression of the release button 141 is cancelled during Steps S1401 to S1404, the microcomputer 110 cancels a focus lock, and returns the state to the one in which autofocus can be performed. Therefore, when the user presses the release button 141 halfway again, a new focus state is locked.

The subsequent operations in Steps S1405 to S1409 are similar to those in Steps S1103 to S1107 in FIG. 11, so that the description thereof will be omitted. Furthermore, various displays can be performed on the liquid crystal monitor 150 in Steps S1405 to S1409 in the same way as in Steps S1103 to S1107 in FIG. 11, so that the description thereof will be omitted.

As described above, even after the state is locked once in Step S1402, manual focus adjustment using the focus ring 262 can be performed (S1403), whereby minute focus adjustment can be performed. Therefore, a focus state according to the user's preference can be set.

In the case where the automatic exposure mode is set, the automatic exposure control operation is performed between Steps S1404 and S1405. Specifically, the automatic exposure control operation is performed during a period from a time when the release button 141 is pressed fully to a time when the inside of the mirror box 120 becomes the state B.

Herein, the detail of the automatic exposure control operation will be described. The AE sensor 133 performs photometry, and the photometric data thus measured is transmitted to the microcomputer 110. The microcomputer 110 calculates an f-number and a shutter speed based on the obtained photometric data. The microcomputer 110 transmits the calculated f-number to the CPU 210. Furthermore, the microcomputer 110 prepares so as to control the shutter driving portion 124 and the CMOS sensor 130 so as to obtain the calculated shutter speed. The CPU 210 controls the motor 241 based on the received f-number. The motor 241 adjusts an aperture size of the diaphragm 240 in accordance with the control of the CPU 210. The above operations are performed during a period from a time when the release button 141 is pressed fully to a time when the inside of the mirror box 120 becomes the state B.

The timing at which the automatic exposure control operation is performed is not limited to the above timing. For example, in Step 1302, the automatic exposure control based on the measurement results of the AE sensor 133 may be performed together with the autofocus control.

Furthermore, the automatic exposure control operation may be performed after the autofocus control is completed. When the AF sensor 132 measures a distance, it is necessary to open the diaphragm 240 to, for example, F6.5 or more. The reason for this is to allow a line sensor in the AF sensor 132 to form a subject image sufficiently. The measurement by the AF sensor can be completed exactly by adjusting the aperture size of the diaphragm 240 after the completion of the autofocus control.

Furthermore, after the measurement of the AF sensor 132, the autofocus control and the adjustment of an aperture size of the diaphragm 240 may be performed in parallel. Because of this, the diaphragm 240 is driven without waiting for the completion of the autofocus operation, so that a time required for setting the diaphragm 240 can be shortened.

[1-2-3-2-2 Image Pickup Operation Using Liquid Crystal Monitor]

Figure 15:
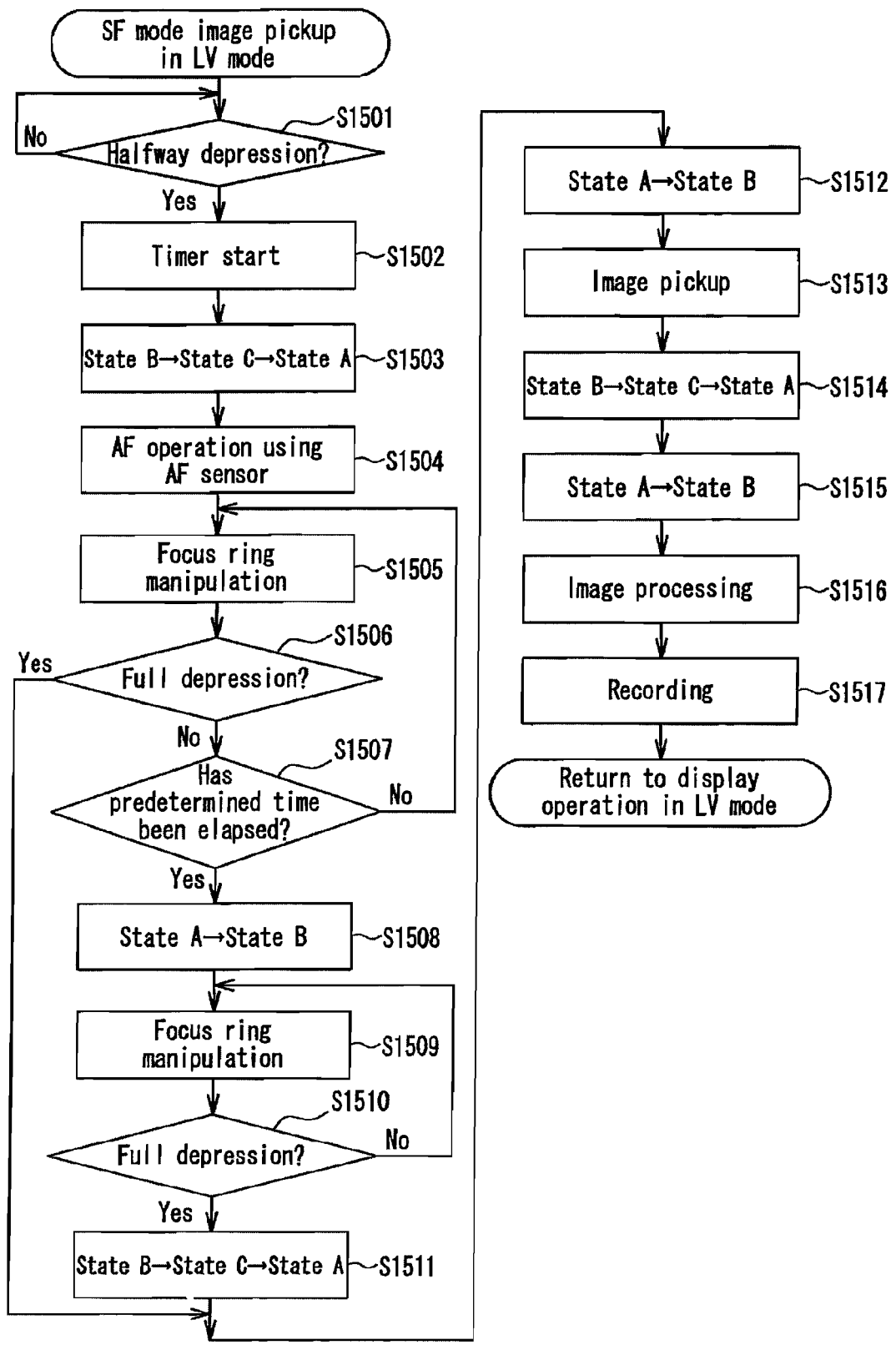
FIG. 15 is a flowchart illustrating an operation when an image is captured using the liquid crystal monitor 150 in the single focus mode.

FIG. 15 is a flowchart illustrating an operation when an image is captured using the liquid crystal monitor 150 in the single focus mode.

In FIG. 15, in the case of capturing an image in the live view mode, the inside of the mirror box 120 originally is in the state B shown in FIG. 5. The user adjusts a focus and a composition while checking a subject image through the liquid crystal monitor 150 before capturing the image. The microcomputer 110 monitors whether or not the user presses the release button 141 halfway so as to adjust a focus (S1501).

When the user presses the release button 141 halfway, the microcomputer 110 starts a timer in the microcomputer 110 (S1502).

The microcomputer 110 shifts the inside of the mirror box 120 from the state B to the state A via the state C in parallel with Step S1502 (S1503), and starts the autofocus operation based on the measurement results of the AF sensor 132 and locks the focus state thus obtained (S1504). The reason why the inside of the mirror box 120 is shifted to the state A in S1503 is to measure a distance with the AF sensor 132.

Even after the focus is locked, manual focus adjustment using the focus ring 262 can be performed (S1505).

The microcomputer 110 monitors whether or not the release button 141 is pressed fully while the focus ring 262 is being manipulated (S1506).

The microcomputer 110 monitors whether or not the release button 141 is pressed fully before a predetermined time elapses after the halfway depression (S1507). When the release button 141 is pressed fully before a predetermined time elapses after the release button 141 is pressed halfway, the microcomputer 110 is shifted to Step S1512, and starts an image pickup operation immediately. On the other hand, when a predetermined time elapses after the halfway depression with the release button 141 is not pressed fully, the microcomputer 110 is shifted to Step S1508.

In Step S1508, the microcomputer 110 shifts the inside of the mirror box 120 from the state A to the state B. Because of this, the camera 10 can display a subject image on the liquid crystal monitor 150 under the condition that a focus is locked. Therefore, the user can determine a favorite composition by watching an image displayed on the liquid crystal monitor 150 while keeping the focus in a favorite state.

Next, the microcomputer 110 monitors whether or not the release button 141 is pressed fully (S1510).

While Step S1510 is being performed, a focus state can be changed manually using the focus ring 262 in the same way as in Step S1504 (S1509).

During Steps S1501 to S1510, in the same way as in Steps S1401 to S1404 in FIG. 14, when the halfway depression of the release button 141 is cancelled, the microcomputer 110 cancels a focus lock, and returns the state to the one in which an autofocus can be performed again. Therefore, when the release button 141 is pressed halfway again, a new focus state is locked.

The subsequent operations in Steps S1511 to S1517 are similar to those in S1303 to S1309 in FIG. 13, so that the description thereof will be omitted.

As described above, merely by pressing the release button 141 halfway, after the movable mirror 121 is moved down to measure a distance, the camera 10 returns to the live view mode. Because of this, with a simple manipulation of pressing the release button 141 halfway, the operations from the autofocus operation using the AF sensor 132 to the live view display can be performed easily. Therefore, the user can adjust a composition in the live view display when a subject is focused by a simple manipulation.

Furthermore, when the user desires to change a composition while watching the liquid crystal monitor 150 after determining a focus state, the user only need to wait until a predetermined time elapses after pressing the release button 141 halfway. On the other hand, in the case of pressing the release button 141 fully immediately after pressing it halfway, an image starts being captured without a live view display (S1508-S1511 are skipped in S1506), so that a time from the halfway depression to the start of capturing an image can be shortened. This is because the movable mirror is prevented from being moved up/down unnecessarily. Therefore, the user can capture a favorite image without letting a shutter timing slip away.

In Steps S1511 to S1517, various displays can be performed on the liquid crystal monitor 150 in the same way as in Steps S1103 to S1107.

Furthermore, a live view cannot be displayed in the autofocus operation (S1504) and the image pickup operation (S1513). Alternatively, even when a live view can be displayed for a short period of time, it is difficult to display it continuously. This is because the movable mirror 121 is moved down in the autofocus operation (S1504). Furthermore, in the image pickup operation (S1513), it is difficult for the CMOS sensor 130 to output image data during exposure. Thus, it is considered that an image other than a live view is displayed on the liquid crystal monitor 150 in these cases. In this case, it is preferable to vary a method for displaying an image on the liquid crystal monitor 130 or a method for not displaying an image on the liquid crystal monitor 130 between the autofocus operation (S1504) and the image pickup operation (S1513). The display on the liquid crystal monitor 130 varies, so that it is easy to recognize whether the autofocus operation or the image pickup operation is being performed. Because of this, the movable mirror 121 is moved up and down in the autofocus operation and the image pickup operation. Therefore, the problem that the user is likely to confuse both the operations since the patterns of sounds generated from the mirror box 120 are similar to each other can be solved. There are various display or non-display examples. For example, during the autofocus operation, image data stored immediately before in the buffer 111 may be displayed on the liquid crystal monitor 150, and during the image pickup operation, the liquid crystal monitor 150 may be set to be a blackout (nothing is displayed), or vice versa. Furthermore, during the autofocus operation, information representing it (e.g., a message "during auto-focusing") may be displayed on the liquid crystal monitor 150, and during the image pickup operation, information representing it (e.g., a message "during capturing of an image") may be displayed on the liquid crystal monitor 150.

Furthermore, the timing at which the automatic exposure control operation is performed can be set variously. This point is similar to that described in "1-2-3-2-1 Image pickup operation using optical viewfinder".

Furthermore, in the above, it is determined whether or not a live view mode is recovered based on whether or not a predetermined time elapses from halfway depression. However, the present invention is not limited thereto. For example, it may be determined whether or not a live view mode is recovered based on whether or not the full down depression is performed before or after the completion of an autofocus operation. More specifically, the following may be possible. In the case where an autofocus operation is started in accordance with halfway depression, and full depression is performed before the completion of the autofocus operation, the camera 10 is shifted directly to an image pickup operation of an image for recording. On the other hand, in the case where full depression is not performed before the completion of the autofocus operation, the camera 10 is first shifted to a live view mode, and thereafter, is shifted to an image pickup operation of an image for recording when full depression is performed.

[1-2-3-3 Continuous Focus Image Pickup Operation]

According to the continuous focus system, an autofocus operation is performed in accordance with halfway depression of the release button 141, and during the halfway depression, the autofocus operation is repeated continuously to update a focus state. The update of the focus state is continued until the image pickup of an image for recording is finished or the halfway depression of the release button 141 is cancelled. The user can focus a particular subject repeatedly by selecting the continuous focus system. Therefore, the continuous focus system is particularly advantageous for capturing a moving subject.

[1-2-3-3-1 Operation During Image Pickup Using Optical Viewfinder]

Figure 16:
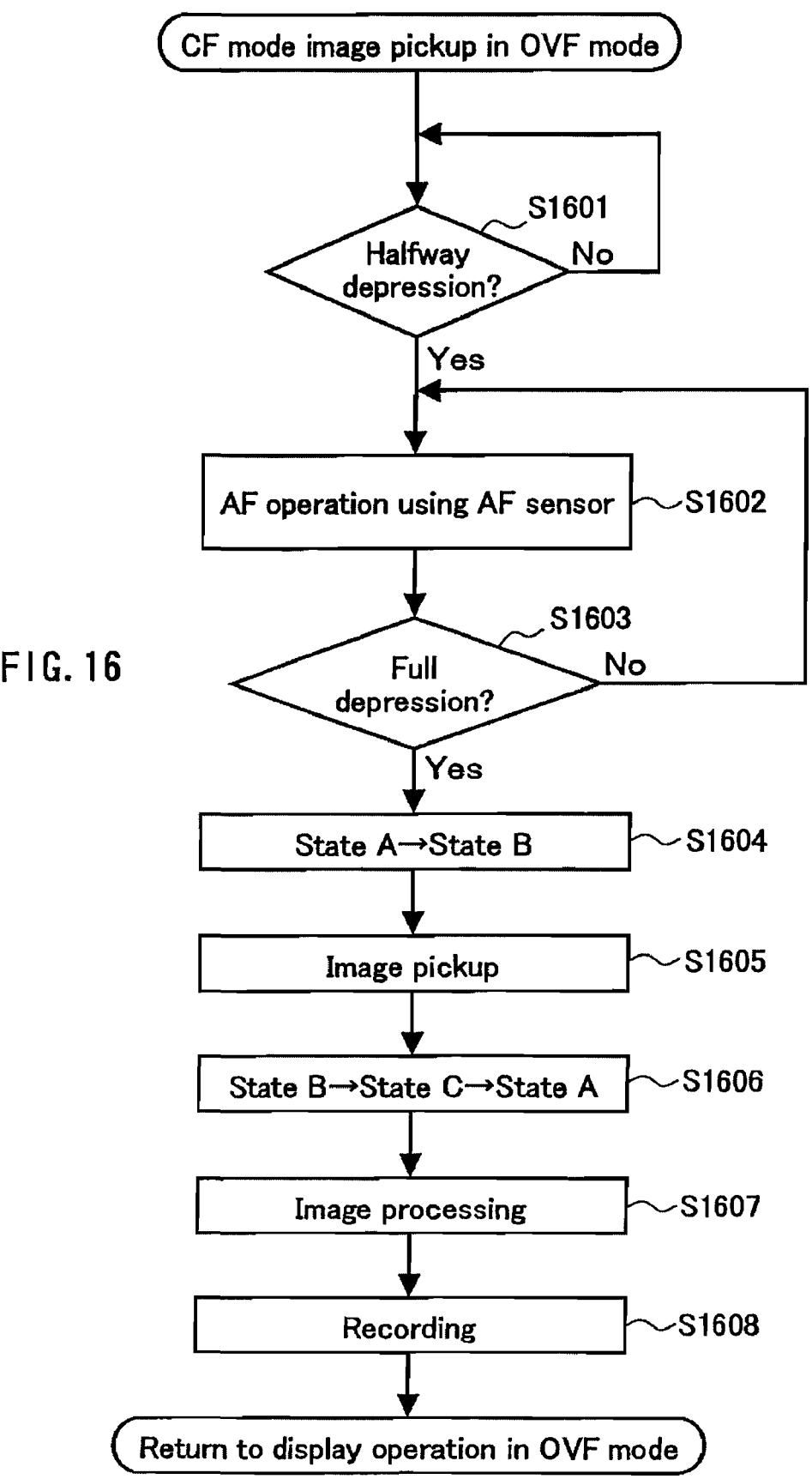
FIG. 16 is a flowchart illustrating an operation when an image is captured using an optical viewfinder in a continuous focus mode.

FIG. 16 is a flowchart illustrating an operation when an image is captured using an optical viewfinder in the continuous focus mode.

In FIG. 16, in the case of capturing an image in the OVF mode, the inside of the mirror box 120 is in the state A shown in FIG. 1. The user adjusts a focus and a composition while checking a subject image through the eyepiece 136 before capturing the image. The microcomputer 110 monitors whether or not the user presses the release button 141 halfway so as to adjust a focus (S1601).

When the user presses the release button 141 halfway, the autofocus operation based on the measurement results of the AF sensor 132 is started (S1602).

Then, while the user is pressing the release button 141 halfway, the CPU 210 updates a focus state based on the measurement results of the AF sensor 132 regarding the distance to the subject. During this time, the microcomputer 110 monitors whether or not the release button 141 is pressed fully (S1603).

The subsequent operations in Steps S1604 to S1608 are similar to those in Steps S1103 to S1107 in FIG. 11, so that the description thereof will be omitted. Furthermore, in Steps S1604 to S1608, various displays can be performed on the liquid crystal monitor 150 in the same way as in Steps S1103 to S1107 in FIG. 11, so that the description thereof will be omitted.

When the halfway depression is cancelled before the user presses the release button 141 fully, the CPU 210 stops the autofocus operation based on the measurement results of the AF sensor 132.

Furthermore, the timing at which the automatic exposure control operation is performed can be set variously. This point is the same as that described in "1-2-3-2-1 Image pickup using optical viewfinder".

[1-2-3-3-2 Image Pickup Operation Using Liquid Crystal Monitor]

Figure 17:
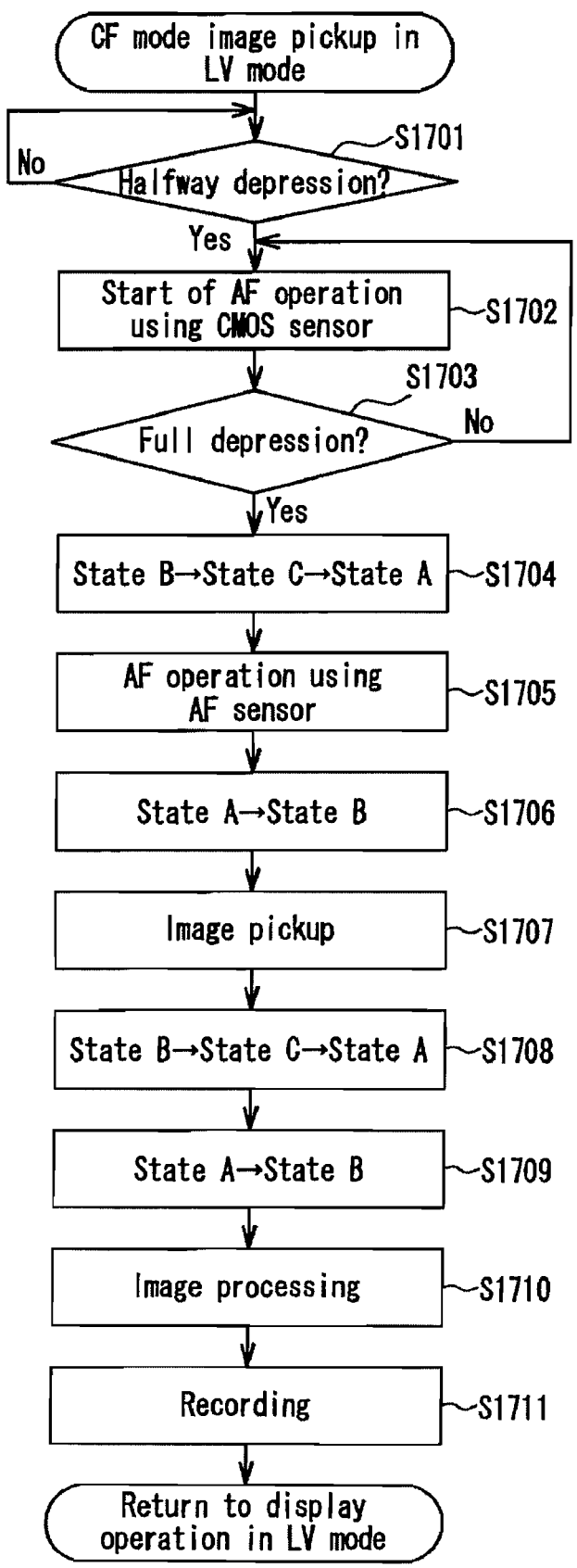
FIG. 17 is a flowchart illustrating an operation when an image is captured using the liquid crystal monitor in the continuous focus mode.

FIG. 17 is a flowchart illustrating an operation when an image is captured using the liquid crystal monitor 150 in the continuous focus mode. In the present operation, the autofocus operation uses both an autofocus operation of a system using image data generated by the CMOS sensor 130 and an autofocus of a system using the measurement results of the AF sensor 132.

Herein, as an autofocus operation of a system using the image data generated by the CMOS sensor 130, for example, an autofocus operation of a so-called "mountain-climbing system" is considered. According to the autofocus operation of the mountain-climbing system, a contrast value of image data generated by the CMOS sensor 130 is monitored while the focus lens 260 is operated minutely, and the focus lens is positioned in a direction of a large contrast value.

In FIG. 17, in the case of capturing an image in a live view mode, the inside of the mirror box 120 originally is in the state B shown in FIG. 5. The user adjusts a focus and a composition while checking a subject image through the liquid crystal monitor 150 before capturing the image. The microcomputer 110 monitors whether or not the user presses the release button 141 halfway so as to adjust a focus (S1701).

When the user presses the release button 141 halfway, the microcomputer 110 starts the autofocus operation based on the contrast of the image data generated by the CMOS sensor 130 (S1702).

While the user is pressing the release button 141 halfway, the CPU 210 updates a focus state based on the above-mentioned contrast. During this time, the microcomputer 110 monitors whether or not the release button 141 is pressed fully (S1703).

Upon detecting that the release button 141 has been pressed fully in Step S1703, the microcomputer 110 shifts the inside of the mirror box 120 from the state B to the state A via the state C (S1704).

Next, the microcomputer 110 controls so that an autofocus operation is performed based on the measurement results of the AF sensor 132 (S1705).

Thereafter, the operations from the image pickup operation to the recording operation are performed (S1706-S1711). These operations are similar to those in Steps S1512 to S1517 in FIG. 15, so that the detailed description thereof will be omitted.

As described above, by using the autofocus operation based on the image data generated by the CMOS sensor 130 and the autofocus operation based on the measurement results of the AF sensor 132, even when the movable mirror 121 is not positioned in an optical path and when the movable mirror 121 is positioned in the optical path, an autofocus operation can be performed.

Furthermore, while the release button 141 is being pressed halfway, the autofocus operation based on the image data generated by the CMOS sensor 130 is performed, whereby a live view can be displayed on the liquid crystal monitor 150 continuously while the continuous focus operation is being performed.

Furthermore, the autofocus operation based on the measurement results of the AF sensor 132 is performed after the release button 141 is pressed fully, so that a focus can be adjusted more exactly immediately before an image is captured. Particularly, in the case where a subject moving fast is captured, a time from the last autofocus operation (S1705) to the image pickup operation (S1707) is short, so that a focus can be adjusted easily. More specifically, when the operation is shifted to an image pickup operation of an image for recording in the CMOS sensor 130 under the condition that the continuous focus operation is being performed based on the image data generated by the CMOS sensor 130, the movable mirror 121 is allowed to enter the optical path before the operation is shifted to the image pickup operation, whereby the autofocus operation based on the measurement results of the AF sensor 132 is performed.

When the halfway depression is cancelled before the user presses the release button 141 fully, the CPU 210 stops the autofocus operation based on the contrast.

Furthermore, in Step S1705, the photometric operation in the AF sensor 133 may be performed together with the autofocus operation.

Furthermore, various displays can be performed on the liquid crystal monitor 150 in Steps S1706 to S1711 in the same way as in Steps S1103 to S1107.

[1-2-4 Autofocus Operation During Shift to Live View Mode]

Figure 18:
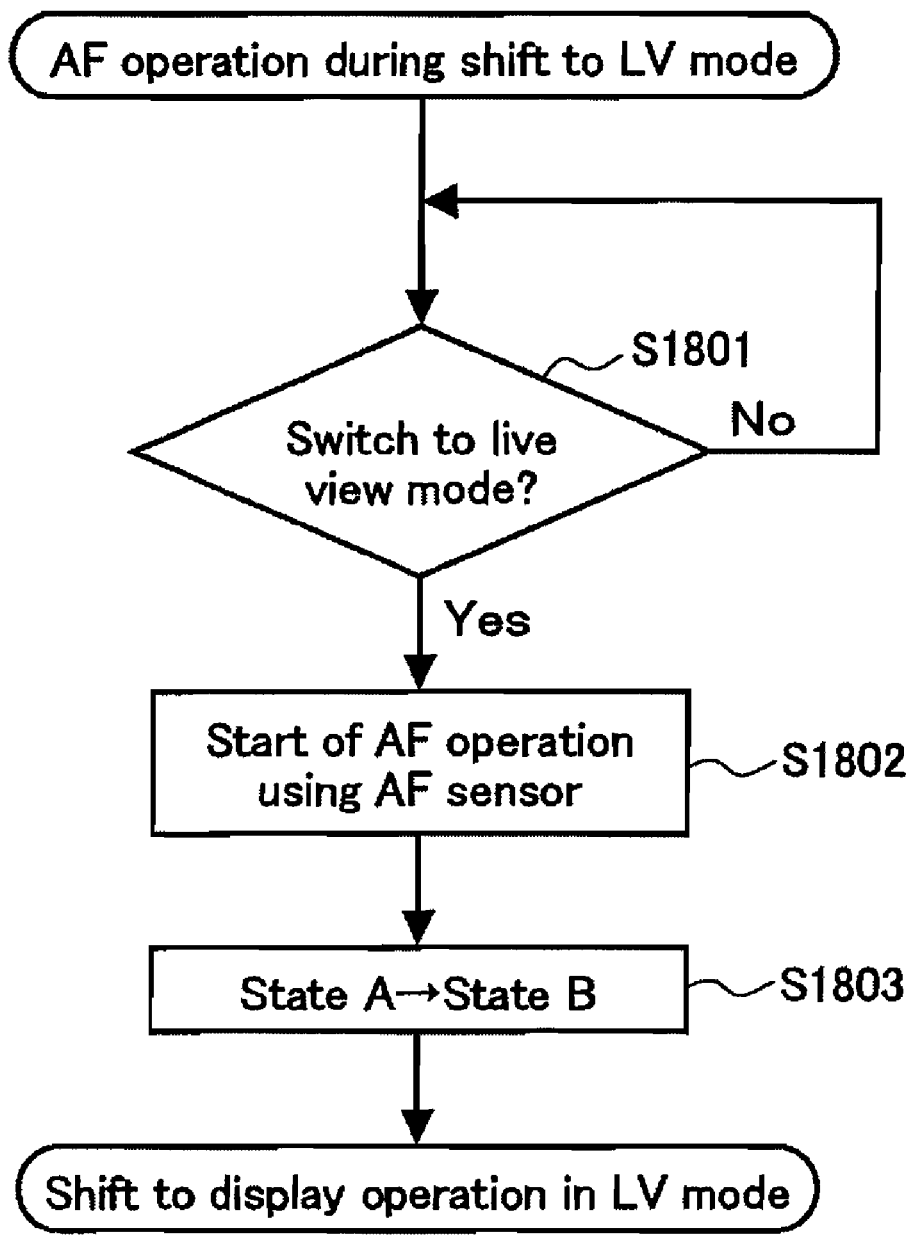
FIG. 18 is a flowchart illustrating an autofocus operation when an OVF mode is switched to the live view mode.

The camera 10 in Embodiment 1 performs an autofocus operation when the OVF mode is switched to the live view mode. FIG. 18 is a flowchart illustrating an autofocus operation during shift to the live view mode.

In FIG. 18, during the operation in the OVF mode, the microcomputer 110 monitors whether or not the viewfinder switch 140e can be switched (S1801).

When the viewfinder switch 140e is switched to the live view mode, the microcomputer 110 controls so that an autofocus operation is performed based on the measurement results of the AF sensor 132 (S1802).

When the autofocus operation is completed, the microcomputer 110 shifts the inside of the mirror box 120 from the state A to the state B (S1803). Then, the microcomputer 110 starts an operation in the live view mode.

As described above, the autofocus operation is performed when the OVF mode is switched to the live view mode, so that the observation of a subject image can be started on the liquid crystal monitor 150 under the condition that the subject is focused immediately after the start of a live view. Therefore, a period required from a time when the OVF mode is switched to the live view mode to a time when a composition is set can be shortened, so that the operability is satisfactory for the user.

In the flow shown in FIG. 18, the movable mirror 121 is moved up after the autofocus operation (S1802). However, the present invention is not limited thereto, and an autofocus operation can be performed after the movable mirror 121 is moved up. In this case, as the autofocus operation, it is preferable to perform the autofocus operation based on the image data generated by the CMOS sensor 130. This is because this autofocus operation can be performed under the condition that the movable mirror 121 is moved up.

Furthermore, in Step S1802, the photometric operation in the AE sensor 133 may be performed together with the autofocus operation.

Furthermore, in the flow shown in FIG. 18, after the autofocus operation is completed, the camera 10 is shifted to a live view mode. However, the present invention is not limited thereto, and the camera 10 may be shifted to the live view mode immediately after the measurement in the AF sensor 132. In this case, at least a part of the autofocus operation after the process of measuring a distance in the AF sensor 132 is performed in the live view mode. Because of this, the camera 10 can be shifted to the live view mode before the completion of the autofocus operation, so that a period from a time when the view finder switch 140e is switched to a time when the camera 10 is positioned in the live view mode can be shortened. Therefore, the operability is satisfactory for the user.

[1-2-5 Display of Distance-measuring Point]

Figure 19:
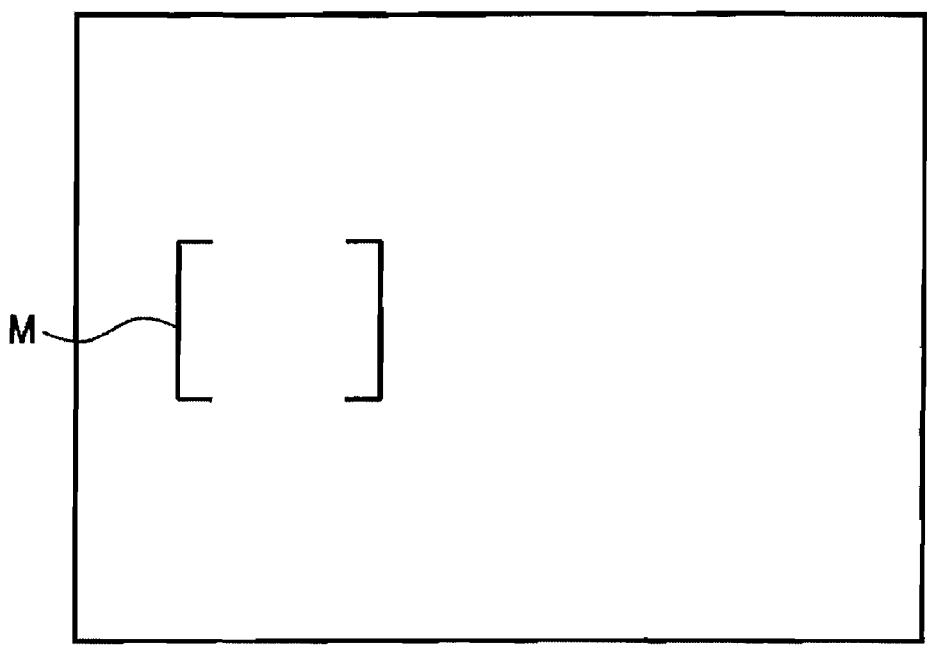
FIG. 19 is a schematic view showing a display screen displaying a focused point.

The camera 10 according to Embodiment 1 displays a focused point on the liquid crystal monitor 150 as shown in FIG. 19, when the movable mirror 121 is allowed to enter the optical path for an autofocus operation or the movable mirror 121 is allowed to enter the optical path for preparing for capturing an image for recording in the CMOS sensor 130.

The camera 10 cannot display a live view on the liquid crystal monitor 150 during the autofocus operation or the image pickup operation of an image for recording. Alternatively, even if a live view can be displayed for a short period of time, it is difficult to display it continuously. This point is as described above. In such a case, it is considered to display an image other than a live view on the liquid crystal monitor 150. In this case, it is difficult to check which point in a screen is focused currently. In the case where a live view cannot be displayed as in the autofocus operation or the image pickup operation of an image for recording, which point on the liquid crystal screen is focused is displayed.

Figure 20:
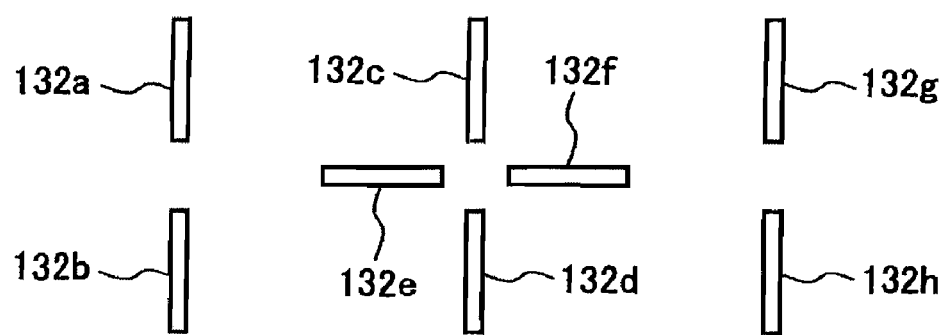
FIG. 20 is a schematic view showing the arrangement of line sensors included in an AF sensor.

The AF sensor 132 has a configuration including a line sensor, an imaging lens, a condenser lens, and the like. FIG. 20 is a schematic view showing the arrangement of line sensors 132a to 132g included in the AF sensor 132. As shown in FIG. 20, eight line sensors are placed. A defocus amount is measured by four sets: a line sensor 132a and a line sensor 132b; a line sensor 132c and a line sensor 132d; a line sensor 132e and a line sensor 132f, and a line sensor 132g and a line sensor 132h.

A method for calculating a defocus amount is as follows. A subject image incident from the interchangeable lens 200 is divided, and incident upon each pair of line sensors. Then, each pair of the line sensors 132a to 132g measures the defocus amount of the received subject image.

After that, the microcomputer 110 selects the largest defocus amount among those measured by each pair of the line sensors 132a to 132h. This means that a subject closest to the camera 10 is selected. Then, the microcomputer 110 transmits the selected defocus amount to the CPU 210, and displays, at a position on the screen of the liquid crystal monitor 150 corresponding to the selected pair of line sensors, information indicating that the position is selected as a point for autofocus. After that the CPU 210 performs autofocus control based on the information regarding the received distance.

For example, in the case where the microcomputer 110 determines that the defocus amount measured by the pair composed of the lines sensors 132a and 132b is largest, a mark M as shown in FIG. 19 is displayed at a position on the screen of the liquid crystal monitor 150 corresponding to the pair.

The mark M may be displayed when the movable mirror 121 is in the optical path. The mark M also may be displayed when the liquid crystal monitor 150 is in a blackout. Furthermore, before allowing the movable mirror 121 to entire the optical path, the image data stored in the buffer 111 may be read to be displayed, and the mark M may be displayed so as to overwrite the image.

As described above, in the case where an autofocus operation is performed when the movable mirror 121 is allowed to enter the optical path, the mark M representing the focused point is displayed on the screen of the liquid crystal monitor 154. Therefore, even if a live view is not displayed on the liquid crystal monitor 150, which subject is focused can be grasped. Particularly, in Steps S1505 to S1057 in FIG. 15, although a live view cannot be displayed until a predetermined time elapses, the mark M is displayed during a period in which a live view cannot be displayed, the operation state of the camera 10 can be shown to the user.

Furthermore, by allowing image data stored in the buffer 111 to be read and displayed before allowing the movable mirror 121 to enter the optical path, and displaying the mark M indicating an autofocus point so as to overwrite the image, which subject is focused can be easily grasped.

[1-2-6 Dust Automatic Removing Operation]

Figure 21:
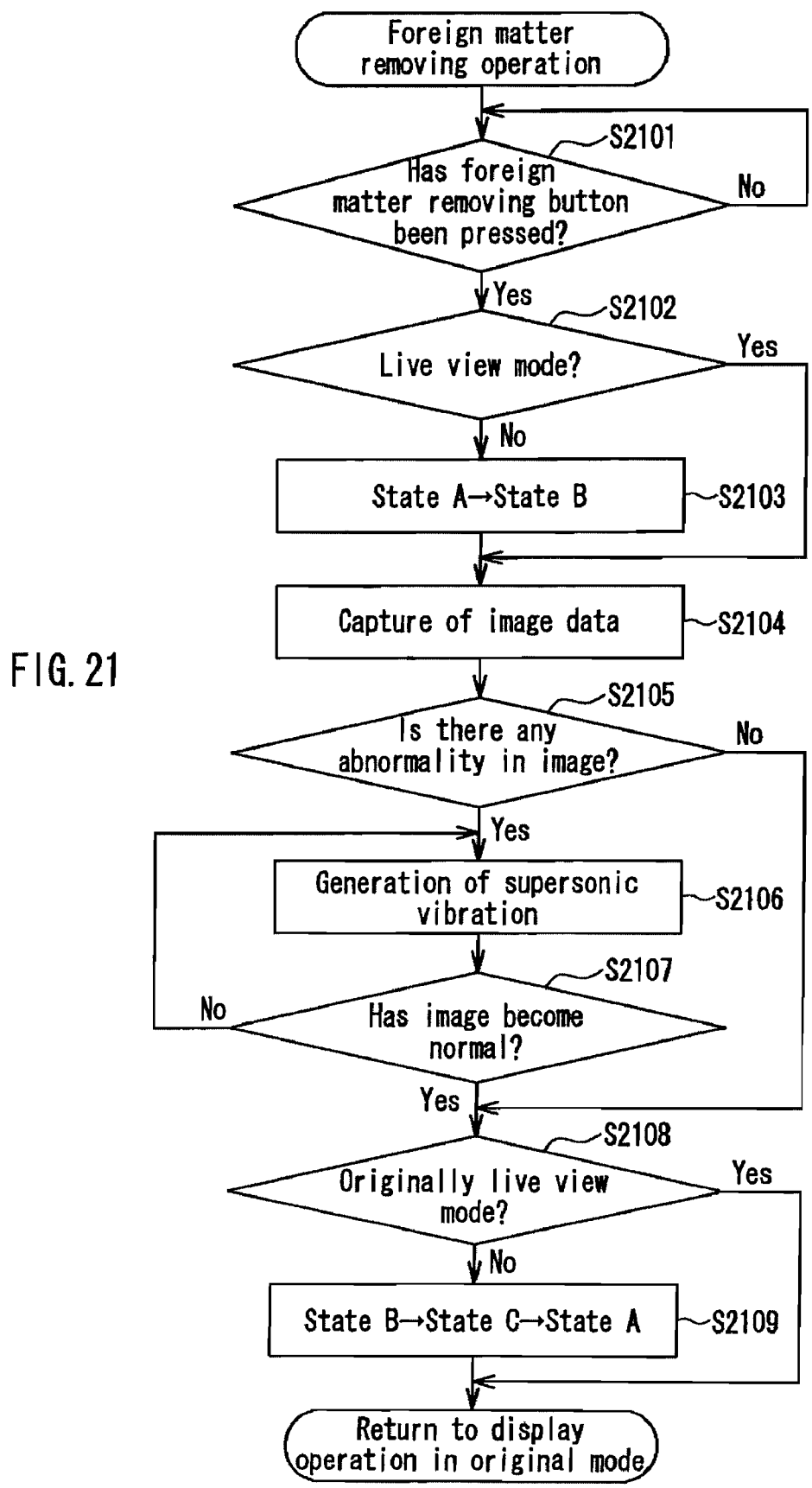
FIG. 21 is a flowchart illustrating an operation when foreign matter such as dust adhering to a protective material is removed using an supersonic vibration generator.

The camera 10 in Embodiment 1 can remove foreign matter such as dust adhering to the protective material 138 by the supersonic vibration generator 134. FIG. 21 is a flowchart illustrating the dust automatic removing operation.

In FIG. 21, the microcomputer 110 monitors whether or not a foreign matter removing button 140n is manipulated until the foreign matter automatic removing operation is started (S2101).

The user presses the foreign matter removing button 140m under the condition that the interchangeable lens 200 of the camera 10 is directed to a monochromic (e.g., white) subject. Then, the microcomputer 110 grasps whether or not a live view mode is set (S2102). The microcomputer 110 is shifted to Step 2104 in the case where the live view mode has already been set. On the other hand, in the case where the OVF mode is set, the microcomputer 110 shifts the inside of the mirror box 120 from the state A to the state B (S2103), and thereafter, is shifted to Step S2104.

In Step S2104, the microcomputer 110 allows the image data generated by the CMOS 140 or image data obtained by subjecting the image data generated by the CMOS 140 to predetermined processing to be stored in the buffer 111. Then, the microcomputer 110 reads the image data stored in the buffer 111, and determines whether the image data is abnormal or substantially uniform (S2105). The image data may be determined to be abnormal, for example, in the case where an integrated value of a spatial high-frequency component of the image data exceeds a predetermined value.

In the case where it is determined that the image data is abnormal in Step S2105, the microcomputer 110 determines that foreign matter adheres to the protective material 138 to activate the supersonic vibration generator 134 (S2106). The vibration generated by the supersonic vibration generator 134 is transmitted to the protective material 138, and in many cases, leaves the protective material 138. Consequently, when the foreign matter is displaced from the optical path, and the image data becomes normal, the supersonic vibration generator 134 is stopped, and the microcomputer 110 is shifted to Step S2108. On the other hand, when the image data remains abnormal, the operation of the supersonic vibration generator 134 is continued.

In Step S2108, the microcomputer 110 determines whether or not a live view mode is set before the foreign matter removing button 140n is manipulated (S2108). In the case where the live view mode has been set, the microcomputer 110 completes the foreign matter removing operation in the same state to continue the live view operation. On the other hand, in the case where the OVF mode has been set, the microcomputer 110 shifts the inside of the mirror box 120 from the state B to the state A via the state C, and is shifted to the operation in the OVF mode (S2109), and continues to be operated in that state.

As described above, by a simple operation of pressing the foreign matter removing button 140n, the live view mode is set, and it is detected whether or not the foreign matter adheres to the protective material 138, using the image data at that time. Because of this, the foreign matter adhering to the protective material 138 can be removed with a simple manipulation.

Furthermore, the supersonic vibration generator 134 is activated only when the captured image is abnormal, so that an excess burden is not applied to the mirror box 120. Since the mirror box 120 is precision optical equipment, the application of vibration and the like should be minimized in terms of the retention of optical characteristics. Similarly, when the image data returns to be normal, it is detected that the image data returns to a normal state, and the supersonic vibration generator 134 is stopped. Therefore, an excess burden is not applied to the mirror box 120, and the optical characteristics of the mirror box 120 can be retained satisfactorily.

In the above-mentioned example, although the supersonic vibration generator 134 is continued to be operated until the image data returns to be normal, the present invention is not limited thereto. For example, while the supersonic vibration generator 134 is operated until the image data becomes normal as in the above example within a predetermined time, when a predetermined time elapses, the supersonic vibration generator 134 may be stopped even if the image data remains abnormal. Because of this, the supersonic vibration generator 134 is continued to be operated, whereby an excess burden can be prevented from being applied to the mirror box 120.

In the above example, although it is monitored whether or not the image data becomes normal after the supersonic vibration generator 134 is operated, the present invention is not limited thereto. For example, the operation of the supersonic vibration generator 134 may be stopped when a predetermined time elapses, without monitoring whether or not the image data becomes normal after the supersonic vibration generator 134 is operated, and.

[1-2-7 Stroboscopic Image Pickup Operation in Live View Mode]

In FIG. 1, the camera 10 can perform two photometric systems. They are a system for performing photometry using the AE sensor 133 and a system for performing photometry using the CMOS sensor 130. The system for performing photometry using the AE sensor 133 is as described above. On the other hand, in the case of performing photometry using only the CMOS sensor 130, the AE sensor 133 can be omitted, so that cost can be reduced. Furthermore, in the case of using the CMOS sensor 130, the photometry operation can be performed even when the inside of the mirror box 120 is in the state B. Therefore, photometry can be performed during the live view operation, and the diaphragm 240 can be adjusted. The automatic adjustment of the diaphragm 240 using the CMOS sensor 130 may be performed continuously during the live view operation.

The user selects a selection item from a menu screen by pressing the menu button 140a, thereby being able to select photometry using only the AE sensor 133, photometry using both the AE sensor 133 and the CMOS sensor 130, and photometry using only the CMOS sensor 130 under a stroboscopic image pickup operation.

[1-2-7-1 Photometric Operation Using Only AE Sensor]

Figure 22:
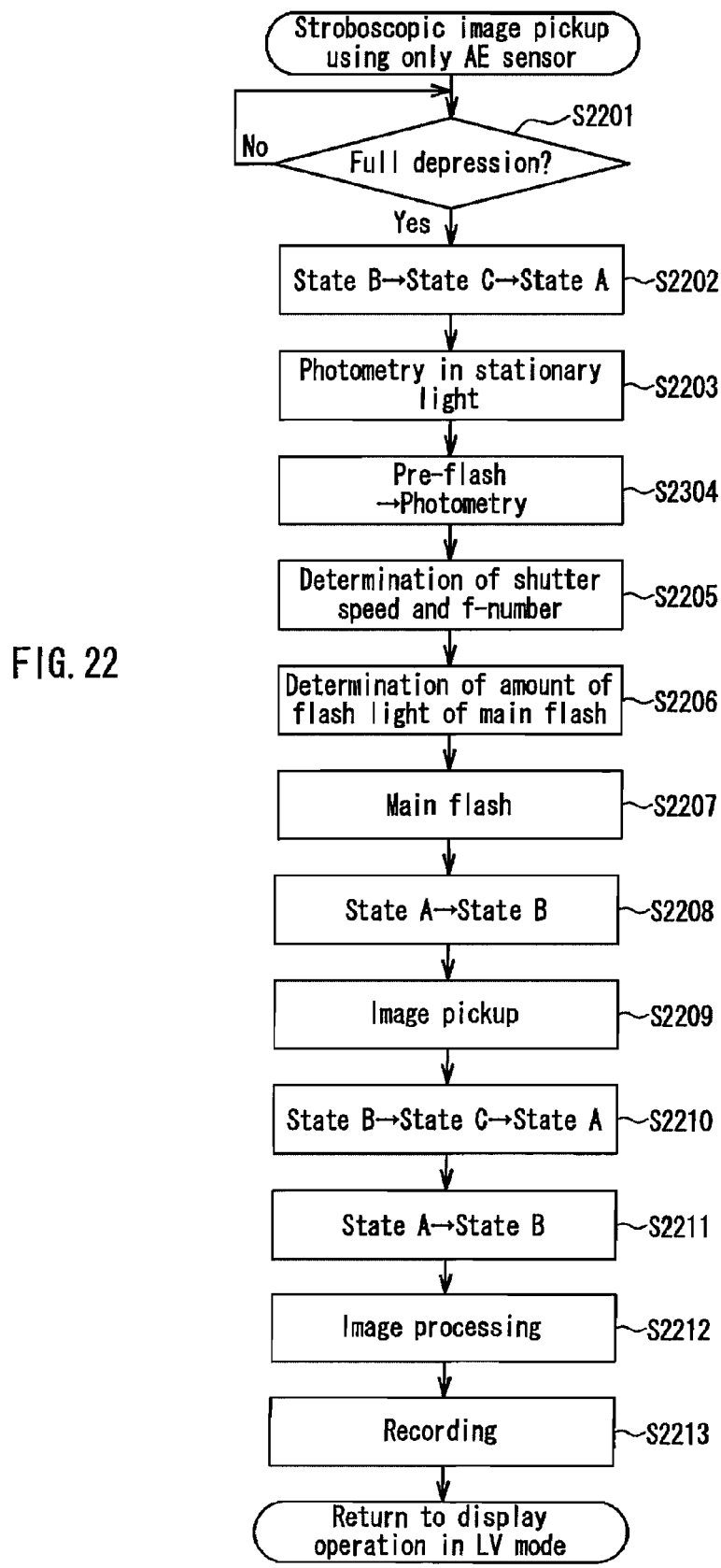
FIG. 22 is a flowchart illustrating a stroboscopic image pickup operation in the case of using only the AE sensor.

FIG. 22 is a flowchart illustrating a stroboscopic image pickup operation in the case of using only the AE sensor 133.

In FIG. 22, it is assumed that the microcomputer 110 originally is set in a live view mode. It also is assumed that a focus already has been locked by a manual manipulation or an autofocus operation. Furthermore, it is assumed that the strobe activation button 140h has been pressed by the user, and the strobe 137 has already been charged. Furthermore, it is assumed that the photometric system is set to the one using only the AE sensor 133 by the user.

In this state, the microcomputer 110 monitors whether or not the release button 141 is pressed fully (S2201). Then, when the release button 141 is pressed fully, the microcomputer 110 shifts the inside of the mirror box 120 from the state B to the state A via the state C (S2202).

Then, a part of light incident from the interchangeable lens 200 is reflected by the movable mirror 121a and diffused by the focusing glass 125, and a part of the resultant light is incident upon the AE sensor 133. The AE sensor 133 measures the incident light. More specifically, the AE sensor 133 measures stationary light (S2203). Then, the microcomputer 110 obtains the photometric results in the stationary light by the AE sensor 133.

Next, the microcomputer 133 controls the strobe 137 to allow it to perform pre-flash. The AE sensor 133 performs photometry during a pre-flash period. The microcomputer 110 obtains the photometric results of the AE sensor 133 during the pre-flash period.

The microcomputer 110 determines an f-number and a shutter speed based on the photometric results under the obtained stationary light and the photometric results under the pre-flash. For determining them, the microcomputer 110 compares the photometric results under the stationary light with the photometric light under the pre-flash, thereby grasping the illumination environment of a subject. For example, the microcomputer 110 determines an f-number and a shutter speed based on whether the subject is in a dark environment or in a backlight state, etc. The microcomputer 110 transmits the determined f-number to the CPU 210. The CPU 210 adjusts the diaphragm 240 based on the received f-number.

Furthermore, the microcomputer 110 determines the amount of flash light during the main flash by the strobe 137 in parallel with the determination of an f-number and a shutter speed in Step S2205 (S2206). Then, the microcomputer 110 transmits the determined amount of flash light to the strobe 137.

Next, the strobe 137 emits light with the received amount of flash light of the main flash (S2207). During the main flash period, the microcomputer 110 shifts the inside of the mirror box 120 from the state A to the state B (S2208), and starts an image pickup operation (S2209). The image pickup operation is performed during the shutter speed period determined in Step S2205.

The subsequent operations in Steps S2210 to S2213 are similar to those in Steps S1306 to S1309 and those in Steps 1414 to S1417, so that the description thereof will be omitted.

As described above, the inside of the mirror box 120 is set in the state A first from the live view mode, whereby the AE sensor 133 can perform photometry.

[1-2-7-2 Photometric Operation Using AE Sensor and CMOS Sensor]

Figure 23:
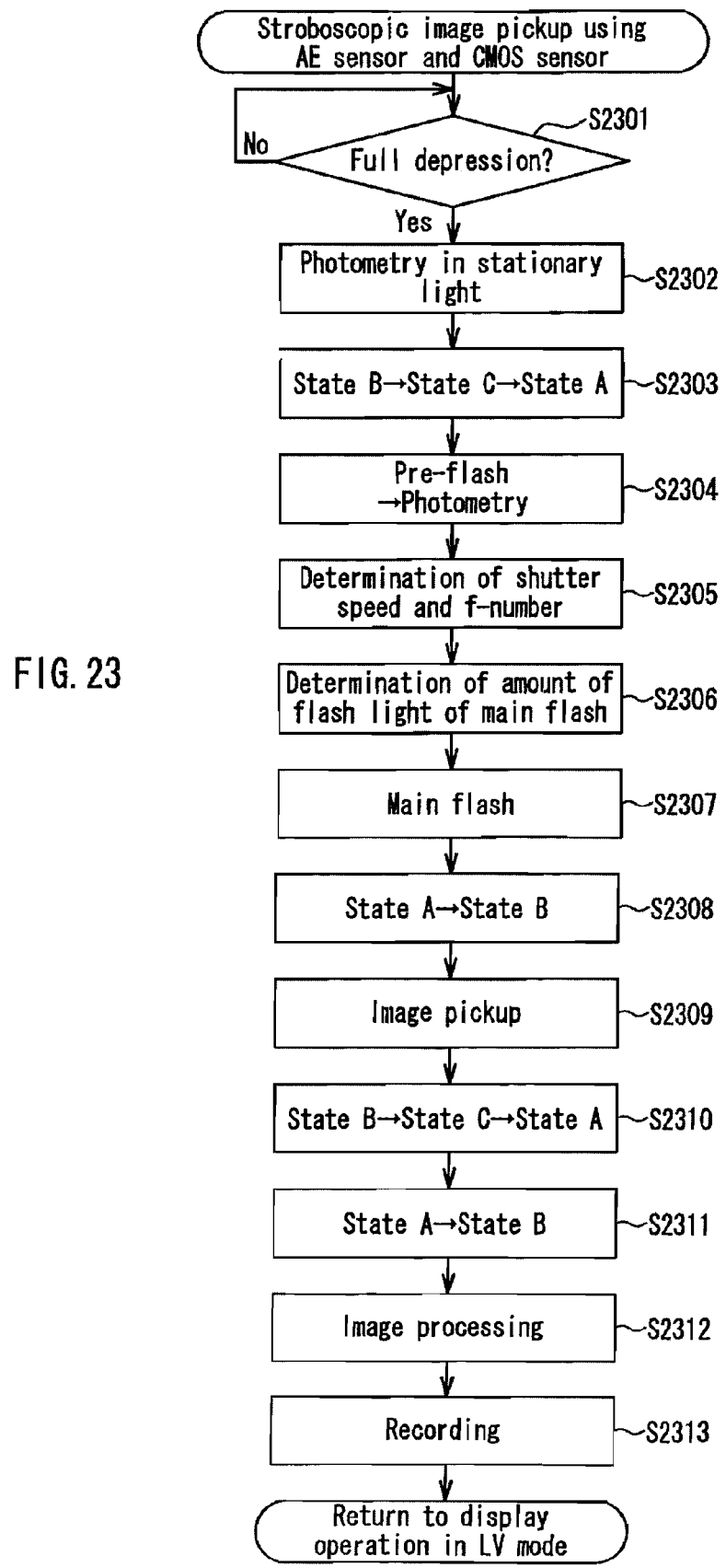
FIG. 23 is a flowchart illustrating a stroboscopic image pickup operation in the case of using the AE sensor and a CMOS sensor.

FIG. 23 is a flowchart illustrating a stroboscopic image pickup operation in the case of using the AE sensor 133 and the CMOS sensor 130. The original setting is the same as the above. More specifically, it is assumed that the microcomputer 110 is set in a live view mode. It also is assumed that a focus has already been locked by a manual manipulation or an autofocus operation. It is assumed that the strobe activation button 140h has been pressed by the user, and the strobe 137 has already been charged. It is assumed that the photometric system is set to the one using the AE sensor 133 and the CMOS sensor 130 by the user.

In FIG. 23, the microcomputer 110 monitors whether or not the release button 141 is pressed fully (S2301). Then, when the release button 141 has been pressed fully, the microcomputer 110 causes the CMOS sensor 130 to perform photometry in the live view mode. Thus, the CMOS sensor 130 performs photometry with respect to stationary light (S2302). Then, the microcomputer 110 obtains the measurement results in stationary light by the CMOS sensor 130.

Next, the microcomputer 130 shifts the inside of the mirror box 120 from the state B to the state A via the state C (S2303).

Then, a part of light incident from the interchangeable lens 200 is reflected by the movable mirror 121a and diffused by the focusing glass 125, and a part of the resultant light is incident upon the AE sensor 133. In this state, the microcomputer 133 controls the strobe 137 to allow it to perform pre-flash. The AE sensor 133 performs photometry during a pre-flash period (S2304). The microcomputer 110 obtains the photometric results of the AE sensor 133 during the pre-flash period.

The subsequent operations in Steps S2305 to S2313 are similar to those in Steps S2205 to 2213 in FIG. 22, so that the description thereof will be omitted.

As described above, the photometry of the stationary light is performed by the CMOS sensor 130, so that the photometry of the stationary light can be performed immediately after the full depression. Furthermore, the photometry of the pre-flash is performed by the AE sensor 133, so that the photometry of the pre-flash can be performed exactly. The reason why the photometry of the pre-flash can be performed exactly is that the AE sensor 133 has a larger allowable range of the amount of light to be measured, compared with the CMOS sensor 130. More specifically, the AE sensor 133 is produced so as to be dedicated to photometry, so that it can measure weak light to strong light exactly. In contrast, the CMOS sensor 130 is not an element for measuring the amount of light, but an element for generating image data. More specifically, the photometry in the CMOS sensor 130 merely is an accessory function involved in the function of generating image data. The main function of the CMOS sensor 130 is to generate image data, and the sub-function thereof is to perform photometry. Therefore, the CMOS sensor 130 is suitable for capturing an image of stationary light, but is not suitable for capturing an image of strong light. For example, when the CMOS sensor 130 receives strong light, the image data is saturated to become white frequently. On the other hand, during the pre-flash, the strobe 137 emits strong light, and light reflected from a subject may be strong. As described above during the pre-flash, more exact photometric data is obtained in many cases when photometry is performed by the AF sensor 133 instead of the CMOS sensor 130.

In the above example, although photometry of stationary light is performed (S2302) after the full depression (S2301), the present invention is not limited thereto. For example, the microcomputer 110 may perform photometry continuously using the CMOS sensor 130 until the release button 141 is pressed fully, and when the release button 141 is pressed fully, the photometric data on stationary light obtained immediately before the full depression may be used for determining an f-number, a shutter speed, and the amount of flash light of the main flash. Because of this, a time required from full depression to the image pickup operation can be shortened, so that the user is unlikely to let a shutter chance to slip away. Furthermore, the operability becomes satisfactory.

[1-2-7-3 Photometric Operation Using Only CMOS Sensor]

The stroboscopic image pickup operation in the case of using only the CMOS sensor 130 will be described with reference to FIG. 23.

In FIG. 23, in the case of using the AE sensor 133 and the CMOS sensor 130, after the inside of the mirror box 120 is shifted from the state B to the state A via the state C (S2303), photometry is performed during pre-flash (S2304).

In contrast, in the case of using only the CMOS sensor 130, after the photometry during pre-flash is performed (S2304), the inside of the mirror box 120 is shifted from the state B to the state A via the state C (S2303). Because of this, the photometry of stationary light and the photometry of pre-flash can be performed using only the CMOS sensor 130. The other operations are similar to those in the case of using the AE sensor 133 and the CMOS sensor 130, so that the description thereof will be omitted.

As described above, the inside of the mirror box 120 is shifted from the state B to the state A via the state C, waiting for the photometry of pre-flash, so that both the photometry of stationary light and the photometry of pre-flash can be performed only using the CMOS sensor 130. This enables the AE sensor 133 to be omitted, so that the cost can be reduced.

In the above example, although the photometry of stationary light is performed (S2302) after the full depression (S2301), the present invention is not limited thereto. For example, the microcomputer 110 may perform photometry continuously using the CMOS sensor 130 until the release button 141 is pressed fully, and when the release button 141 has been pressed fully, the photometric data on stationary light obtained immediately before the full depression may be used for determining an f-number, a shutter speed, and the amount of flash light of main flash. Because of this, a time required from the full depression to the image pickup operation can be shortened, so that the user is unlikely to let a shutter chance to slip away. Furthermore, the operability becomes satisfactory.

[1-2-8 Reset Operation in Live View Mode]

In a live view mode, when a shock is applied to the camera 10 from the outside, the retention state of the second shutter 123b is cancelled, and the inside of the mirror box 120 may be shifted from the state B to the state C. Then, an optical signal from the interchangeable lens 200 is interrupted by the second shutter 123b, and does not reach the CMOS sensor 130. Then, the liquid crystal monitor 150 that has displayed a subject image in a live view until then does not display anything due to the shock. The user who sees it may misunderstand that the camera 10 is out of order.

In order to prevent such inconvenience, a configuration provided with a sensor for monitoring whether or not the retention state of the second shutter 123b is cancelled is considered. However, if such a sensor is provided, cost increases. When shock is applied to the camera 10, the shock is detected and the live view mode is reset, whereby the above-mentioned inconvenience can be prevented. The reason why the above-mentioned inconvenience can be prevented is that the retention state of the second shutter 123b may be cancelled.

Figure 24:
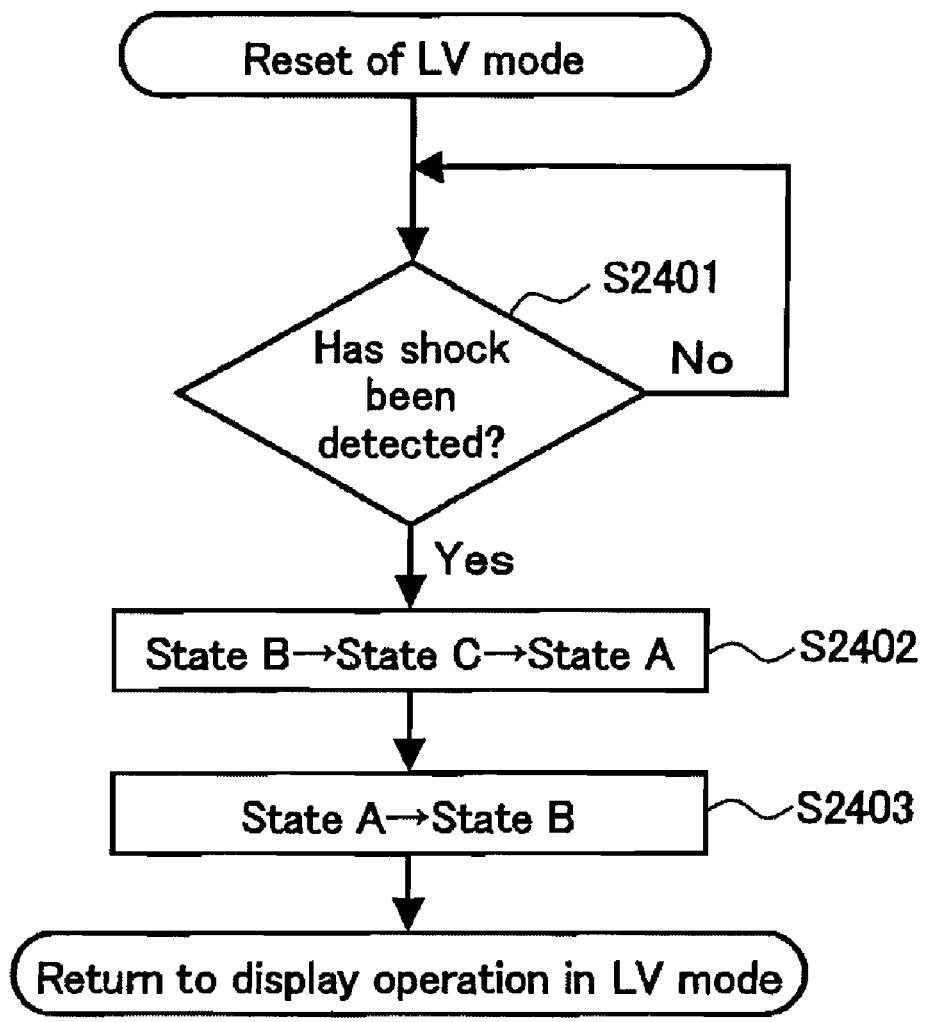
FIG. 24 is a flowchart illustrating an operation when the live view mode is reset by shock.

FIG. 24 is a flowchart illustrating the operation when the live view mode is reset due to shock.

In FIG. 24, it is assumed that the microcomputer 110 originally is operated in a live view mode. In this state, the microcomputer 110 monitors whether or not shock is applied to the camera 10 (S2401). The operation of monitoring the application of shock will be described in detail.

In FIG. 4, the gyrosensor 252 measures an angular speed continuously. The CPU 210 integrates the angular speed measured by the gyrosensor 252 to obtain an angle. The CPU 210 uses the obtained angle for controlling hand shaking correction in the hand shaking correction unit 250, and monitors a change amount per predetermined time of the obtained angle. Then, when the change amount reaches a predetermined value or larger, the CPU 210 notifies the microcomputer 110 that the change amount reaches a predetermined value or larger. Upon receiving this notification, the microcomputer 110 determines that a shock has been applied to the camera 10.

In FIG. 24, when the microcomputer 110 detects a shock, the microcomputer 110 shifts the inside of the mirror box 120 from the state B to the state A via the state C (S2402). After that, the microcomputer 110 shifts the inside of the mirror box 120 from the state A to the state B, whereby the camera 10 returns to a live view.

As described above, the shock applied to the camera 10 is detected, and the live view mode is reset, so that the camera 10 can be recovered from the state in which a live view display is interrupted by the shock automatically. This can prevent the user from misunderstanding that the camera 10 is out of order. Furthermore, when a live view display is interrupted, an operation for recovering the live view display manually is not required, so that the operability is satisfactory.

Furthermore, as the sensor for detecting shock, the gyrosensor 252 for correcting hand shaking is used. Therefore, it is not necessary to provide a sensor particularly for detecting shock, whereby cost can be reduced and equipment can be miniaturized.

In the present example, although the CPU 210 monitors the change amount per predetermined time of an angle so as to detect shock, the present invention is not limited thereto. For example, the CPU 210 directly may monitor angular speed information from the gyrosensor 252. The reason for monitoring in such a manner is as follows: it can be determined that shock is applied in the case where an angular speed is large.

Furthermore, in the present example, as the sensor for detecting shock, the gyrosensor 252 for correcting hand shaking is used, but the present invention is not limited thereto. For example, a sensor for shock may be provided.

Embodiment 2

The camera 10 in Embodiment 1 switches an OVF mode to a live view mode by a manual manipulation of the viewfinder switch 140e. However, it is inconvenient if the OVF mode cannot be switched to the live view mode without a manual manipulation at all times. Particularly, in the case where it is highly necessary to switch to the live view mode, if the OVF mode can be switched to the live view mode automatically, the operability of the user can be enhanced. In Embodiment 2, a camera capable of switching to the live view mode automatically in accordance with various events is realized.

The configuration of the camera 10 in Embodiment 2 is similar to that of the camera 10 in Embodiment 1, so that the description thereof will be omitted.

[2-1 Operation of Shifting to Live View Mode by Diaphragm Adjustment]

In the above-mentioned Embodiment 1, in order to observe a depth of field when an image for recording is captured in a live view mode, the stop-down button 140k and the LV preview button 140j were provided. Consequently, regarding a subject image when an image for recording is captured, the depth of field thereof can be observed instantaneously using the liquid crystal monitor 130, so that the operability is satisfactory. However, in Embodiment 1, the stop-down button 140k and the LV preview button 140j become effective when the microcomputer 110 is set in the live view mode. Therefore, in order to observe a depth of field when an image for recording is captured in an OVF mode, it is necessary to switch to the live view mode once manually, and thereafter, press the stop-down button 140k or the LV preview button 140j. The camera 10 shown in Embodiment 2 solves this problem.

Figure 25:
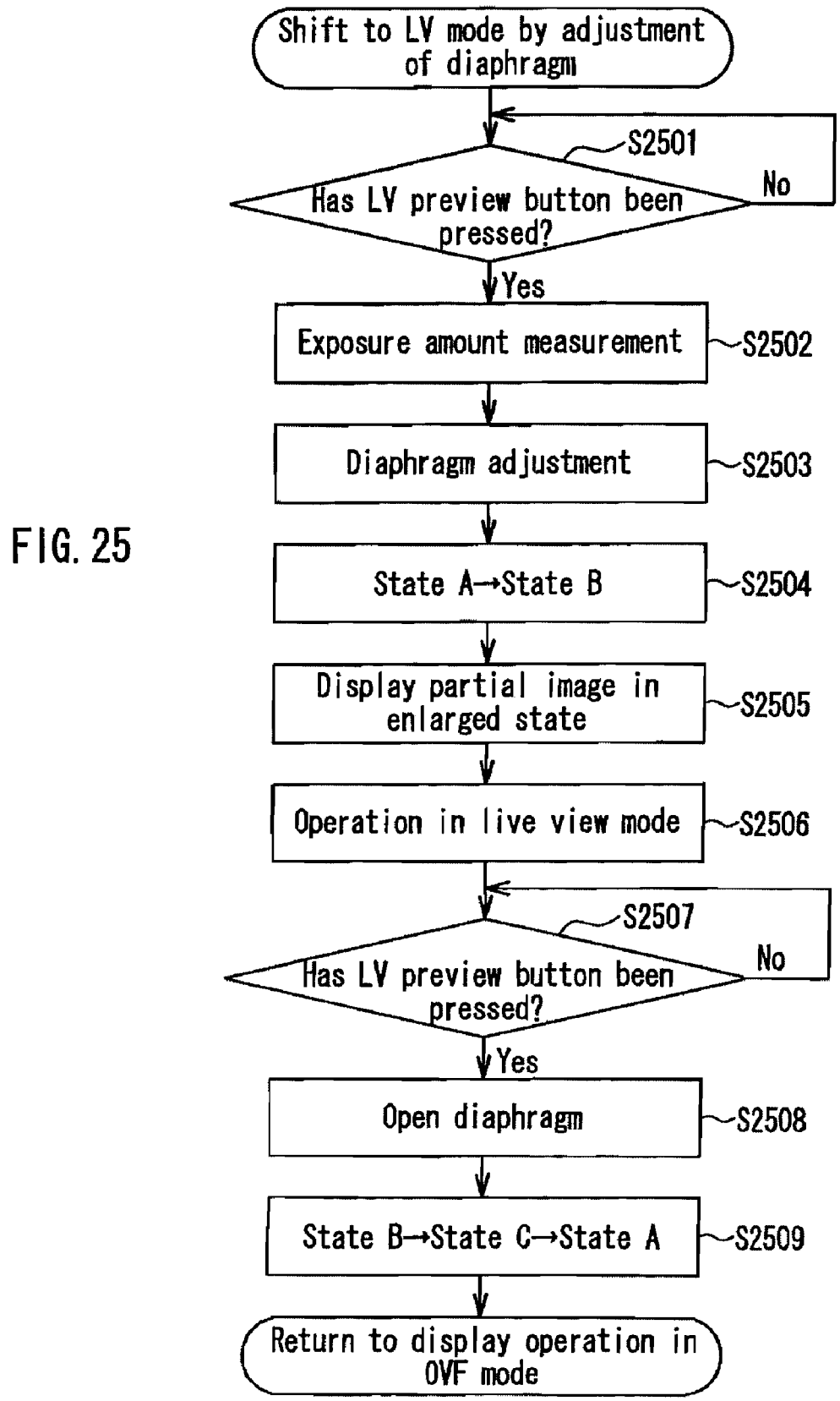
FIG. 25 is a flowchart illustrating an operation when an LV preview button is pressed in the OVF mode.

FIG. 25 is a flowchart illustrating an operation when the LV preview button 140j is pressed in the OVF mode.

In FIG. 25, the microcomputer 110 originally is set in the OVF mode. At this time, the inside of the mirror box 120 is in the state A shown in FIG. 1. Furthermore, the microcomputer 110 monitors whether or not the LV preview button 140j is pressed (S2501).

When the user presses the LV preview button 140j in this state, the microcomputer 110 detects it, and starts measuring an exposure amount using the AE sensor 133 (S2502).

The microcomputer 110 transmits the measurement results to the CPU 210. The CPU 210 calculates an appropriate aperture value of the diaphragm 240 when an image for recording is captured, based on the received measurement results and the current opened state of the diaphragm 240. Then, the CPU 210 controls the motor 241 based on the calculated results. The motor 241 adjusts the diaphragm 240 based on the control of the CPU 210 (S2503).

Next, the microcomputer 110 shifts the inside of the mirror box 120 from the state A to the state B (S2504).

Next, as shown in FIG. 10, the microcomputer 110 displays a region R2 that is a part of the image data generated by the CMOS sensor 130 in an enlarged state (S2505). The part in a screen that is set to be the enlarged region R2 can be changed by manipulating the cross key 140b or the like.

Next, the microcomputer 110 continues a live view operation (S2506).

The microcomputer 110 monitors whether or not the LV preview button 140j is pressed again during the live view operation (S2507).

When the LV preview button 140j has been pressed again, the microcomputer 110 allows the CPU 210 to open the diaphragm 240 (S2508).

Next, the microcomputer 110 shifts the inside of the mirror box 120 from the state B to the state A via the state C (S2509). This can return the camera 10 to the state before the LV preview button 140j is pressed first.

As described above, even if the camera 10 is in the OVF operation, owing to a simple operation of the LV preview button 140j, the camera 10 can be shifted to the live view mode, and the depth of field of an image for recording can be checked easily in a live view display.

In Embodiment 2, the case where the LV preview button 140j is pressed in the OVF mode has been described. However, this description also applies to the case where the stop-down button 140k is pressed in the OVF mode except for the following: in the case where the LV preview button 140j is pressed, the region R2 that is a part of the image data is displayed in an enlarged state as described above, whereas in the case where the stop-down button 140k is pressed, such an enlarged display is not performed.

[2-2 Operation of Shifting to Live View Mode by Remote Control Manipulation]

As shown in FIG. 2, the remote control receiving portion 155 is capable of receiving a control signal from a remote controller (not shown). In the case of receiving a control signal from the remote controller (not shown), the user is operating at a distance from the camera 10 in many cases. At this time, it is inconvenient to observe a subject image with an optical viewfinder. Therefore, in the case of manipulating with the remote controller (not shown), the user switches to the live view mode with the viewfinder switch 140e in many cases. However, when manipulating with the remote controller (not shown), it is inconvenient to switch to the live view mode manually. In the camera 10 according to Embodiment 2, when the remote control receiving portion 155 receives a control signal from the remote controller, the microcomputer 110 is shifted to the live view mode.

Figure 26:
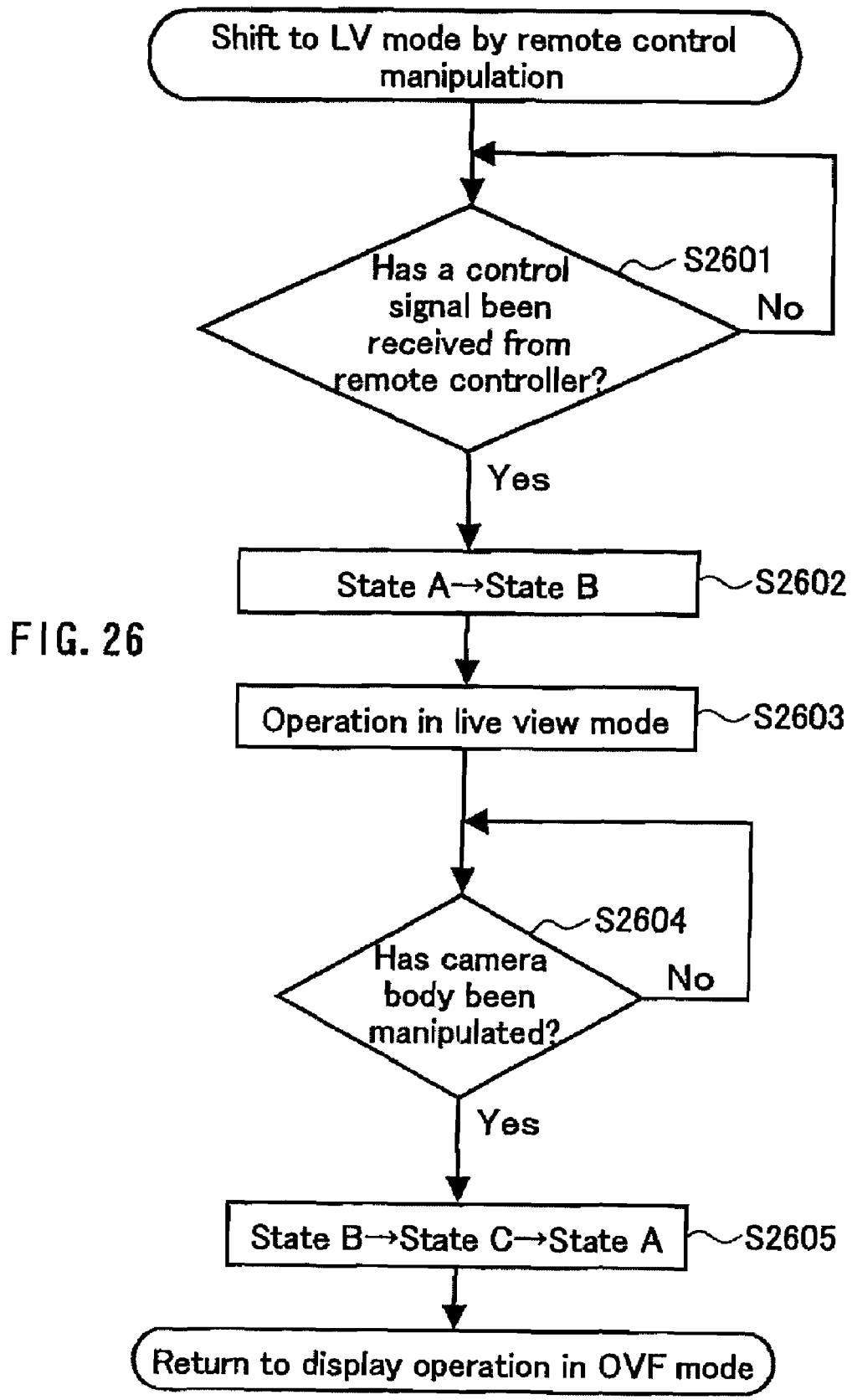
FIG. 26 is a flowchart illustrating an operation at a time of shift to the live view mode due to a remote control manipulation.

FIG. 26 is a flowchart illustrating an operation in the case of shifting to the live view mode by a remote control operation.

In FIG. 26, the microcomputer 110 originally is set in the OVF mode. At this time, the inside of the mirror box 120 is in the state A shown in FIG. 1. Furthermore, the microcomputer 110 monitors whether or not the remote control receiving portion 155 receives a control signal from the remote controller (not shown) (S2601).

When the remote control receiving portion 155 receives a control signal from the remote controller (not shown) in this state, the microcomputer 110 shifts the inside of the mirror box 120 from the state A to the state B (S2602).

After that, the microcomputer 110 continues a live view operation (S2603).

The microcomputer 110 monitors whether or not the manipulation portion 140, the release button 141, and the like of the camera body 100 are operated during the live view operation (S2604).

When the user manipulates either one of them, the microcomputer 110 shifts the inside of the mirror box 120 from the state B to the state A via the state C (S2605). Consequently, the camera 10 can be returned to the state before receiving the control signal of the remote controller first.

As described above, even if the camera 10 is in the OVF operation, the camera 10 can be shifted to the live view mode in accordance with the manipulation of the remote controller. This saves time and labor for switching to the live mode manually, resulting in the enhancement of the operability.

The remote control receiving portion 155 may be provided on the front and back surfaces of the camera body 100. In this case, in the case where the remote control receiving portion 155 on the front surface receives a control signal in the OVF mode, the camera 10 is not shifted to the live view mode. On the other hand, in the case where the remote control receiving portion 155 on the back surface receives a control signal, the camera 10 may be shifted to the live view mode. In the case where the remote control receiving portion 155 provided on the front surface of the camera body 100 receives a control signal, the user is positioned in front of the camera 10, and is not observing the liquid crystal monitor 150 in many cases. On the other hand, in the case where the remote control receiving portion 155 provided on the back surface of the camera body 100 receives a control signal, the user is positioned at the back of the camera 10, and is observing the liquid crystal monitor 150 in many cases. Therefore, due to the above-mentioned operation, in the case where the user is not watching the liquid crystal monitor 150, excess power is not consumed by the liquid crystal monitor 150 and the like, which results in the reduction in power consumption.

[2-3 Operation of Shifting to Live View Mode by Fixing Tripod]

As shown in FIG. 2, the camera body 100 can be fixed to a tripod (not shown) via the tripod fixing portion 147. In the case of capturing an image by fixing the camera body 100 to the tripod (not shown), an image can be grasped easier when the image is captured with the electronic viewfinder (liquid crystal monitor 150) with a large screen size, rather than capturing the image with the optical viewfinder. However, when the camera body 100 is fixed to the tripod, it is inconvenient to switch to the live view mode manually. In the camera 10 according to Embodiment 2, when the tripod is fixed to the tripod fixing portion 147, the microcomputer 110 is shifted to the live view mode.

Figure 27:
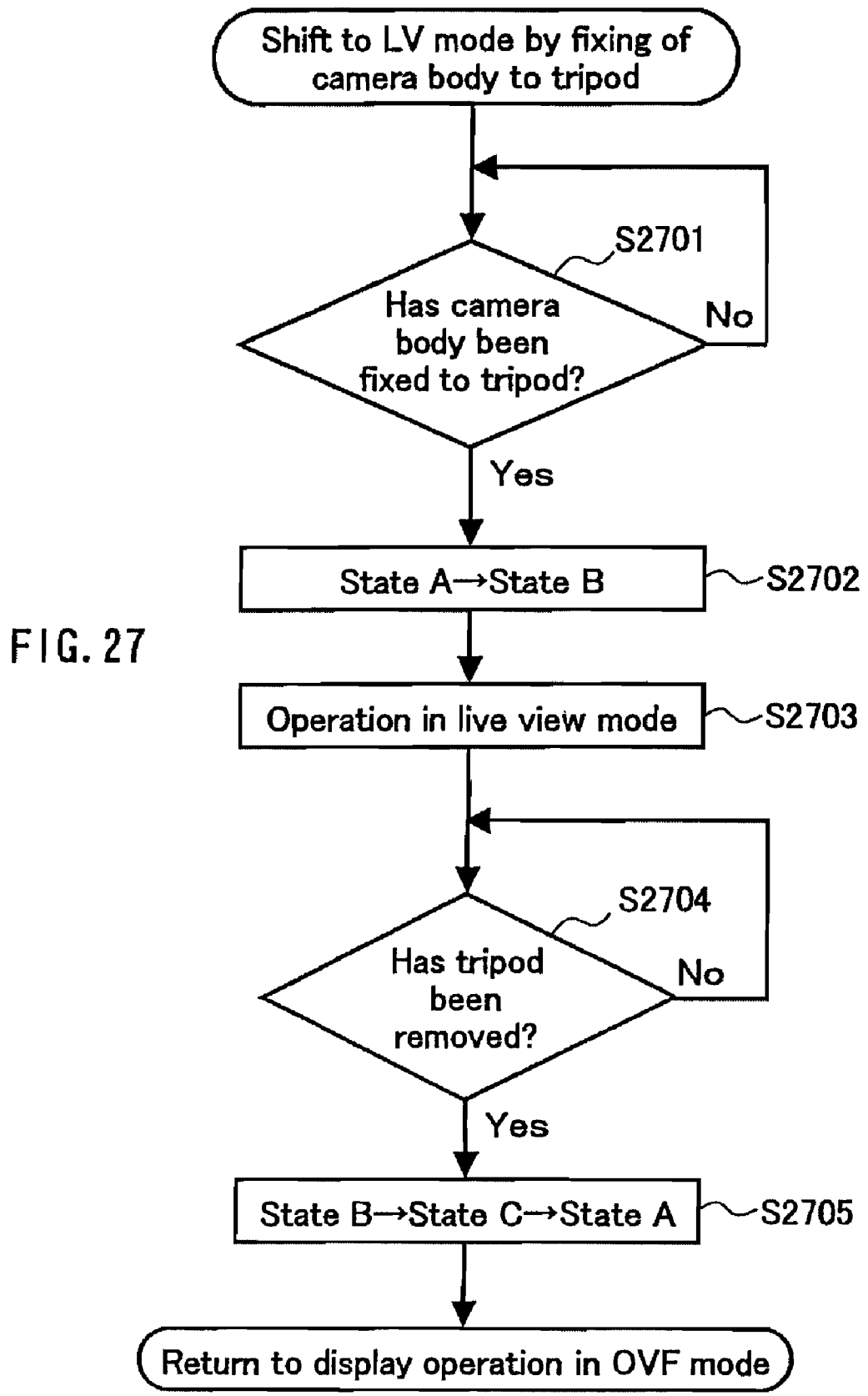
FIG. 27 is a flowchart illustrating an operation when the camera is shifted to the live view mode by being fixed to a tripod.

FIG. 27 is a flowchart illustrating an operation in the case of shift to the live view mode by fixing the camera body 100 to the tripod.

In FIG. 27, the microcomputer 110 originally is set in the OVF mode. At this time, the inside of the mirror box 120 is in the state A shown in FIG. 1. Furthermore, the microcomputer 110 monitors whether or not the contact point 148 transmits information indicating that the tripod is fixed to the tripod fixing portion 147 (S2701). When the contact point 148 detects that the camera body 100 is fixed to the tripod in this state, the microcomputer 110 shifts the inside of the mirror box 120 from the state A to the state B (S2702). After that, the microcomputer 110 continues the live view operation (S2703).

The microcomputer 110 monitors whether or not the contact point 148 transmits information indicating that the tripod is removed during the live view operation (S2704). When the contact point 148 detects that the tripod is removed, the microcomputer 110 shifts the inside of the mirror box 120 from the state B to the state A via the state C (S2705). This can return the camera 10 to the state before the camera body 100 is fixed to the tripod.

As described above, even when the camera 10 is in the OVF operation, the camera 10 can be shifted to the live view mode in accordance with the fixation of the tripod. This saves time and labor for switching to the live view mode manually, which enhances the operability.

In the above, after being fixed to the tripod, the camera 10 is shifted to the live view mode. However, an autofocus operation may be performed along with the shift to the live view. The autofocus operation may be of a phase difference detection system using the AF sensor 132, or a contrast system using the CMOS sensor 130. Because of this, when an image is captured using the tripod, a focus can be adjusted to a subject quickly.

Furthermore, the autofocus operation may be performed immediately after the camera 10 is fixed to the tripod, or after a predetermined time elapses from the fixation to the tripod. The autofocus operation is performed after the elapse of a predetermined time, whereby a subject can be focused after the camera 10 comes to a standstill exactly. Therefore, the camera 10 can be prevented from moving during focusing to make it necessary to perform focusing again.

Furthermore, when the live view mode is set under the condition that the camera 10 is fixed to the tripod and is operated in the OVF mode, an autofocus operation may be performed once, and thereafter, the camera 10 may be shifted to the live view mode. Consequently, a subject can be focused rapidly when an image is captured with the tripod.

Furthermore, in the above, the camera 10 is shifted to the live view mode when it is fixed to the tripod. However, unlike this, the camera 10 may be shifted to the live view mode in accordance with the detection results of the gyrosensor 252. When the output of the gyrosensor 252 is small and it is determined that the camera 10 is at a standstill, the camera 10 is shifted to the live view mode. When it can be determined that the camera 10 is at a standstill, the user leaves the camera 10 at an immovable place without holding it in many cases. In the case where the user does not hold the camera 10, it is easier to observe a subject in a live view mode, rather than observing the subject in the OVF mode. Therefore, the camera 10 is shifted to the live view mode when it is determined that the camera 10 is at a standstill. This saves time and labor for switching to the live view mode manually, which enhances the operability. The gyrosensor 252 is an example of the shaking detection portion of the present invention.

Even in this case, an autofocus operation may be performed along with the shift to the live view. Because of this, a subject can be focused rapidly when the camera 10 comes to a standstill.

Furthermore, the autofocus operation may be performed immediately after it is determined that the camera 10 comes to a standstill, or after a predetermined time elapses from the determination. The autofocus operation is performed after an elapse of a predetermined time, whereby a subject can be focused after the camera comes to a standstill exactly. Therefore, the camera 10 can be prevented from moving during focusing, which makes it necessary to perform focusing again.

Furthermore, when the live view mode is set under the condition that the camera 10 is allowed to come to a standstill and is operated in the OVF mode, an autofocus operation may be performed once, and thereafter, the camera 10 may be shifted to the live view mode. Because of this, a subject can be focused rapidly when the camera 10 is allowed to come to a standstill.

[2-4 Operation of Shifting to Live View Mode by Rotation of Liquid Crystal Monitor]

The liquid crystal monitor 150 can rotate as described above. In the case of rotating the liquid crystal monitor 150, the user observes a subject image displayed on the liquid crystal monitor 150 in many cases. However, it is inconvenient to switch to the live view mode manually, when the liquid crystal monitor 150 is rotated. In the camera 10 according to Embodiment 2, when the liquid crystal monitor 150 is rotated, the microcomputer 110 is shifted to the live view mode.

Figure 28:
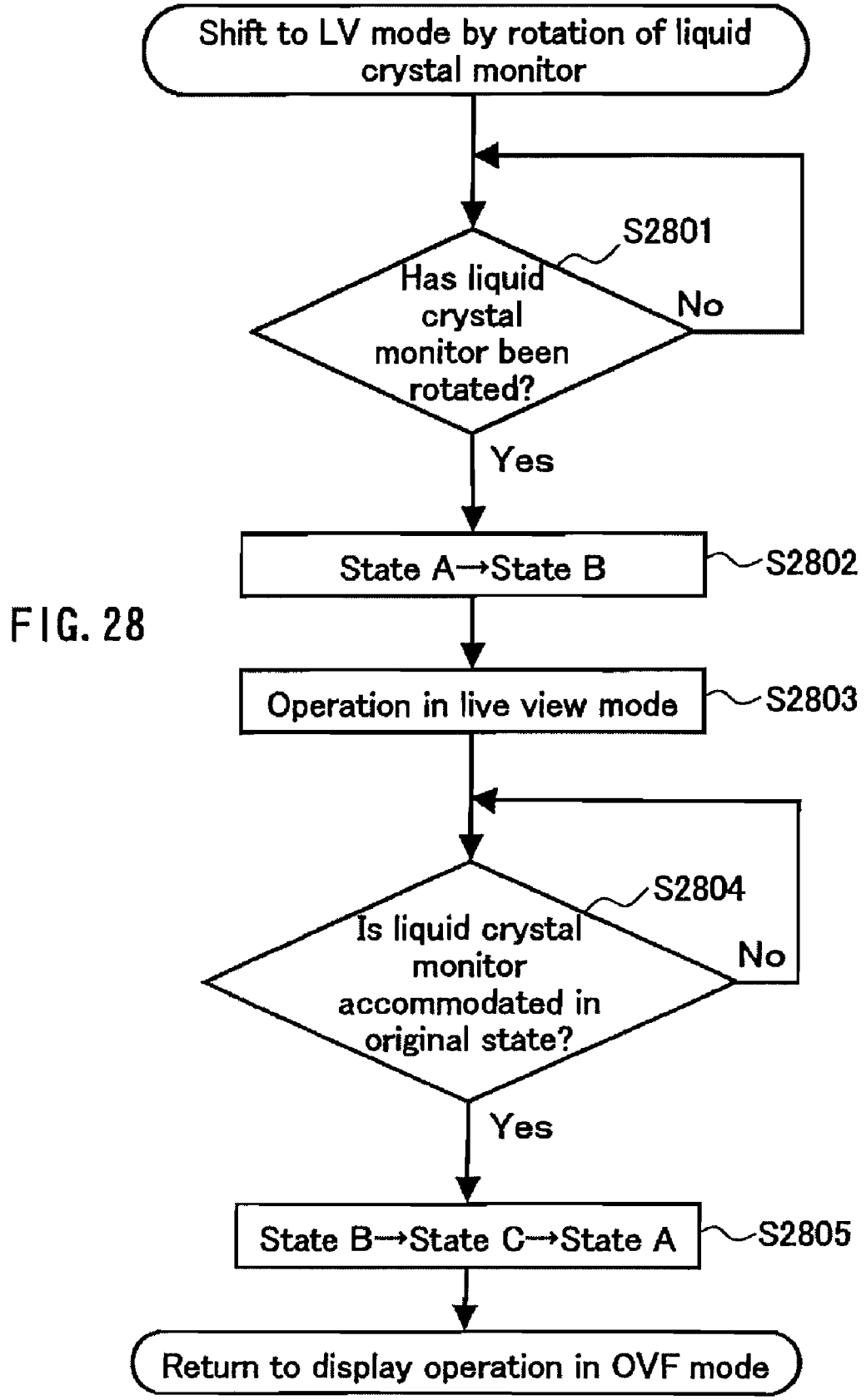
FIG. 28 is a flowchart illustrating an operation when the camera is shifted to the live view mode by rotating the liquid crystal monitor.

FIG. 28 is a flowchart illustrating an operation at a time of shift to the live view mode due to the rotation of the liquid crystal monitor 150.

In FIG. 28, the microcomputer 110 originally is set in the OVF mode. Furthermore, the liquid crystal monitor 150 is accommodated with the liquid crystal screen directed to the back surface of the camera body 100 or with the reverse surface of the liquid crystal screen directed to the back surface of the camera body 100. At this time, the inside of the mirror box 120 is in the state A shown in FIG. 1. Furthermore, the microcomputer 110 monitors whether or not the contact point 151 detects the rotation of the liquid crystal monitor 150 (S2801). When the contact point 151 detects the oration of the liquid crystal monitor 150 in this state, the microcomputer 110 shifts the inside of the mirror box 120 from the state A to the state B (S2802). After that, the microcomputer 110 continues the live view operation (S2803).

The microcomputer 110 monitors whether or not the liquid crystal monitor 150 is accommodated in an original state during the live view operation (S2804). When the liquid crystal monitor 150 is accommodated in the original state, the microcomputer 110 shifts the inside of the mirror box 120 from the state B to the state A via the state C (S2805). Because of this, the camera 10 can be returned to the state before the liquid crystal monitor 150 is rotated.

As described above, even if the camera 10 is in the OVF operation, the camera 10 can be shifted to the live view mode in accordance with the rotation of the liquid crystal monitor 150. This saves time and labor for switching to the live view mode manually, which enhances the operability.

[2-5 Operation of Shifting to Live View Mode by Connection of External Terminal]

As described above, the camera 10 can output an image displayed in a live view by connecting a terminal from an external apparatus (not shown) to the external terminal 152. In the case of outputting a live view display to the external apparatus, it is necessary to form a subject image on the CMOS sensor 130. More specifically, this is because it is necessary that the subject image is converted to image data with the CMOS sensor 130. However, when the live view display is outputted to the external apparatus, it is inconvenient to switch to the live view mode manually. In the camera 10 according to Embodiment 2, when a terminal from the external apparatus (not shown) is connected to the external terminal 152, the microcomputer 110 is shifted to the live view mode.

Figure 29:
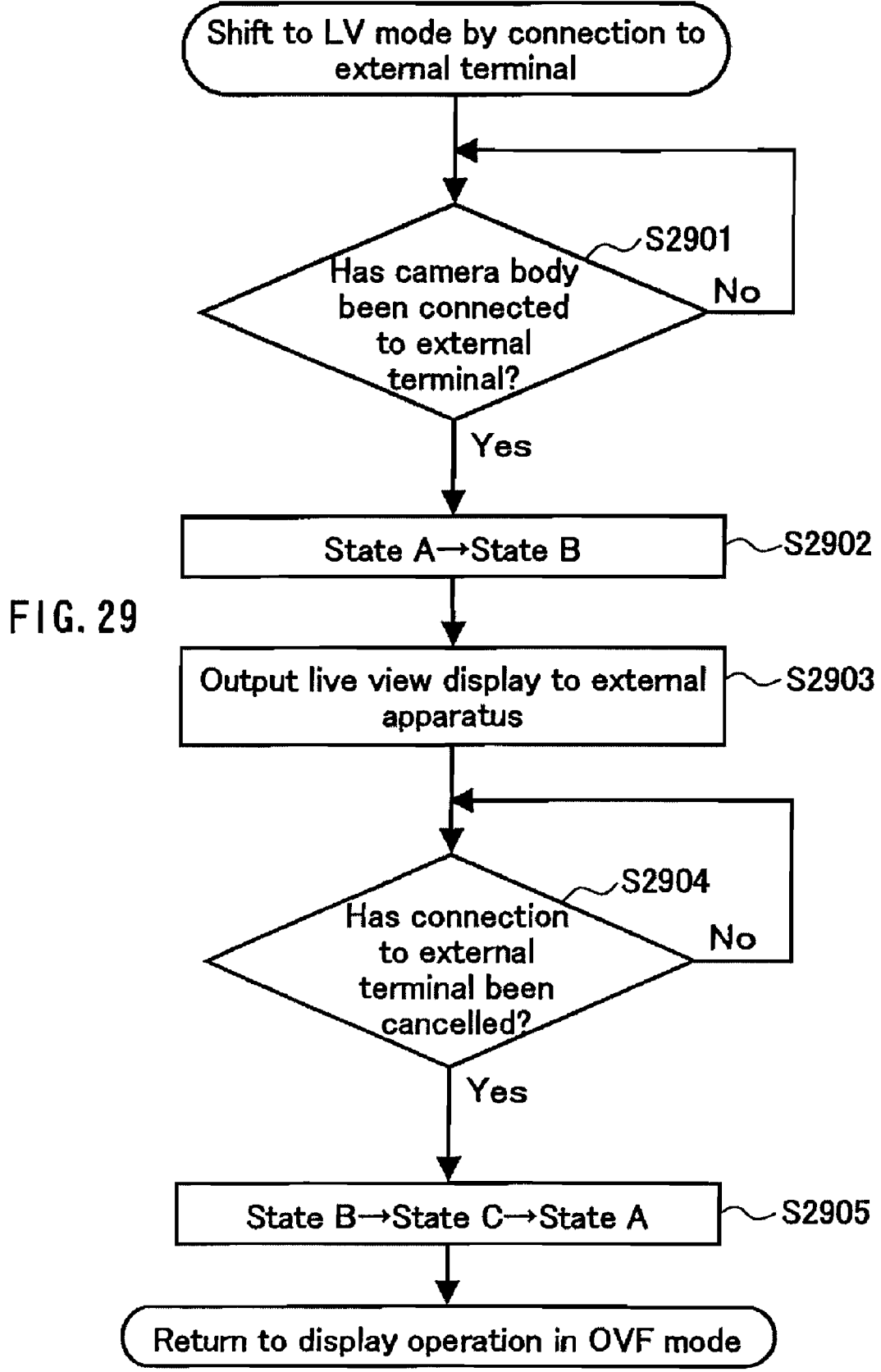
FIG. 29 is a flowchart illustrating an operation when the camera is shifted to the live view mode by being connected to an external terminal.

FIG. 29 is a flowchart illustrating an operation at a time of shift to the live view mode due to the connection of the external terminal.

In FIG. 29, the microcomputer 110 originally is set in the OVF mode. At this time, the inside of the mirror box 120 is in the state A shown in FIG. 1. Furthermore, the microcomputer 110 monitors whether or not the external terminal 152 and the terminal connected to the external apparatus are connected to each other (S2901). When the external terminal 152 and the terminal connected to the external apparatus are connected to each other in this state, the microcomputer 110 shifts the inside of the mirror box 120 from the state A to the state B (S2902). After that, the microcomputer 110 outputs a live view display to the external apparatus via the external terminal 152 (S2903).

The microcomputer 110 monitors whether or not the terminal of the external apparatus is pulled out from the external terminal 152 during the output of the live view display to the external apparatus (S2904). When the terminal of the external apparatus is pulled out from the external terminal 152, the microcomputer 110 shifts the inside of the mirror box 120 from the state B to the state A via the state C (S2905). Consequently, the state of the camera 10 can be returned to the state before the terminal of the external apparatus is connected to the external terminal 152.

As described above, even if the camera 10 is in the OVF operation, the camera 10 can be shifted to the live view mode in accordance with whether or not the external apparatus is connected to the external terminal 152. This saves time and labor for switching to the live view mode manually, which enhances the operability.

In Step S2903, the live view display may be displayed on the liquid crystal monitor 150 while being output to the external apparatus. Furthermore, the live view display may not be displayed on the liquid crystal monitor 150 while being output to the external apparatus.

[2-6 Operation of Shifting to Live View Mode by Setting of Aspect Ratio Other than 4:3]

The aspect ratio of the optical viewfinder is fixed. Thus, an image having a composition with an aspect ratio other than the set aspect ratio cannot be displayed as a whole, and is too small to see even when it can be displayed. Thus, the image having a composition with an aspect ratio other than that of the optical viewfinder can be observed more easily with the electronic viewfinder. However, it is inconvenient to switch to live view mode manually when an image having a composition with an aspect ratio other than that of the optical viewfinder is displayed. In the camera 10 according to Embodiment 2, in the case where the display aspect ratio is set to be the one other than the aspect ratio of the optical viewfinder, the camera 10 is shifted to the live view mode automatically.

Figure 30:
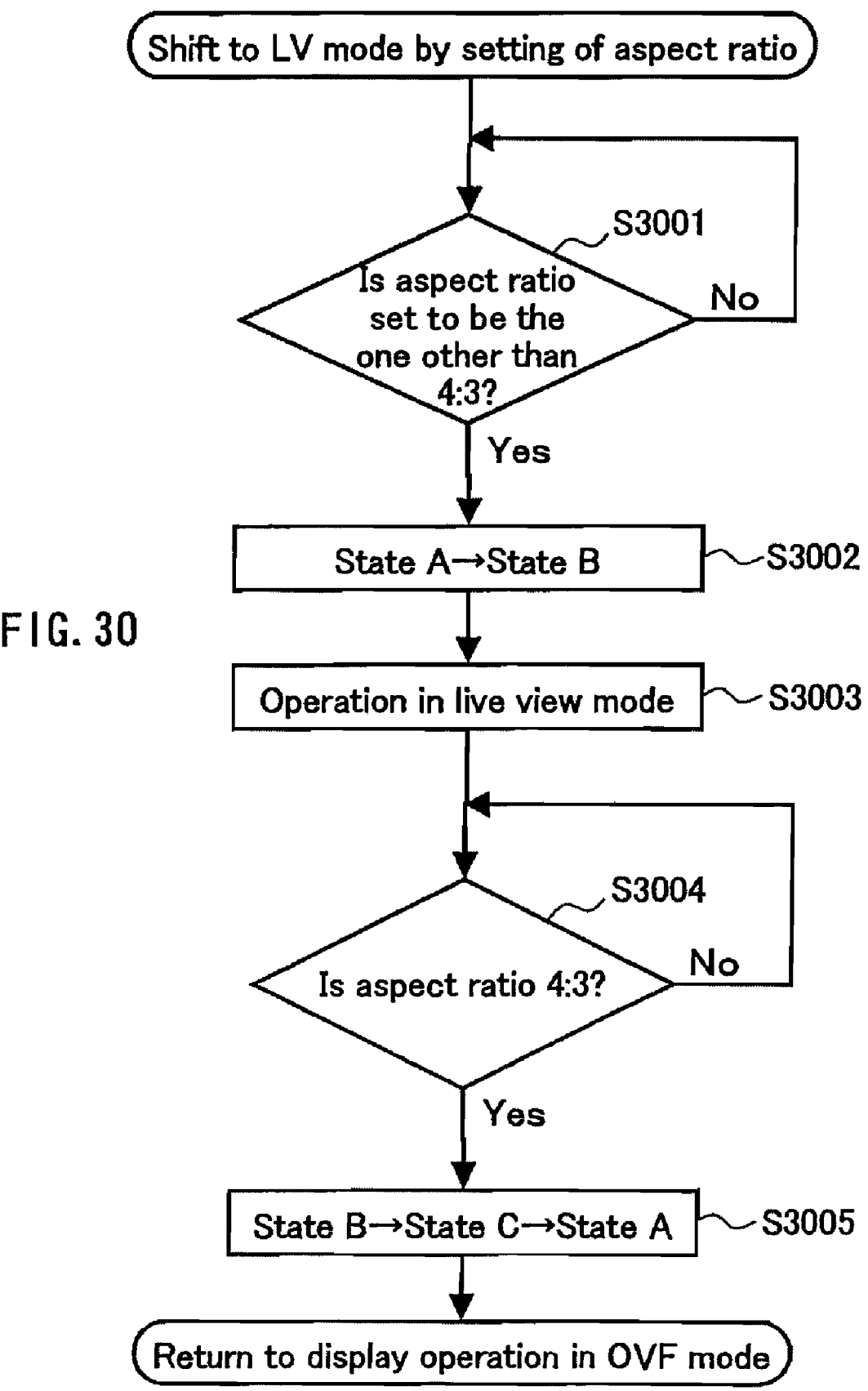
FIG. 30 is a flowchart illustrating an operation when the camera is shifted to the live view mode by setting an aspect ratio.

FIG. 30 is a flowchart illustrating an operation at a time of shift to a live view mode by setting of an aspect ratio.

In FIG. 30, the microcomputer 110 originally is set in the OVF mode. At this time, the inside of the mirror box 120 is in the state A shown in FIG. 1. The composition of an image displayed by the optical viewfinder is set to be 4:3. Furthermore, the microcomputer 110 monitors whether or not the aspect ratio is set to be the one other than 4:3 (S3001). When the user manipulates the menu button 140a and the like to set the composition of a display image to a composition other than 4:3 (or example, a composition of 16:9), the microcomputer 110 shifts the inside of the mirror box 120 from the state A to the state B (S3002). After that, the microcomputer 110 displays a live view display on the liquid crystal monitor 150 with the set composition (S3003).

The microcomputer 110 monitors whether or not the aspect ratio is set to be 4:3 again during the live view mode operation (S3004). When the user operates the menu button 140a and the like to set the composition of the display image to the composition of 4:3 again, the microcomputer 110 shifts the inside of the mirror box 120 from the state B to the state A via the state C (S3005). Because of this, the camera 10 can be returned to the state before the aspect ratio of the composition is changed.

As described above, even if the camera 10 is in the OVF operation, the camera 10 can be shifted to the live view mode in accordance with a change in the aspect ratio of the composition. This saves time and labor for switching to the live view mode manually, which enhances the operability.

[2-7 Operation of Shifting to Live View Mode by Manipulation of Diaphragm Ring]

In Embodiment 1, in order to adjust the diaphragm minutely, the diaphragm ring 242 was provided. It is preferable that a part of a screen can be observed under the condition of being displayed in an enlarged state, when the diaphragm is adjusted with the diaphragm ring 242, because a depth of field is observed easily. However, a part of the screen cannot be displayed in an enlarged state when the depth of field is observed through the optical viewfinder. In order to overcome this, when the diaphragm ring 242 is manipulated, a part of the screen is displayed in an enlarged state along with the shift to the live view mode.

Figure 31:
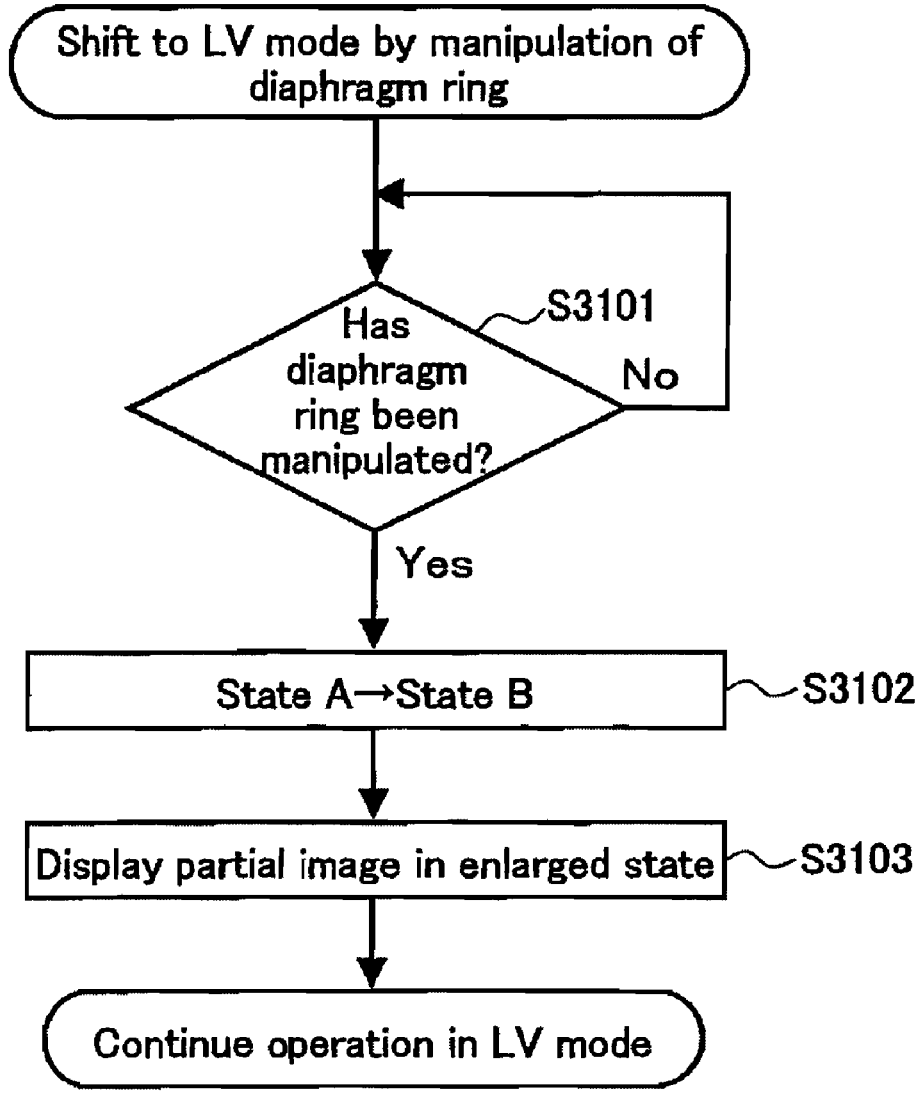
FIG. 31 is a flowchart illustrating an operation when the camera is shifted to the live view mode by operating a diaphragm ring.

FIG. 31 is a flowchart illustrating an operation at a time of shift to a live view mode by the operation of the diaphragm ring 242.

In FIG. 31, the microcomputer 110 originally is set in an OVF mode. At this time, the inside of the mirror box 120 is in the state A shown in FIG. 1. Furthermore, the microcomputer 110 monitors whether or not the diaphragm ring 242 is manipulated (S3101). When the user operates the diaphragm ring 242 in this state, the CPU 210 detects the operation of the diaphragm ring 242 and transmits the detection results to the microcomputer 110. The microcomputer 110 receives the detection results, and shifts the inside of the mirror box 120 from the state A to the state B (S3102). Then, as shown in FIG. 10, the microcomputer 110 displays the region R2 that is a part of the image data generated by the CMOS sensor 130 in an enlarged state (S3103). Which part of the screen is set to be the enlarged region R2 can be changed by manipulating the cross key 140b and the like. After that, the microcomputer 110 continues the live view mode operation.

As described above, even if the camera 10 is in the OVF operation, the camera 10 can be shifted to the live view mode in accordance with the manipulation of the diaphragm ring 242. This saves time and labor for switching to the live view mode manually, which enhances the operability. Furthermore, a place whose depth of field is required to be checked can be enlarged instantaneously, so that the depth of field can be checked easily.

Embodiment 3

In the camera 10 according to the above-mentioned Embodiment 1, by manually manipulating the viewfinder switch 140e, the live view mode is switched to the OVF mode. However, it is inconvenient if the live view mode cannot be switched without manual manipulation at all times. Particularly, in the case where it is highly necessary to come out of the live view mode, if the live view mode can be switched automatically, the operability of the user can be enhanced. The camera in Embodiment 3 is configured so as to come out of the live view mode automatically in accordance with various events.

The configuration of the camera 10 according to Embodiment 3 is similar to that of the camera 10 according to Embodiment 1, so that the description thereof will be omitted.

[3-1 Operation of Canceling Live View Mode by Operation of Menu Button]

In the above-mentioned Embodiment 1, when the menu button 140a is manipulated in the live view mode, a menu screen is overlapped with the live view display. However, with such a display method, the live view display or the menu screen is difficult to see. In the camera 10 according to Embodiment 3, when the menu button 140a is pressed, a real-time image is displayed by the optical viewfinder, and a menu screen is displayed on the liquid crystal monitor 150.

Figure 32:
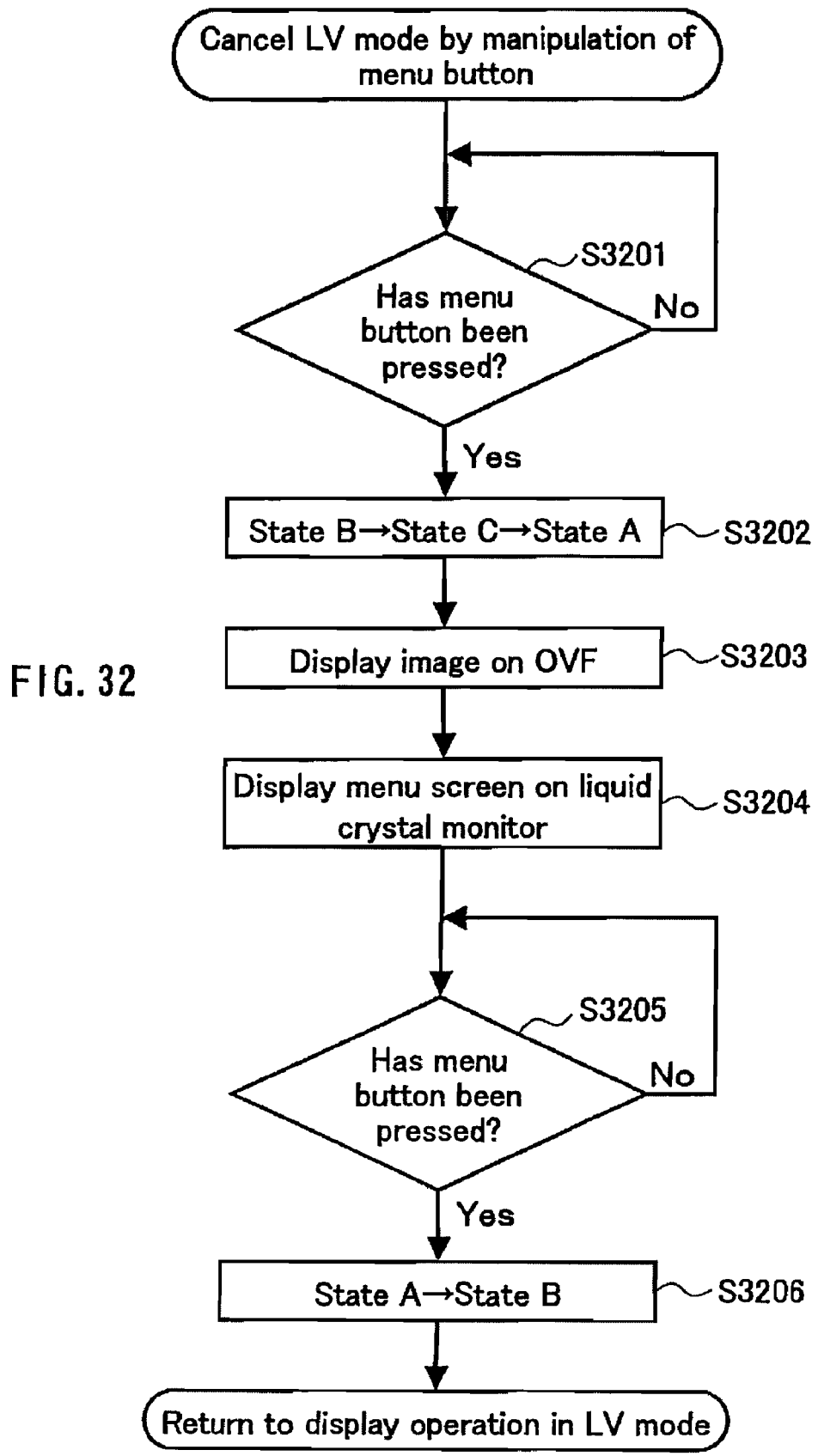
FIG. 32 is a flowchart illustrating an operation when the live view mode is cancelled by operating a menu button.

FIG. 32 is a flowchart illustrating an operation when the live view mode is cancelled by the manipulation of the menu button 140a.

In FIG. 32, the microcomputer 110 originally is set in the live view mode. At this time, the inside of the mirror box 120 is in the state B shown in FIG. 5. Furthermore, the microcomputer 110 monitors whether or not the menu button 140a has been manipulated (S3201). When the user manipulates the menu button 140a in this state, the microcomputer 110 shifts the inside of the mirror box 120 from the state B to the state A via the state C (S3202). Because of this, the movable mirror 121a guides an optical signal input from the interchangeable lens 200 to the optical viewfinder (S3203). Consequently, the user is capable of observing a subject image through the eyepiece 136.

The microcomputer 110 allows the liquid crystal monitor 150 to display a menu screen for various settings in parallel with the processing in Step S3203 (S3204). In this state, the user can observe an image in real time using the optical viewfinder while performing various settings using the menu screen displayed on the liquid crystal monitor 150.

The microcomputer 110 monitors whether or not the menu button 140a is pressed again during the OVF mode operation (S3205). When the user presses the menu button 140a again, the microcomputer 110 completes the display of the menu screen on the liquid crystal monitor 150, and shifts the inside of the mirror box 120 from the state A to the state B (S3206). This can return the camera 10 to the state before the menu screen is displayed.

As described above, even if the camera 10 is in the live view mode, the camera 10 can come out of the live view mode automatically in accordance with the manipulation of the menu button 140a. This saves time and labor for switching to the OVF mode manually, which enhances the operability.

[3-2 Operation of Canceling Live View Mode in Accordance with Operation of Switching Off Power Supply]

When the camera 10 is turned off in the live view mode, the movable mirror 121 is left being moved up. In this state, a subject image cannot be observed through the camera 10. This is because the subject image cannot be guided to the optical viewfinder since the movable mirror 121 is moved up, and the subject image cannot be displayed because the liquid crystal monitor 150 is not supplied with a current. On the other hand, even if the power supply of the camera 10 is in an OFF state, it is convenient if a subject image can be observed through the optical viewfinder. In the present configuration, before the camera 10 is turned off, the live view mode is shifted to the OVF mode. By doing so, even if the power supply of the camera 10 is in an OFF state, the movable mirror 121 is moved down, so that a subject image can be observed through the optical viewfinder.

However, time and labor are needed for switching to the OVF mode manually. In the camera 10 with the present configuration, when the power supply switch 142 is operated in a direction of turning off the power supply of the camera 10 when a live view mode is set, the camera 10 comes out of the live view mode to allow the movable mirror 121 to enter the optical path of the image pickup optical system.

Figure 33:
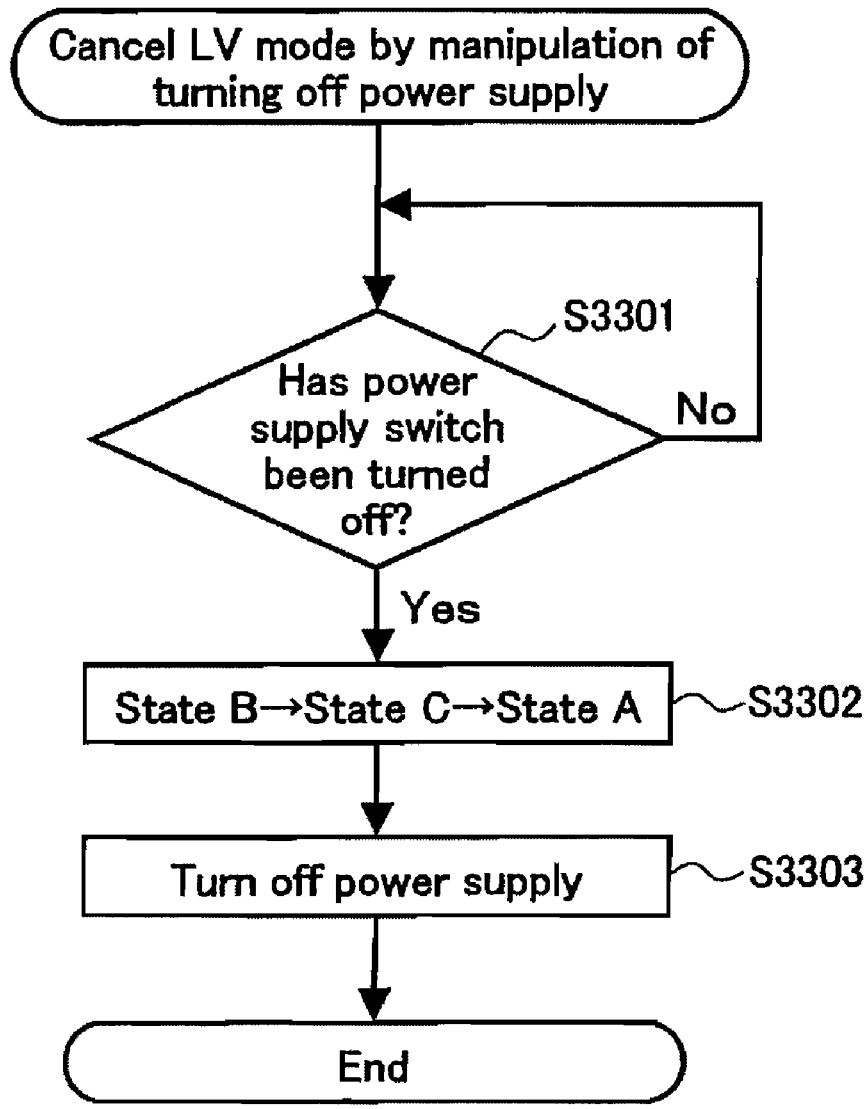
FIG. 33 is a flowchart illustrating an operation when the live view mode is cancelled by turning off a power supply.

FIG. 33 is a flowchart illustrating an operation when the live view mode is cancelled by turning off a power supply.

In FIG. 33, the microcomputer 110 originally is set in the live view mode. At this time, the inside of the mirror box 120 is in the state B shown in FIG. 5. Furthermore, the microcomputer 110 monitors whether or not the power supply switch 142 is manipulated in an OFF direction (S3301). When the user manipulates the power supply switch 142 in the OFF direction in this state, the microcomputer 110 shifts the inside of the mirror box 120 from the state B to the state A via the state C (S3302). Then, when the mirror box 120 is positioned in the state A, the power supply controller 146 stops the supply of power to each site of the camera 10 (S3303).

As described above, the camera 10 is shifted to the OVF mode to move down the movable mirror 121 before the power supply is turned off. Therefore, even if the power supply is turned off later, a subject image can be observed through the optical viewfinder. Furthermore, it is not necessary to switch to the OVF mode manually, so that the operability becomes satisfactory.

In the case where the power supply of the camera 10 is turned on after it is turned off, the microcomputer 10 may remember the state before the power supply is turned off and recover the state. Specifically, when the power supply of the camera 10 is turned off in the live view mode, the power supply actually is turned off after the camera 10 is shifted to the OVF mode. After that, when the power supply is turned on again, the microcomputer 11 continues an operation after the camera 10 is set in the live view mode. Consequently, the state before the power supply is turned off is recovered automatically, which is convenient for the user.

Furthermore, in the above example, the case where the user turns off the power supply using the power supply switch 142 has been described. However, the similar operation also is applicable to a sleep function. Specifically, in the case where the state in which the camera 10 is not manipulated continues for a predetermined period of time or longer, the power supply controller 146 notifies the microcomputer 110 of the announcement showing that the power supply will be turned off. Upon receiving the announcement, the microcomputer 110 shifts the inside of the mirror box 120 from the state B to the state A via the state C. After that, the power supply controller 146 stops the supply of power to each site excluding a predetermined site. After that, when the camera 10 receives some manipulation, the power supply controller 146 detects the manipulation, and restarts the supply of power to each site to which the supply of power has been stopped. Then, the microcomputer 110 shifts the inside of the mirror box 120 from the state A to the state B to restart the operation in the live view mode. Consequently, the camera 10 is shifted to the OVF mode before entering the sleep state, thereby moving down the movable mirror 121. Therefore, even if the camera is positioned in the sleep state later, a subject image can be observed through the optical viewfinder. Furthermore, it is not necessary to switch to the OVF mode manually, which enhances the operability. Furthermore, the same mode is set before and after the sleep state, so that the user does not need time and labor for a manipulation after the completion of the sleep period.

[3-3 Operation of Canceling Live View Mode in Accordance with Operation of Opening Battery Cover]

When a battery 400 is removed in the live view mode, the camera 10 is turned off with the movable mirror 121 moved up. When the camera 10 is turned off in the live view mode, the movable mirror 121 is left being moved up. In this state, a subject image cannot be observed through the camera 10. This is because the subject image cannot be guided to the optical viewfinder since the movable mirror 121 is moved up, and the subject image cannot be displayed since the liquid crystal monitor 150 is not supplied with a current. On the other hand, even when the power supply of the camera 10 is in an OFF state, it is convenient if the subject image can be observed through the optical viewfinder. According to the present configuration, before the battery 400 is removed, the camera 10 is shifted from the live view mode to the OVF mode. By doing so, even when the power supply of the camera 10 is in an OFF state, the movable mirror 121 is moved down, so that the subject image can be observed through the optical viewfinder.

However, time and labor are needed for switching to the OVF mode manually. When the battery cover 144 is opened when the live view mode is set, the camera 10 comes out of the live view mode to allow the movable mirror 121 to enter the optical path of the image pickup optical system.

Figure 34:
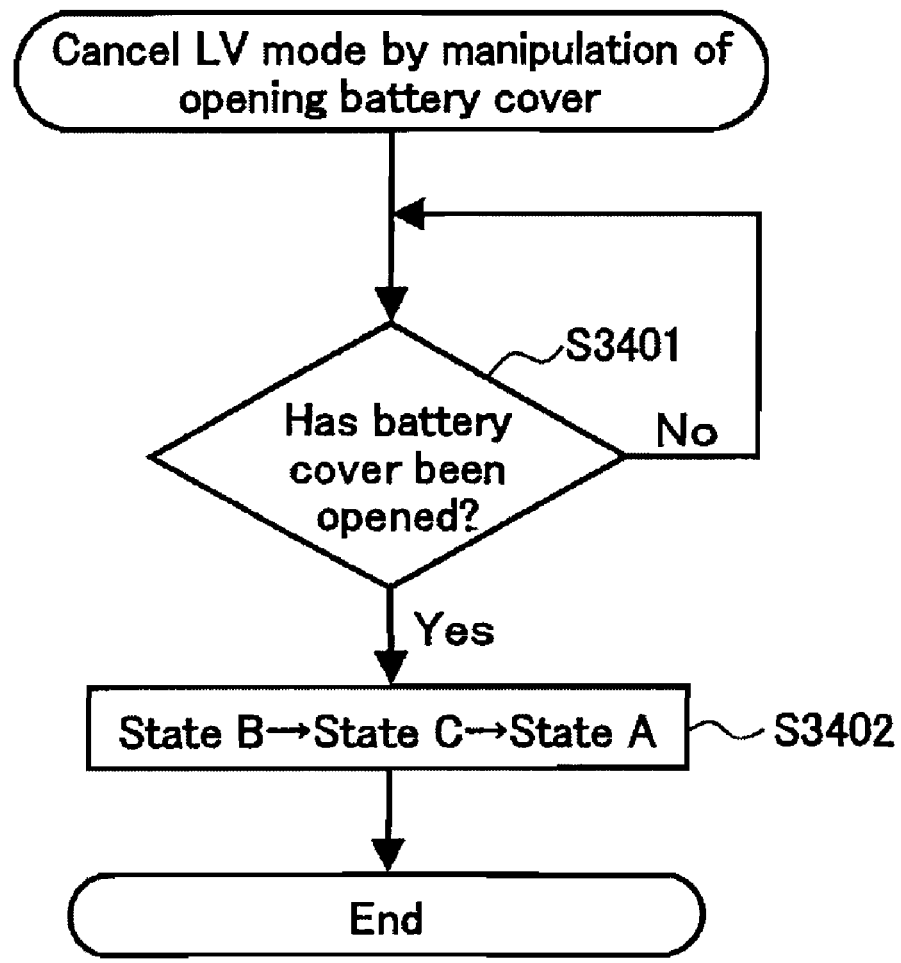
FIG. 34 is a flowchart illustrating an operation when the live view mode is cancelled by opening a battery cover.

FIG. 34 is a flowchart illustrating an operation when the live view mode is cancelled by opening the battery cover 400.

In FIG. 34, the microcomputer 110 originally is set in the live view mode. At this time, the inside of the mirror box 120 is in the state B shown in FIG. 5. Furthermore, the microcomputer 110 monitors whether or not the contact point 145 detects that the battery cover 144 is opened (S3401). When the user opens the battery cover 144 in this state, the microcomputer 110 shifts the inside of the mirror box 120 from the state B to the state A via the state C (S3402).

The battery 400 is engaged in the battery box 143 with a member different from the battery cover 144. Therefore, even if the battery cover 144 is opened, the power supply is not turned off immediately.

As described above, before the battery 400 is removed from the camera 10, the camera 10 is shifted to the OVF mode to move down the movable mirror 121. Therefore, even if the power supply of the camera 10 is turned off later, a subject image can be observed through the optical viewfinder. Furthermore, it is not necessary to switch to the OVF mode manually, which enhances the operability.

[3-4 Operation of Canceling Live View Mode Based on Detection of Low Battery]

The camera 10 turns off the power supply by itself to stop the operation when the voltage of the battery reaches a predetermined value or less, in order to prevent power-down while an image is being captured. When the power supply of the camera 10 is turned off in the live view mode, the movable mirror 121 is left being moved up. In this state, a subject image cannot be observed through the camera 10. This is because the subject image cannot be guided to the optical viewfinder since the movable mirror 121 is moved up. This also is because the subject image cannot be displayed since the liquid crystal monitor 150 is not supplied with a current. On the other hand, even when the power supply of the camera 10 is in an OFF state, it is convenient if the subject image can be observed through the optical viewfinder. According to the present configuration, when the voltage of the battery 400 decreases, the live view mode is shifted to the OVF mode. By doing so, even if the power supply of the camera 10 is turned off along with the decrease in a power supply voltage, the movable mirror 121 is moved down, so that the subject image can be observed through the optical viewfinder.

However, time and labor are needed for switching to the OVF mode manually. Thus, in order to solve this, when the voltage of the battery 400 decreases when the live view mode is set, the camera 10 comes out of the live view mode to allow the movable mirror 121 to enter the optical path of the image pickup optical system.

Figure 35:
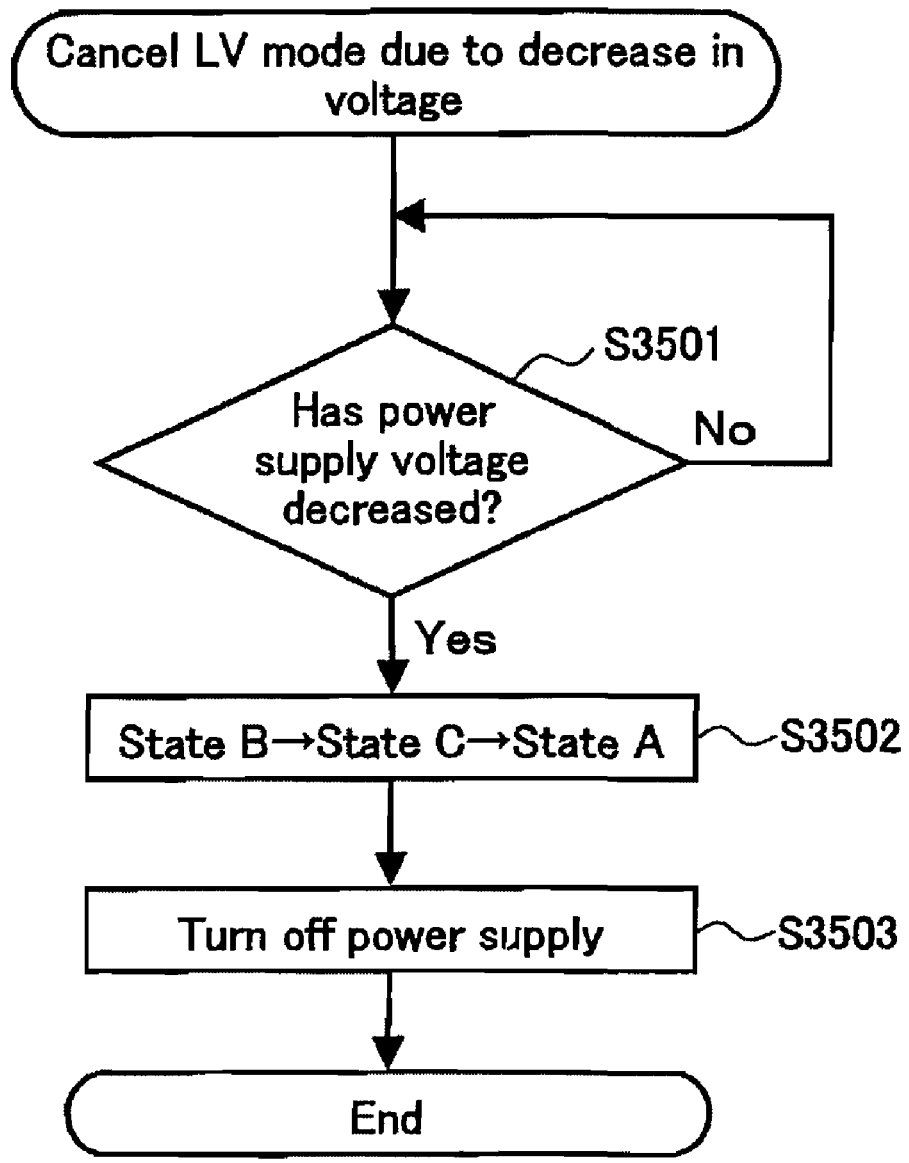
FIG. 35 is a flowchart illustrating an operation when the live view mode is cancelled due to the decrease in a supply voltage.

FIG. 35 is a flowchart illustrating an operation when the live view mode is cancelled based on the decrease in a power supply voltage.

In FIG. 35, the microcomputer 110 originally is set in the live view mode. At this time, the inside of the mirror box 120 is in the state B shown in FIG. 5. Furthermore, the microcomputer 110 monitors whether or not the power supply controller 146 detects that the voltage of the battery 400 is lower than a predetermined value (S3501). When the power supply controller 146 detects that the voltage of the battery 400 is lower than the predetermined value in this state, the power source controller 146 notifies the microcomputer 110 that the voltage of the battery 400 is lower than the predetermined value.

Upon receiving the notification, the microcomputer 110 shifts the inside of the mirror box 120 from the state B to the state A via the state C (S3502). The power supply controller 146 turns off the power supply in the camera 10 after the inside of the mirror box 120 becomes the state A (S3503).

As described above, since the movable mirror 121 can be moved down before the power supply is turned off due to the decrease in the voltage of the battery 400, a subject image can be observed through the optical view finder even if the power supply is in an OFF state. Furthermore, it is not necessary to switch to the OVF mode manually, which enhances the operability.

[3-5 Operation of Canceling Live View Mode in Accordance with Removal of Lens]

When the interchangeable lens 200 is removed from the camera body 100 in the live view mode, the protective material 138 is exposed, and dust and the like are likely to adhere to the camera 10. In order to prevent this, it is necessary to shift the live view mode to the OVF mode before the interchangeable lens 200 is removed. However, time and labor are needed for switching to the OVF mode manually. According to the present configuration, when the interchangeable lens 200 placed on the camera body 100 is removed when the live view mode is set, the camera body 100 comes out of the live view mode to allow the movable mirror 121 to enter the optical path of the image pickup optical system.

Figure 36:
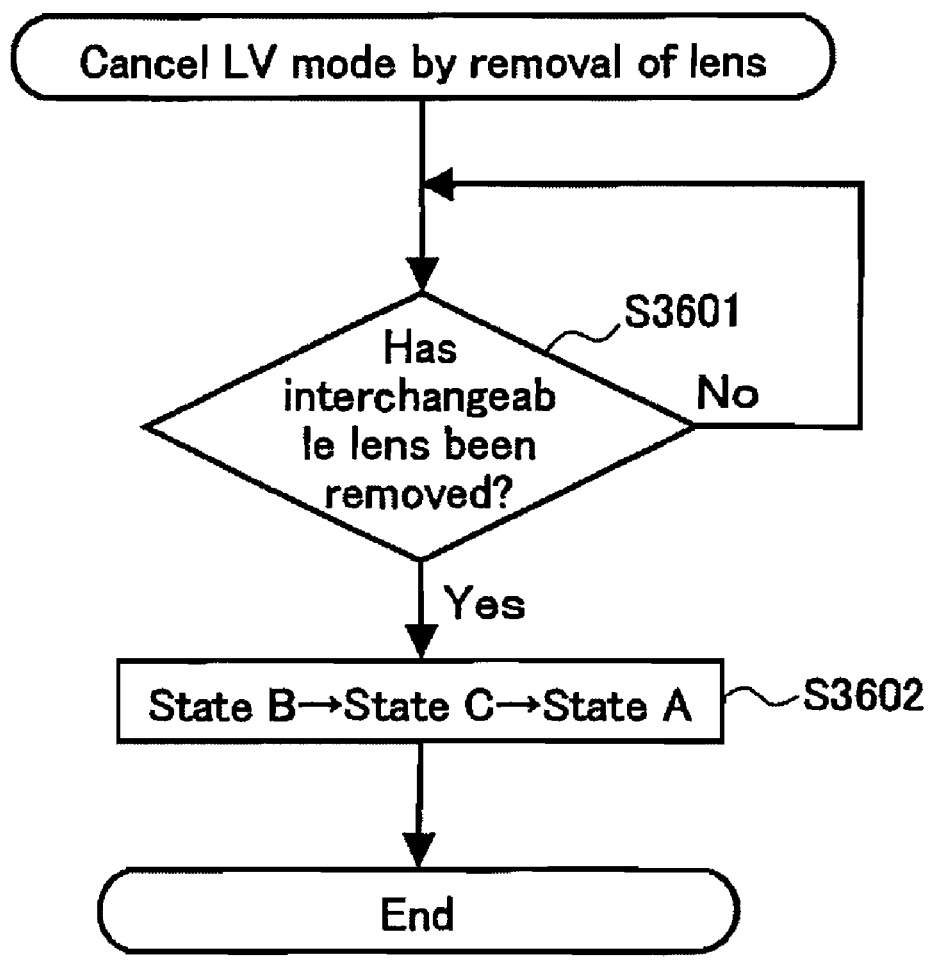
FIG. 36 is a flowchart illustrating an operation when the live view mode is cancelled due to the decrease in a supply voltage.

FIG. 36 is a flowchart illustrating an operation when the live view mode is cancelled due to the decrease in the power supply voltage.

In FIG. 36, the microcomputer 110 originally is set in the live view mode. At this time, the inside of the mirror box 120 is in the state B shown in FIG. 5. Furthermore, the microcomputer 110 monitors whether or not the interchangeable lens 200 has been removed from the lens mount portion 135 (S3601). When the interchangeable lens 200 is removed from the lens mount portion 135, the microcomputer 110 shifts the inside of the mirror box 120 from the state B to the state A via the state C (S3602).

As described above, when the interchangeable lens 200 is removed from the camera body 100, the movable mirror 121 can be moved down, so that foreign matter such as dust can be prevented from adhering to the protective material 138. Furthermore, it is not necessary to switch to the OVF mode manually, which enhances the operability.

[3-6 Operation of Canceling Live View Mode in Accordance with Connection of External Terminal]

When a terminal from an external apparatus is connected to the external terminal 152, the camera 10 according to the above-mentioned Embodiment 2 is shifted to the live view mode automatically, and outputs the image data generated by the CMOS sensor 130 to the external apparatus. In contrast, when the terminal from the external apparatus is connected to the external terminal 152 in the live view mode, the camera 10 according to Embodiment 3 comes out of the live view mode automatically, and outputs the image data stored in the memory card 300 to the external apparatus.

In the case where the camera 10 is connected to the terminal connected to the external apparatus, the user attempts to display the image data stored in the camera 10 or in the memory card 300 placed in the camera 10 on the external apparatus in many cases. In such a case, with the configuration in which a live view display is performed on the liquid crystal monitor 150 while the image data is being sent to the external apparatus, burden on the microcomputer 110 increases. Therefore, in the case of sending the image data to the external apparatus, it is preferable that the camera 10 comes out of the live view mode. However, when the camera 10 is connected to the external apparatus, time and labor are needed for the camera 10 to come out of the live view mode manually. When the terminal connected to the external apparatus is connected to the external terminal 152, the camera 10 controls so as to allow the movable mirror 121 to enter the optical path of the image pickup optical system, and allow the image data stored in the memory card 300 to be output to the external apparatus via the external terminal 152.

Figure 37:
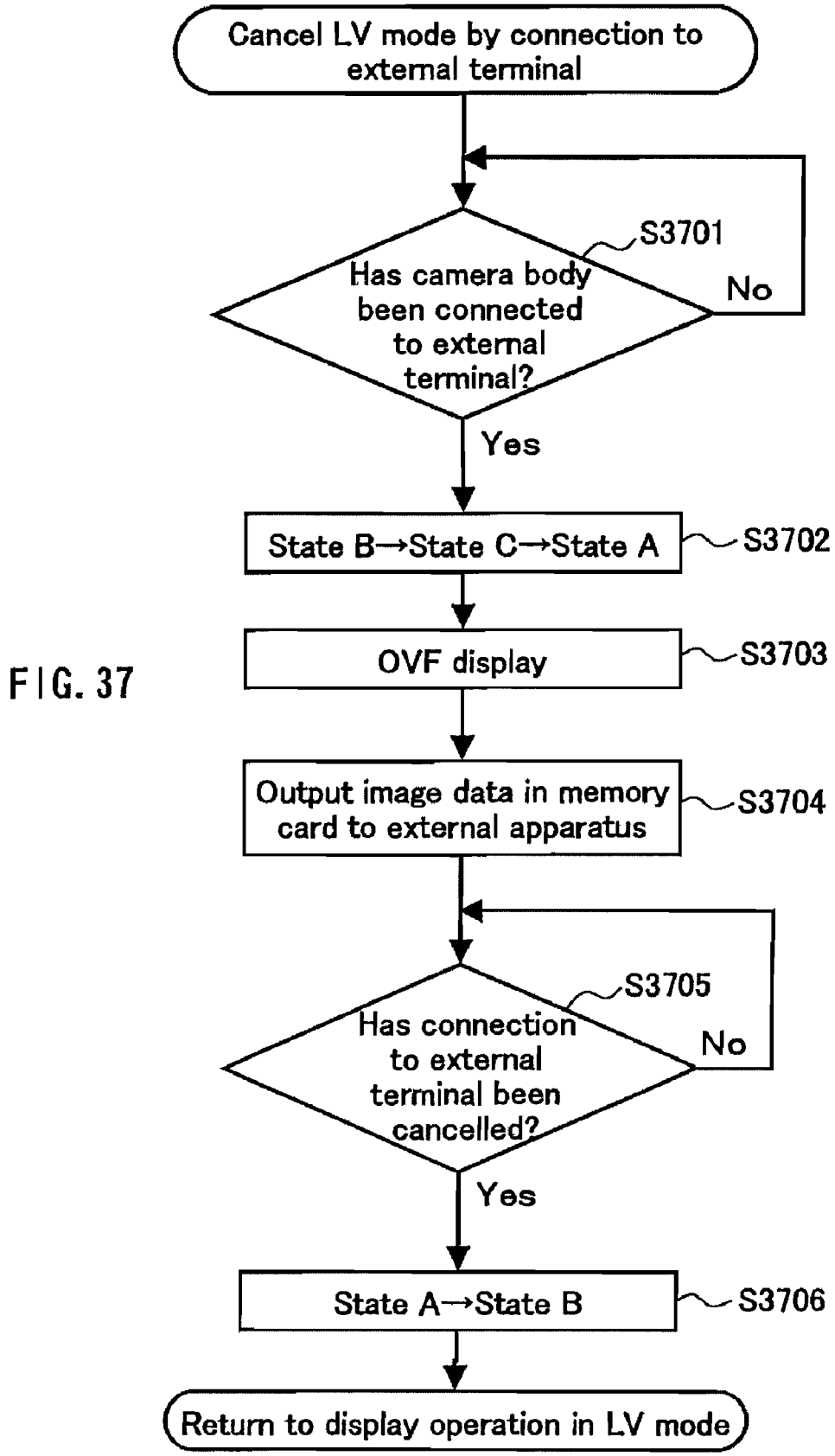
FIG. 37 is a flowchart illustrating an operation when the live view mode is cancelled by being connected to the external terminal.

FIG. 37 is a flowchart illustrating an operation when the live view mode is cancelled due to the connection of the external terminal 152.

In FIG. 37, the microcomputer 110 originally is set in a live view mode. At this time, the inside of the mirror box 120 is in the state B shown in FIG. 5. Furthermore, the microcomputer 110 monitors whether or not the terminal of the external apparatus is connected to the external terminal 152 (S3701). When the terminal of the external apparatus is connected to the external terminal 152 in this state, the microcomputer 110 shifts the inside of the mirror box 120 from the state B to the state A via the state C (S3702). Consequently, the movable mirror 121a guides an optical signal from the interchangeable lens 200 to the optical viewfinder. Along with this, the microcomputer 110 outputs the image data stored in the memory card 300 or image data obtained by subjecting the image data stored in the memory card 300 to predetermined processing to the external apparatus via the external terminal 152 (S3704). The external apparatus displays an image based on the image data sent from the camera 10.

In this state, the microcomputer 110 monitors whether or not the terminal connected to the external terminal 152 is removed (S3705). When the terminal connected to the external terminal 152 has been removed, the microcomputer 110 shifts the inside of the mirror box 120 from the state A to the state B (S3706). After that, the microcomputer 110 continues the operation in the live view mode.

As described above, the camera 10 can move out of the live view mode automatically when the camera 10 is connected to the external apparatus, so that the operability is satisfactory. Simultaneously with this, the camera 10 is shifted to the OVF mode, so that a real-time image also can be observed using the optical viewfinder.

Embodiment 4

The camera 10 according to the above-mentioned Embodiment 1 performs an autofocus operation using the image data generated by the CMOS sensor 130 in the live view display (state B), in the case of capturing an image in the continuous focus mode in the live view mode. Along with this, immediately before capturing an image (state A), the camera 10 performs an autofocus operation using the measurement results of the AF sensor 132. In contrast, when both the live view mode and the continuous focus mode are set, the camera 10 according to Embodiment 4 is shifted automatically from the continuous focus mode to the single focus mode, or from the live view mode to the OVF mode.

[4-1 Operation of Shift from Continuous Focus Mode to Single Focus Mode]

Figure 38:
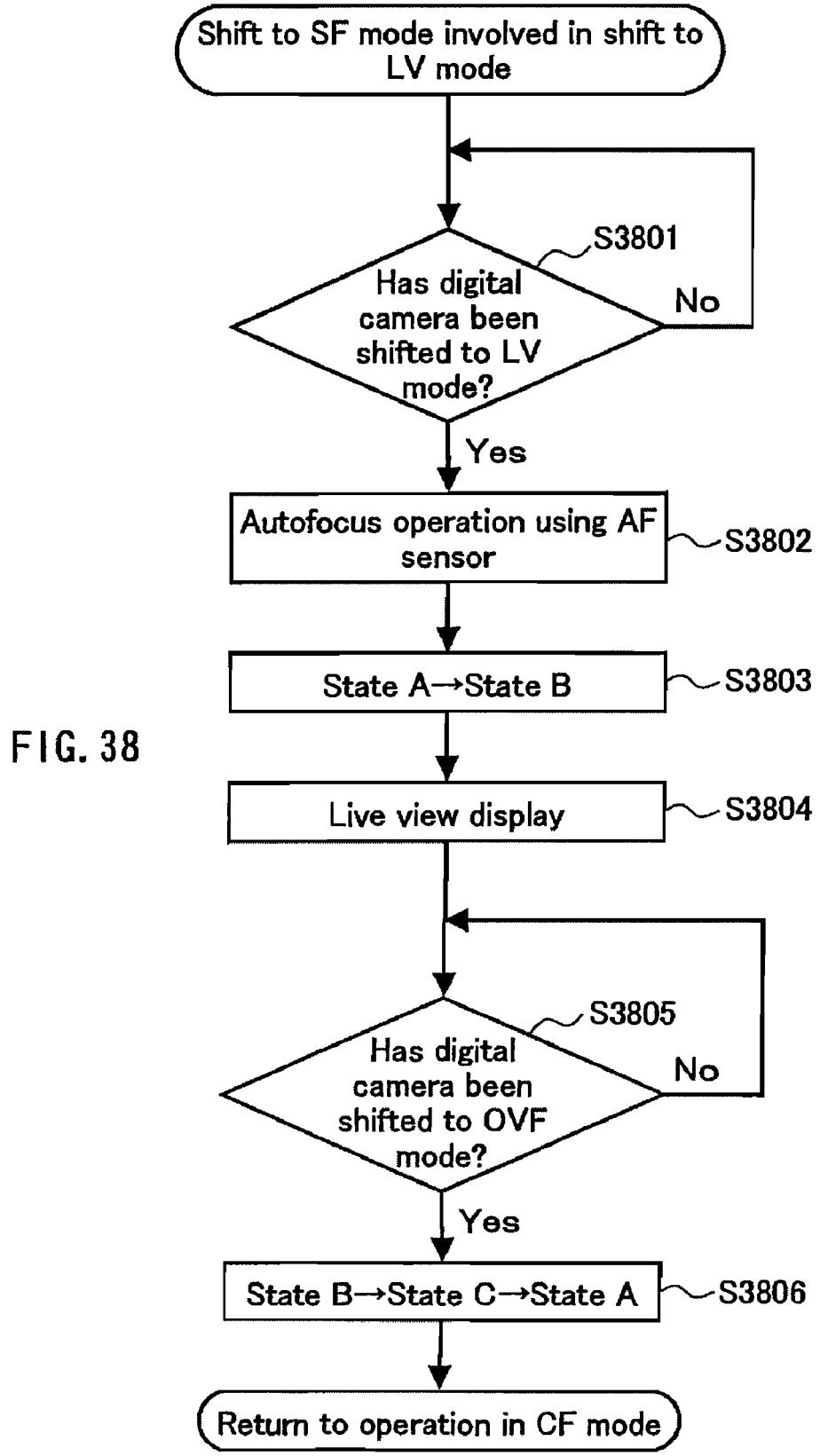
FIG. 38 is a flowchart illustrating a shift operation to a single focus mode involved in the shift to the live view mode.

FIG. 38 is a flowchart illustrating an operation of shift to the signal focus mode involved in the shift to the live view mode.

In FIG. 38, the microcomputer 110 originally is set in the OVF mode. At this time, the inside of the mirror box 120 is in the state A show in FIG. 1. The microcomputer 110 is operated in the continuous focus mode. Thus, the microcomputer 110 transmits the measurement results of the AF sensor 132 to the CPU 210 continuously. Then, the CPU 210 performs the autofocus operation based on the measurement results of the AF sensor 132 received from the microcomputer 110. In this state, the microcomputer 110 monitors whether or not the viewfinder switch 140e is switched to the live view mode (S3801).

When the viewfinder switch 140e is switched to the live view mode, the microcomputer 110 allows the AF sensor to measure a distance, and transmits the measurement results to the CPU 210. The CPU 210 performs the autofocus operation based on the measurement results of the AF sensor 132 received from the microcomputer 110 (S3802). Thus, by performing an autofocus operation immediately before entering the OVF mode, an image especially focused on a subject can be displayed on the liquid crystal monitor 150.

Next, the microcomputer 110 shifts the inside of the mirror box 120 from the state A to the state B (S3803).

The microcomputer 110 continues an operation in the live view mode (S3804). During this time, the microcomputer 110 does not give an instruction regarding an autofocus operation until the release button 141 is pressed halfway.

In this state, the microcomputer 110 monitors whether or not the viewfinder switch 140e is switched to the OVF mode (S3805).

When the viewfinder switch 140e is switched to the OVF mode, the microcomputer 110 shifts the inside of the mirror box 120 from the state B to the state A via the state C (S3806). Then, the microcomputer 110 returns to the operation in the continuous focus mode.

As described above, when both the live view mode and the continuous focus mode are set, the camera 10 is shifted from the continuous focus mode to the single focus mode automatically. Therefore, an autofocus operation can be realized only with the autofocus operation using the AF sensor 132, without using the image data generated by the CMOS sensor 130. Furthermore, since the continuous focus mode can be shifted to the single focus mode automatically, the operability is satisfactory.

[4-2 Operation of Shift from Live View Mode to OVF Mode]

Figure 39:
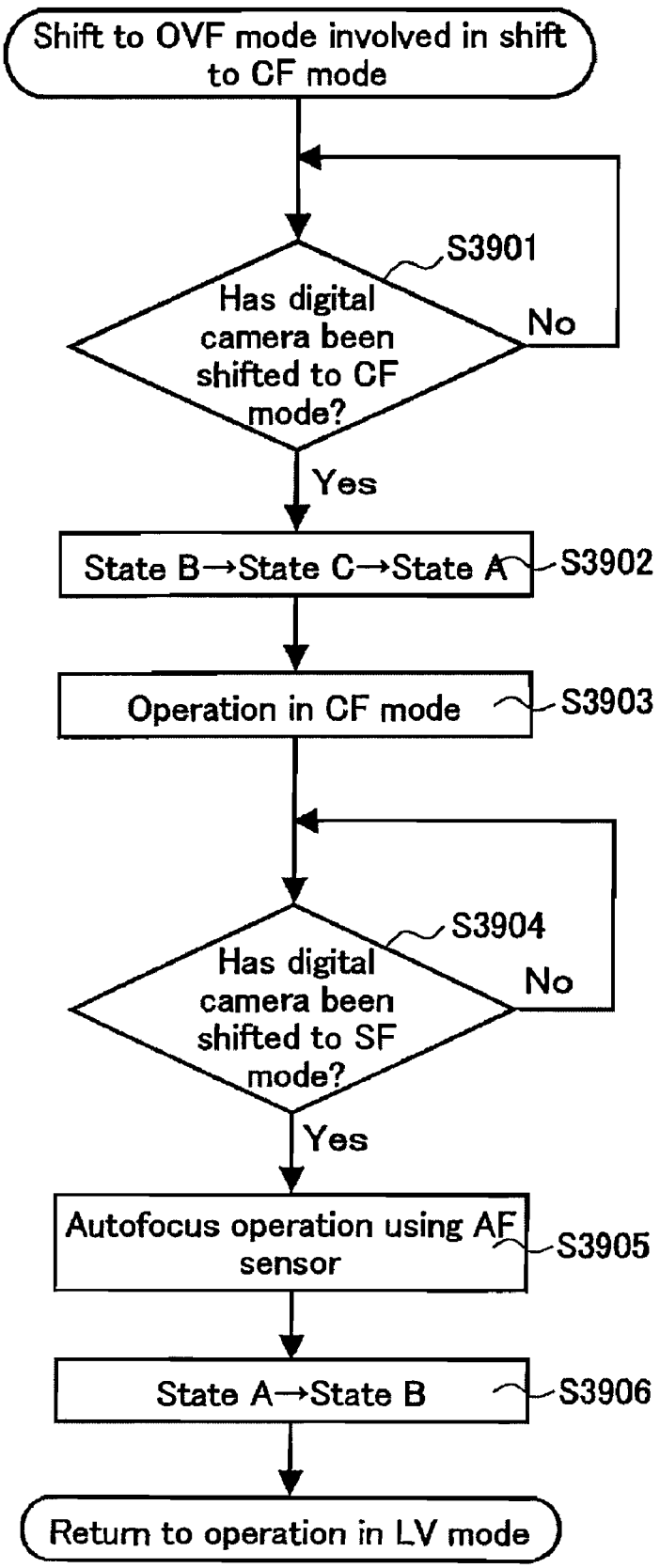
FIG. 39 is a flowchart illustrating a shift operation to an OVF mode involved in the shift to the continuous focus mode.

FIG. 39 is a flowchart illustrating a shift operation to the OVF mode involved in the shift to the continuous focus mode.

In FIG. 39, the microcomputer 110 originally is set in the live view mode. At this time, the inside of the mirror box 120 is in the state B shown in FIG. 5. The microcomputer 110 is operated in the single focus mode. Thus, the microcomputer 110 does not give an instruction regarding an autofocus operation until the release button 141 is pressed halfway. In this state, the microcomputer 110 monitors whether or not the focus mode switch 140f is switched to the continuous focus mode (S3901).

When the focus mode switch 140f is switched to the continuous focus mode, the microcomputer 110 shifts the inside of the mirror box 120 from the state B to the state A via the state C (S3902). Then, the microcomputer 110 continues the operation in the OVF mode. During this time, the microcomputer 110 is operated in the continuous focus mode (S3903).

In this state, the microcomputer 110 monitors whether or not the focus switch 140f is switched to the single focus mode (S3904). When the focus mode switch 140f is switched to the single focus mode, the microcomputer 110 gives an instruction regarding the autofocus operation based on the measurement results of the AF sensor 132 (S3905). The microcomputer 110 shifts the inside of the mirror box 120 from the state A to the state B (S3906). Then, the microcomputer 110 returns to the operation in the live view mode.

As described above, when both the live view mode and the continuous focus mode are set, the camera 10 according to Embodiment 4 is shifted from the live view mode to the OVF mode automatically. Therefore, an autofocus operation can be realized only with the autofocus operation using the AF sensor 132 without using the image data generated by the CMOS sensor 130. Furthermore, since the live view mode can be shifted to the OVF mode automatically, the operability is satisfactory.

Embodiment 5

Figure 40:
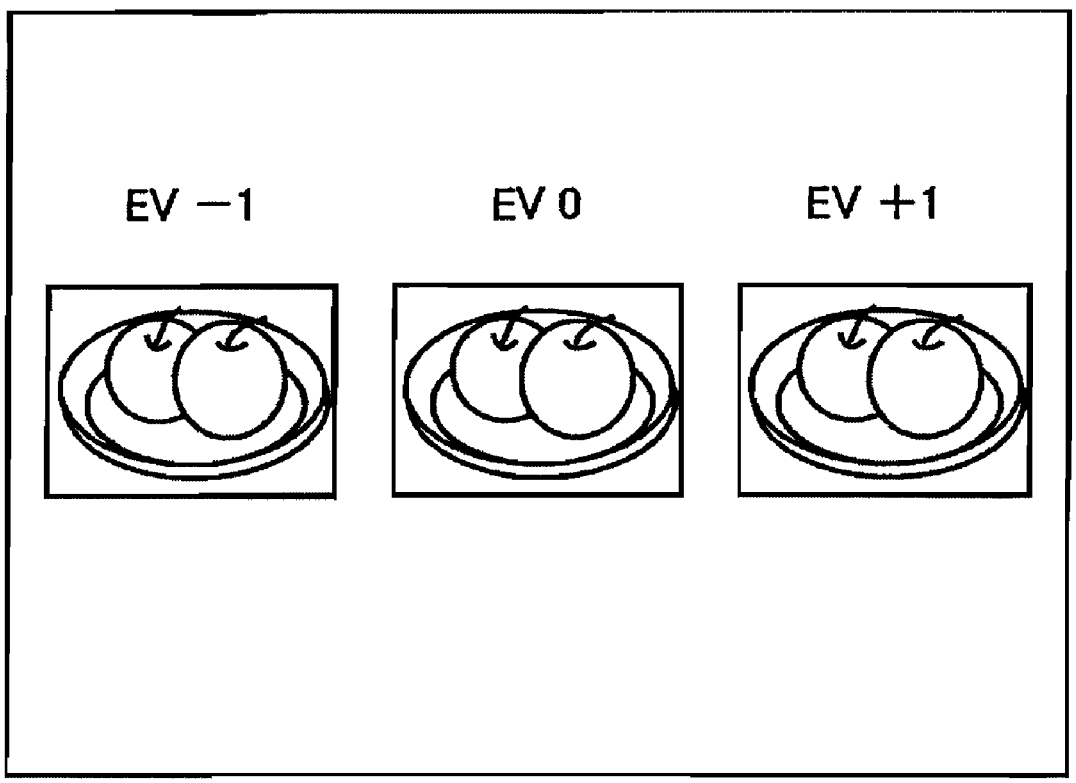
FIG. 40 is a schematic view showing a display screen when a plurality of real-time images are displayed on the liquid crystal monitor.

The camera 10 according to the above-mentioned embodiment 1 is configured so as to display a real-time image over the entire surface of the optical viewfinder or the liquid crystal monitor 150. In contrast, the camera 10 according to Embodiment 5 has a configuration in which a plurality of real-time images are displayed on the liquid crystal monitor 150 by pressing a multi-display button 140p, as shown in FIG. 40. At this time, the lightness of a plurality of images to be displayed is assumed to be varied for each image by electrical adjustment. Furthermore, the information representing the difference in lightness is displayed in an upper portion of each image reduced in size.

Figure 41:
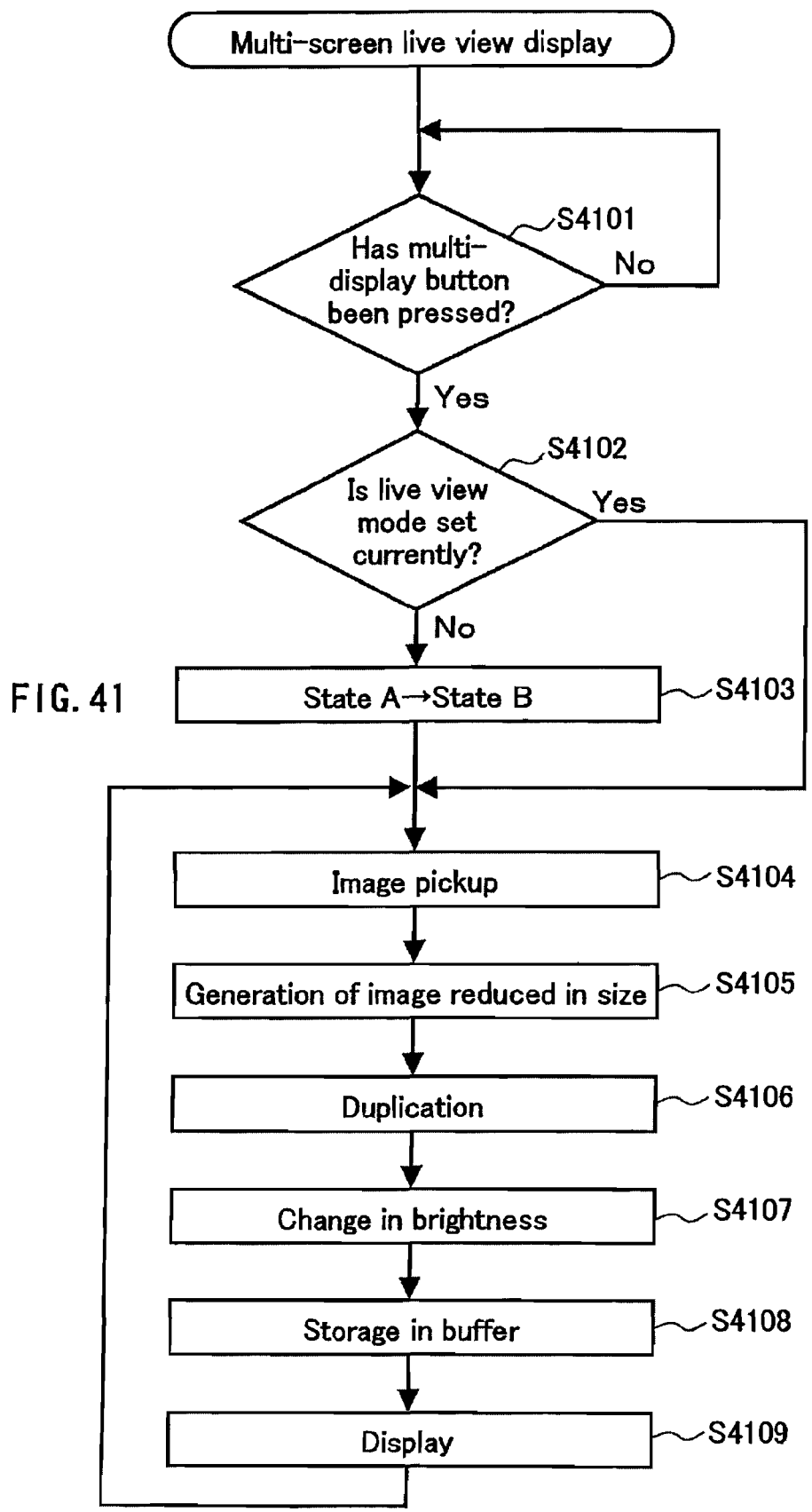
FIG. 41 is a flowchart illustrating a multi-display operation in a live view.

FIG. 41 is a flowchart illustrating a multi-display operation in a live view.

In FIG. 41, the microcomputer 110 monitors whether or not the multi-display button 140p is pressed (S4101).

The microcomputer 110 detects whether or not a currently set mode is a live view mode when the multi-display button 140p is pressed (S4102). If the currently set mode is a live view mode, the microcomputer 110 is shifted to Step S4104.

On the other hand, when the currently set mode is not in the live view mode such as the OVF mode, the inside of the mirror box 120 is shifted from the state A to the state B (S4103), and after that, the microcomputer 110 is shifted to Step S4104.

In Step S4104, the CMOS sensor 130 captures a subject image to generate image data. The A/D converter 131 converts the generated image data from the analog data to the digital data. The microcomputer 110 subjects the image data obtained from the A/D converter 131 to YC conversion, and further resizes the resultant image data to generate an image reduced in size (S4105).

The microcomputer 110 duplicates the generated image reduced in size, and allows the buffer 111 to store three images reduced in size (S4106). The microcomputer 110 changes the brightness of the three images reduced in size stored in the buffer 111. The brightness is changed so as to obtain EV−1 for the first image, EV0 for the second image, and EV+1 for the third image.

Next, the microcomputer 110 stores these images reduced in size in a storage space in the buffer so that they are arranged appropriately (S4108).

Finally, the microcomputer 110 allows the liquid crystal monitor 150 to display the image data stored in the buffer 111 (S4109).

A live view display of a multi-screen can be realized by repeating the operations in Steps S4104 to S4109.

The EV value of each image reduced in size can be selected by pressing the menu button 140a to allow a menu screen to be displayed.

As described above, since a plurality of images reduced in size are displayed as a live view screen, the respective images reduced in size can be compared with each other easily. In particular, by electronically realizing the difference in image pickup conditions, an image obtained by capturing an image for recording can be grasped easily.

In Embodiment 5, although images with different EV values are produced to be displayed in simulation by electronic processing, the present invention is not limited thereto. For example, images with different white balances may be produced to be displayed in simulation, by electronically changing a color-difference component of the image data.

Embodiment 6

As embodiments for carrying out the present invention, Embodiments 1-5 have been illustrated. However, the embodiments for carrying out the present invention are not limited thereto. Another embodiment of the present invention will be summarized as Embodiment 6.

In Embodiments 1-5, the optical viewfinder of the present invention includes the focusing glass 125, the prism 126, and the eyepiece 136. However, the present invention is not limited thereto. For example, a reflector may be used in place of the prism 126. Furthermore, a subject image may be output to an upper surface of the camera body 100, without using the prism 126. Furthermore, an image pickup element may be used in place of the focusing glass 125, and an electronic viewfinder may be used in place of the eyepiece 136. In this case, a camera body includes two electronic viewfinders. In the case of using an electronic viewfinder in place of an optical electronic viewfinder as described above, although some of the inventions disclosed in the present specification cannot be carried out, there are still inventions that can be carried out. In particular, the invention that attaches importance to the presence of the movable mirror can be carried out.

In Embodiments 1-5, although a 4-group image pickup optical system has been illustrated as the image pickup optical system, the present invention is not limited thereto. For example, the zoom lens 230 is not an essential member, and the interchangeable lens 200 may be configured as a monofocal lens. Furthermore, the correction lens 251, the unit 250, and the gyrosensor 252 are not essential members, and the interchangeable lens 200 may be configured as an interchangeable lens having no hand vibration correction function.

Furthermore, the arrangement of each member included in the image pickup optical system can be changed appropriately. For example, the image pickup optical system may be placed in such a manner that the diaphragm 240 and the hand shaking correction unit 250 are replaced with each other. Furthermore, the image pickup optical system may be placed in such a manner that the hand shaking correction unit 250 and the focus lens 260 are replaced with each other. The image pickup optical system may be configured so as to include a lens group that functions as the hand shaking correction unit 250 and the focus lens 260.

Furthermore, the objective lens 220, the zoom lens 230, the correction lens 251, and the focus lens 260 may be composed of a single lens, respectively, or configured as a lens group including a combination of a plurality of lenses.

Furthermore, a partial member constituting the image pickup optical system may include the camera body 100. Furthermore, the camera 10 may include a lens fixed to the camera body 100, instead of having an interchangeable lens system.

In Embodiments 1-5, although the zoom lens 230, the diaphragm 240, and the focus lens 260 are manipulated mechanically, which is accomplished by driving the zoom motor 231, the motor 241, and the focus motor 261, respectively, and synchronized mechanically with the zoom ring 232, the diaphragm ring 242, and the focus ring 262, the present invention is not limited thereto. For example, Embodiments 1-5 may be configured in such a manner that only a mechanical manipulation by the zoom ring 232, the diaphragm ring 242, and the focus ring 262 can be performed, without providing the zoom motor 231, the motor 241, and the focus motor 261. It should be noted that an autofocus operation is difficult when the focus motor 261 is not provided. Furthermore, in the case where the motor 241 is not provided, the automatic adjustment of the diaphragm 240 by pressing the LV preview button 140*j*, the diaphragm button 140*k*, or the AV button 140*m* becomes difficult. Alternatively, for example, the zoom lens 230, the diaphragm 240, and the focus lens 206 may be driven only with the zoom motor 231, the motor 241, and the focus motor 261 without having the zoom ring 232, the diaphragm ring 242, and the focus ring 262. Alternatively, although the zoom ring 232, the diaphragm ring 242, and the focus ring 262 are provided, the movements thereof may be converted into electric signals, and the electric signals may be transmitted to the CPU 210. In this case, the CPU 210 may drive the zoom motor 231, the motor 241, and the focus motor 216 in accordance with the electric signals.

In Embodiments 1-5, the CMOS sensor 130 is illustrated as an image pickup element. However, the present invention is not limited thereto. The image pickup element may be any means for capturing a subject image to generate image data. For example, the image pickup element also can be realized with a CCD image sensor.

In Embodiments 1-5, the liquid crystal monitor 150 is illustrated as the display portion. However, the present invention is not limited thereto, and any means for displaying an image can be used as the display portion. Furthermore, the display portion may be means for displaying various pieces of information as well as images. For example, the display portion may be realized with an organic EL display.

In Embodiment 1-5, the microcomputer 110 is illustrated as the control portion. However, the present invention is not limited thereto, and any means for controlling the camera 10 may be used. Furthermore, the control portion may include a plurality of semiconductor devices. The control portion may include electronic components such as a resistor, a capacitor, and the like which are not semiconductor devices. Furthermore, the control portion may include a memory, if required. Furthermore, the control portion may include software or may be composed only of hardware. A program contained in the control portion may be changeable or fixed without change permitted. Furthermore, as the control portion, anything that is capable of controlling a battery can be used.

Furthermore, in Embodiments 1-5, although the microcomputer 110 controls the camera body 100, and the CPU 210 controls the interchangeable lens 200, the present invention is not limited thereto. For example, the control portion provided on the camera body 110 side may control both the camera body 100 and the interchangeable lens 200. In this case, the interchangeable lens 200 may not be provided with the control portion.

In Embodiments 1-5, the LV preview button 140*j* is illustrated as the diaphragm adjustment instruction receiving portion. However, the present invention is not limited thereto, and any means used for instructing the camera 10 to perform a diaphragm adjustment may be used. For example, the diaphragm adjustment instruction receiving portion may be realized with a slide-type or touch-type switch. Furthermore, the diaphragm adjustment instruction receiving portion may be realized with a manipulation key or the like for giving an instruction regarding a diaphragm adjustment from the menu screen. Furthermore, the diaphragm adjustment instruction receiving portion may be realized with the remote control receiving portion 155 that receives a control signal from a remote controller.

In Embodiments 1-5, although the microcomputer 110 is illustrated as the image processing means, the present invention is not limited thereto, and any means may be used as long as it can perform image processing such as YC conversion processing. For example, the image processing means may be composed of hardware such as a DSP (digital signal processor). Furthermore, the image processing means may be composed of one semiconductor device or a plurality of semiconductor devices. Furthermore, the image processing means may include electronic components such as a resistor and a capacitor that are not semiconductor devices. Furthermore, a program contained in the image processing means can be changeable or fixed without change permitted. Furthermore, the image processing means and the control portion may be composed of one semiconductor device, or separate semiconductor devices. Furthermore, the image processing means may include a memory, if required.

In Embodiments 1-5, the release button 141 is illustrated as the release portion. However, the present invention is not limited thereto, and any means for giving an instruction regarding the start of capturing an image for recording may be used. For example, the release portion may be realized with a slide-type or touch-type switch. Furthermore, the release portion may be realized with a manipulation key or the like for giving an instruction regarding a diaphragm adjustment from a menu screen. Furthermore, the release portion may be realized with the remote control receiving portion 155 that receives a control signal from the remote controller. Furthermore, the release portion may be composed of a touch screen. Furthermore, the release portion may be realized with a microphone that receives a voice. In this case, the user gives an instruction regarding the start of capturing an image for recording with a voice. Furthermore, the release operation by the release portion also includes a release operation in a self-timer mode.

In Embodiments 1-5, the AF sensor 132 is illustrated as the distance-measuring portion. However, the present invention is not limited thereto, and any means for obtaining information on the distance from the camera 10 to a subject may be used. For example, the distance-measuring portion may be realized with a sensor used for active autofocusing. Herein, according to the present invention, the information on the distance from the subject to the camera 10 is a concept including a defocus amount of the subject image.

In Embodiments 1-5, the memory card 300 is illustrated as the recording portion. However, the present invention is not limited thereto, and any means for recording an image for recording may be used. For example, the recording portion may be realized with a memory contained in the camera 10 without being attachable/detachable to the camera 10. Furthermore, the recording portion may be realized with a flash memory, a ferroelectric memory, a DRAM, or an SRAM with a power supply, or the like. Furthermore, the recording portion may be realized with a hard disk or an optical disk. Furthermore, the recording portion may be realized with a magnetic tape or a magnetic disk recording portion.

In Embodiments 1-5, the release button 141 is illustrated as the AF start instruction receiving portion. However, the present invention is not limited thereto, and any means for giving an instruction regarding the start of an autofocus operation may be used. For example, the AF start instruction receiving portion may be realized with a slide-type or touch-type switch. Furthermore, the AF start instruction receiving portion may be realized with a manipulation key or the like for giving an instruction regarding the start of an autofocus operation from the menu screen. Furthermore, the AF start instruction receiving portion may be realized with the remote control receiving portion 155 that receives a control signal from a remote controller. Furthermore, the AF start instruction receiving portion may be realized with a touch screen. Furthermore, the AF start instruction receiving portion may be realized with a microphone that receives a voice. In this case, the user gives an instruction regarding the start of an AF operation with a voice.

In Embodiments 1-5, although AF sensor 132 is provided, the AF sensor 132 is not necessarily required. In the case where the AF sensor is not provided, for example, an autofocus operation is performed using a contrast value of the image data generated by the CMOS sensor 130.

In Embodiments 1-5, although the AE sensor 133 is provided, the AE sensor 133 is not necessarily required. In the case where the AE sensor 133 is not provided, for example, a photometric operation is performed using the image data generated by the CMOS sensor 130.

In Embodiments 1-5, regarding the photometric system, although whether only the AE sensor is used, only the CMOS sensor 130 is used, or both the AE sensor 133 and the CMOS sensor 130 are used can be selected from the menu screen, the present invention is not limited thereto. For example, only one of the above-mentioned photometric systems may be used at all times, or a selection can be performed among any two of them. Furthermore, a photometric system may be selected from the other photometric systems as well as the above.

In Embodiments 1-5, the supersonic vibration generator 134 is illustrated as a foreign matter removing portion. However, the present invention is not limited thereto, and any means for removing foreign matter mixed in the protective material 138 or the mirror box 130 may be used. For example, the foreign matter removing portion may be realized with means for spraying air. Furthermore, the foreign matter removing portion may be realized with means for removing foreign matter with a brush or the like. Furthermore, the foreign matter removing portion may be realized with means for moving foreign matter using static electricity.

In Embodiments 1-5, the diaphragm ring 242 is illustrated as the diaphragm manipulation portion. However, the present invention is not limited thereto, and manipulation means for driving the power of the diaphragm 240 may be used. Furthermore, the diaphragm manipulation portion may be provided on the camera body 100 side.

In Embodiments 1-5, the menu button 140a is illustrated as the setting manipulation portion. However, the present invention is not limited thereto, and any means for displaying the menu screen on the liquid crystal monitor 150 may be used. For example, the setting manipulation portion may be realized with a slide-type or touch-type switch. Furthermore, the setting manipulation portion may be realized with the remote control receiving portion 155 that receives a control signal from a remote controller. Furthermore, the setting manipulation portion may be realized with a touch screen. Furthermore, the setting manipulation portion may be realized with a microphone that receives a voice. In this case, the user gives an instruction that the menu screen will be displayed with a voice.

In Embodiments 1-5, the power supply switch 142 is illustrated as the power supply manipulation portion. However, the present invention is not limited thereto, and any means for turning on/off the power supply of the camera 10 may be used. For example, the power supply manipulation portion may be realized with a push button or a touch-type switch. Furthermore, the power supply manipulation portion may be realized with the remote control receiving portion 155 that receives a control signal from a remote controller. Furthermore, the power supply manipulation portion may be composed of a touch screen. Furthermore, the power supply manipulation portion may be realized with a microphone that receives a voice. In this case, the user gives an instruction that the power supply is turned on/off with a voice.

In Embodiment 1, in the case where an image is captured using the single focus mode in the live view mode, when the release button 141 is pressed fully before a predetermined time elapses after the release button 141 is pressed halfway, the camera 10 is shifted to an image pickup operation without returning to the live view display operation once. However, the present invention is not limited thereto. For example, irrespective of the lapse of a predetermined time, the camera 10 may return to the live view display operation first after the release button 141 is pressed halfway.

In Embodiments 1-5, although an image file pursuant to the Exif specification is illustrated as the image for recording, the present invention is not limited thereto. For example, the image for recording may be a TIFF (tagged image file format) image file, an RGB signal image file, an image file pursuant to the MPEG (Motion Picture Expert Group) specification, or an image file pursuant to the Motion-JPEG (JPEG: Joint Photographic Expert Group) specification.

[Note 1]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; a diaphragm that adjusts an amount of light of the subject image formed by the image pickup optical system; and a control portion having a live view mode controlling so that the generated image data or the image data obtained by subjecting the generated image data to predetermined processing is displayed on the display portion as a moving image in real time, wherein the control portion controls, in the live view mode, an aperture size of the diaphragm so that lightness of the subject image incident upon the image pickup element is equal to that at a time when an image for recording is captured.

According to the above configuration, the diaphragm is set in the live view in the same way as that at a time when the image for recording is captured. Therefore, the depth of field of the image for recording can be checked easily in the live view display before the image is captured. Thus, the user can obtain a favorite image easily with a simple manipulation.

[Note 2]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; a diaphragm that adjusts an amount of light of the subject image formed by the image pickup optical system; a diaphragm adjustment instruction receiving portion that receives an instruction of a user regarding an adjustment of an aperture size of the diaphragm so that lightness of the subject image incident upon the image pickup element is equal to that at a time when an image for recording is captured; and a control portion having a live view mode controlling so that the generated image data or the image data obtained by subjecting the generated image data to predetermined processing is displayed on the display portion as a moving image in real time, wherein the control portion controls so as to open, in the live view mode, the diaphragm so that the lightness of the subject image incident upon the image pickup element is different from that at a time when the image for recording is captured, and when the diaphragm adjustment instruction receiving portion is manipulated, the control portion controls so as to adjust an aperture size of the diaphragm so that the lightness of the subject image incident upon the image pickup element is equal to that at a time when the image for recording is captured and display a part of the image data to be displayed on the display portion in an enlarged state.

According to the above configuration, with the simple manipulation of manipulating the diaphragm adjustment instruction receiving portion, the depth of field of the image for recording can be checked easily in the live view display before the image is captured, and the depth of field can be checked in detail by enlarging a part of a display image.

[Note 3]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; image processing means that generates an image file including a header portion based on the image data generated by the image pickup element; and a control portion having a live view mode controlling so that the generated image data or the image data obtained by subjecting the generated image data to predetermined processing is displayed on the display portion as a moving image in real time, wherein in a case where the image processing means generates the image file based on the image data generated in the live view mode, the header portion included in the image file to be generated stores information indicating that the image data is generated in the live view mode.

According to the above configuration, by analyzing the header portion of the generated image file, whether the image data included in the image file is generated in the live view mode or in the OVF mode can be grasped easily. The user can grasp the relationship between the quality of an image captured by the user and a finder mode. This can be used for enhancing a photographic technique, and the like.

[Note 4]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; a distance-measuring portion that receives the subject image and obtains information on a distance from the subject to the digital camera in a state where the movable mirror is positioned in the optical path; manual focus means that adjusts the image pickup optical system in accordance with a manipulation of the user to change a focus of the subject image; and a control portion having a live view mode controlling so that the generated image data or the image data obtained by subjecting the generated image data to predetermined processing is displayed on the display portion as a moving image in real time, wherein when the manual focus means is manipulated under a condition that the movable mirror guides the subject image to the optical viewfinder, the control portion controls so as to display measurement results of the distance-measuring portion or information based on the measurement results on the display portion.

According to the above, the user can check if a focus has been adjusted based on the information displayed on the display portion as well as the image during a manual focus manipulation. Therefore, a focus can be adjusted exactly even with the manual focus manipulation.

[Note 5]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; image processing means that performs predetermined image processing with respect to the image data generated by the image pickup element; a recording portion that records the image data processed by the image processing means; and a control portion having a live view mode controlling so that the generated image data or the image data obtained by subjecting the generated image data to predetermined processing is displayed on the display portion as a moving image in real time, wherein the control portion controls so as to stop the live view mode while the image processing is being performed by the image processing means and/or while the image data for recording is being recorded by the recording portion.

According to the above configuration, during the image processing or recording processing, the control portion and the image processing means do not need to take the processing ability for the live view display, so that the image processing and recording processing can be performed rapidly.

[Note 6]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; manual focus means that adjusts the image pickup optical system in accordance with a manipulation of a user to change a focus of the subject image; and a control portion having a live view mode controlling so that the generated image data or the image data obtained by subjecting the generated image data to predetermined processing is displayed on the display portion as a moving image in real time, wherein when the manual focus means is being manipulated under a condition that the movable mirror is not positioned in the optical path of the optical image pickup system, the control portion controls so as to display a contrast value of the image data generated by the image pickup element or information based on the contrast value on the display portion.

According to the above configuration, the user can check whether or not a focus has been adjusted based on the information displayed on the display portion as well as the image during the manual focus manipulation. Therefore, a focus can be adjusted exactly even with the manual focus manipulation.

[Note 7]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; a diaphragm that adjusts an amount of light of the subject image formed by the image pickup optical system; a distance-measuring portion that receives the subject image and obtains information on a distance from the subject to the digital camera in a state where the movable mirror is positioned in the optical path; an autofocus portion that adjusts a focus of the subject image by adjusting the image pickup optical system in accordance with measurement results of the distance-measuring portion; and a control portion that controls so as to start adjusting an aperture value of the diaphragm after the measurement by the distance-measuring portion and before the completion of the adjustment of the focus of the subject image by the autofocus portion.

According to the above configuration, the diaphragm is driven without waiting for the completion of the autofocus operation, so that a time required for setting the diaphragm can be shortened.

[Note 8]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; a distance-measuring portion that receives the subject image and obtains information on a distance from the subject to the digital camera in a state where the movable mirror is positioned in the optical path; an autofocus portion that adjusts a focus of the subject image by adjusting the image pickup optical system in accordance with measurement results of the distance-measuring portion; an AF start instruction receiving portion that receives an instruction of a user regarding activation of the autofocus portion; and a control portion having a live view mode controlling so that the generated image data or the image data obtained by subjecting the generated image data to predetermined processing is displayed on the display portion as a moving image in real time, wherein when the AF start instruction receiving portion receives an instruction regarding start of the autofocus operation in the live view mode, the control portion controls so as to allow the movable mirror to enter the optical path to measure the distance by the distance-measuring portion, and thereafter, allow the movable mirror to retract from the optical path to return the digital camera to the live view mode.

According to the above configuration, operations from the autofocus operation using the distance-measuring portion to the live view display can be performed easily with a simple manipulation of manipulating the AF start instruction receiving portion. Therefore, the user can adjust a composition in the live view display under the condition that the subject is focused with a simple manipulation.

[Note 9]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; a release portion that receives an instruction of a user regarding start of capturing an image for recording by the image pickup element; a distance-measuring portion that receives the subject image and obtains information on a distance from the subject to the digital camera in a state where the movable mirror is positioned in the optical path; an autofocus portion that adjusts a focus of the subject image by adjusting the image pickup optical system in accordance with measurement results of the distance-measuring portion; an AF start instruction receiving portion that receives an instruction of the user regarding activation of the autofocus portion; and a control portion having a live view mode controlling so that the generated image data or the image data obtained by subjecting the generated image data to predetermined processing is displayed on the display portion as a moving image in real time, wherein after allowing the autofocus portion to start an autofocus operation in accordance with a manipulation of the AF start instruction receiving portion, the control portion determines whether to control to shift the digital camera directly to an image pickup operation of an image for recording in accordance with a timing at which the release portion receives the instruction regarding the start of capturing an image, or to control to shift the digital camera to the live view mode once and thereafter, shift the digital camera to the image pickup operation of the image for recording when the release portion receives the instruction regarding the start of capturing an image.

[Note 10]

The digital camera according to Note 9, wherein when the release portion receives the instruction regarding the start of capturing an image within a predetermined time after the control portion allows the autofocus portion to start an autofocus operation in accordance with the manipulation of the AF start instruction receiving portion, the control portion controls so as to shift the digital camera directly to the image pickup operation of the image for recording, and when the release portion does not receive the instruction regarding the start of capturing an image within the predetermined time, the control portion controls so as to shift the digital camera to the live view mode once, and thereafter, shift the digital camera to the image pickup operation of the image for recording when the release portion receives the instruction regarding the state of capturing an image.

According to the above configuration, when the release portion is manipulated immediately after the AF start instruction receiving portion is manipulated, image pickup is started without performing a live view display, so that a time from the manipulation of the AF start instruction receiving portion to the start of capturing an image can be shortened. This is because the movable mirror is not moved up/down unnecessarily. Therefore, the use can capture a favorite image without letting a shutter timing slip away. On the other hand, when the user desires to change a composition while watching the display portion after determining a focus state, the digital camera may wait for the elapse of a predetermined time after operating the AF start instruction receiving portion.

[Note 11]

The digital camera according to Note 9, wherein when the release portion receives the instruction regarding the start of capturing an image before the autofocus operation is completed after the control portion allows the autofocus portion to start the autofocus operation in accordance with the manipulation of the AF start instruction receiving portion, the control portion controls so as to shift the digital camera directly to the image pickup operation of the image for recording, and when the release portion does not receive the instruction regarding the start of capturing an image before the autofocus operation is completed, the control portion controls so as to shift the digital camera to the live view mode first, and thereafter, shift the digital camera to the image pickup operation of the image for recording when the release portion receives the instruction regarding the state of capturing an image.

[Note 12]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; a distance-measuring portion that receives the subject image and obtains information on a distance from the subject to the digital camera in a state where the movable mirror is positioned in the optical path; an autofocus portion that adjusts a focus of the subject image by adjusting the image pickup optical system in accordance with measurement results of the distance-measuring portion; and a control portion having a live view mode controlling so that the generated image data or the image data obtained by subjecting the generated image data to predetermined processing is displayed on the display portion as a moving image in real time, wherein the control portion controls so as to vary a method for displaying an image on the display portion or a method for not displaying an image on the display portion between a case where the control portion allows the movable mirror to enter the optical path so as to allow the autofocus portion to perform an autofocus operation and a case where the control portion allows the moveable mirror to enter the optical path so as to prepare for capturing an image for recording by the image pickup element.

According to the above configuration, a display on the display portion is varied, so that it is easy to recognize whether the digital camera is in an autofocus operation or an image pickup operation. Therefore, the problem that the user is likely to confuse both the operations can be solved. The reason why the user is likely to confuse both the operations is that patterns of sounds generated from the movable mirror in both the operations are similar to each other (the movable mirror is moved down/up during both the autofocus operation and the image pickup operation).

[Note 13]

The digital camera according to Note 12 further includes storage means that stores the image data generated by the image pickup element or image data obtained by subjecting the generated image data to predetermined processing, wherein when the control portion allows the movable mirror to enter the optical path so as to allow the autofocus portion to perform an autofocus operation, the control portion controls so that the image data stored in the storage means or the image data obtained by subjecting the image data stored in the storage means to predetermined processing is displayed on the display portion, and when the control portion allows the movable mirror to enter the optical path for preparing for capturing an image for recording by the image pickup element, the control portion controls so that the image data stored in the storage means or the image data obtained by subjecting the image data stored in the storage means to predetermined processing is not displayed on the display portion According to the above, it becomes easy to recognize whether or not the digital camera is in an autofocus operation or an image pickup operation more clearly.

[Note 14]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; a distance-measuring portion that receives the subject image and obtains information on a distance from the subject to the digital camera in a state where the movable mirror is positioned in the optical path; an autofocus portion that adjusts a focus of the subject image by adjusting the image pickup optical system using measurement results of the distance-measuring portion, or contrast of the image data generated by the image pickup element or image data obtained by subjecting the image data generated by the image pickup element to predetermined processing; and a control portion having a live view mode controlling so that the generated image data or the image data obtained by subjecting the generated image data to predetermined processing is displayed on the display portion as a moving image in real time, wherein when the movable mirror is not positioned in the optical path, the control portion controls the autofocus portion so that an autofocus operation is performed using contrast, and when the movable mirror is positioned in the optical path, the control portion controls the autofocus portion so that an autofocus operation is performed using the measurement results of the distance-measuring portion.

According to the above, an autofocus operation can be performed both when the movable mirror is not positioned in the optical path and the movable mirror is positioned in the optical path.

[Note 15]

The digital camera according to Note 14, wherein when the control portion controls the autofocus portion so that an autofocus operation is performed continuously using contrast, when the digital camera is shifted to the image pickup operation of the image for recording in the image pickup element, the control portion controls so that the movable mirror is positioned in the optical path, and the autofocus operation is performed using the measurement results of the distance-measuring portion, before being shifted to the image pickup operation.

According to the above configuration, before the release portion receives an instruction regarding the start of capturing an image, autofocus based on the image data generated by the image pickup element is performed, whereby a live view can be displayed on the display portion continuously while the continuous focus operation is being performed. On the other hand, when the release portion receives the instruction regarding the start of capturing an image, an autofocus operation based on the measurement results of the distance-measuring portion is performed, so that focus can be adjusted more exactly immediately before image pickup. In particular, in the case of capturing a subject moving fast, a time from the last autofocus operation to the image pickup operation can be shortened, so that focus is likely to be adjusted.

[Note 16]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; a distance-measuring portion that receives the subject image and obtains information on a distance from the subject to the digital camera in a state where the movable mirror is positioned in the optical path; an autofocus portion that adjusts a focus of the subject image by adjusting the image pickup optical system using measurement results of the distance-measuring portion; a control portion having a live view mode controlling so that the generated image data or the image data obtained by subjecting the generated image data to the predetermined processing is displayed on the display portion as a moving image in real time; and a setting portion that sets the control portion to be in the live view mode, wherein the control portion controls so as to shift the digital camera to the live view mode after controlling the autofocus portion first so that the autofocus operation is performed, in accordance with setting of the live view mode by the setting portion.

According to the above configuration, the autofocus operation is performed at a time of switch to the live view mode, so that the observation of a subject image can be started using the display portion under a condition that the subject is focused immediately after the start of a live view. Therefore, a time required from the switch to the live view to the setting of a composition can be shortened, so that the operability is satisfactory for the user.

[Note 17]

The digital camera according to Note 16, wherein after the measurement in the distance-measuring portion is performed in accordance with the setting of the live view mode by the setting portion, the control portion controls so as to shift the digital camera to the live view mode, and controls so that at least a part of the autofocus operation by the autofocus portion is performed in parallel with the live view mode.

According to the above configuration, before the autofocus operation is completed, the digital camera can be shifted to the live view mode, so that a time from the setting by the setting portion to the shift to the live view mode can be shortened. Therefore, the operability becomes satisfactory for the user.

[Note 18]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; an autofocus portion that adjusts a focus of the subject image by adjusting the image pickup optical system, using contrast of the image data generated by the image pickup element or image data obtained by subjecting the image data generated by the image pickup element to predetermined processing; a control portion having a live view mode controlling so that the generated image data or the image data obtained by subjecting the generated image data to predetermined processing is displayed on the display portion as a moving image in real time; and a setting portion that sets the control portion to be in the live view mode, wherein the control portion controls so that the autofocus portion performs an autofocus operation once in accordance with the setting of the live view mode by the setting portion, and thereafter, controls so that the digital camera is shifted to the live view mode.

[Note 19]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; a distance-measuring portion that receives the subject image and obtains information on a distance from the subject to the digital camera in a state where the movable mirror is positioned in the optical path; an autofocus portion that adjusts a focus of the subject image by adjusting the image pickup optical system in accordance with measurement results of the distance-measuring portion: and a control portion having a live view mode controlling so that the generated image data or the image data obtained by subjecting the generated image data to the predetermined processing is displayed on the display portion as a moving image in real time; wherein when the movable mirror is positioned in the optical path, the control portion controls so that a point focused in the autofocus portion is displayed on the display portion.

According to the above configuration, in a case where the autofocus operation is performed when the movable mirror is positioned in the optical path, the focused point is displayed on a screen of the display portion. Therefore, even when a live view display is not performed on the display portion, which subject is focused can be grasped.

[Note 20]

The digital camera according to claim 19 further includes storage means that stores the image data generated by the image pickup element or image data obtained by subjecting the generated image data to predetermined processing, wherein when the movable mirror is positioned in the optical path, the control portion controls so that the image data stored in the storage means or the image data obtained by subjecting the image data stored in the storage means to predetermined processing is displayed on the display portion, and the point focused in the autofocus portion is displayed on the display portion.

According to the above configuration, which subject is focused can be grasped more easily.

[Note 21]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; a foreign matter removing portion that removes foreign matter present in the optical path of the image pickup optical system; and a control portion having a live view mode controlling so that the generated image data or the image data obtained by subjecting the generated image data to predetermined processing is displayed on the display portion as a moving image in real time; wherein when the control portion determines whether or not foreign matter is present in the optical path of the image pickup optical system based on the image data generated in the live view mode or image data obtained by subjecting the image data generated in the live view mode to predetermined processing, and controls so that the foreign matter removing portion is activated when the control portion determines that foreign matter is present.

According to the above, foreign matter in the optical path can be removed easily with a simple manipulation.

[Note 22]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; a photometric portion that measures an amount of light from the subject when the movable mirror is positioned in the optical path of the image pickup optical system; an illumination portion that illuminates the subject with light; a diaphragm that adjusts an amount of light of the subject image formed by the image pickup optical system; and a control portion having a live view mode controlling so that the generated image data or the image data obtained by subjecting the generated image data to predetermined processing is displayed on the display portion as a moving image in real time; wherein after the amount of light from the subject is obtained based on the image data generated by the image pickup element, the control portion controls so as to allow the movable mirror to enter the optical path of the image pickup optical system, allow the illumination portion to flash light, and obtain measurement results of the photometric portion.

As described above, stationary light is measured with the image pickup element, while pre-flash is measured with the photometric portion. Therefore, stationary light is measured immediately after the full depression, while the pre-flash can be measured more exactly.

[Note 23]

The digital camera according to Note 22, wherein the control portion sets an aperture value of the diaphragm and/or an exposure time of the image pickup element, based on the amount of light from the subject obtained based on the image data generated by the image pickup element and the measurement results of the photometric portion.

[Note 24]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; a shock detecting portion that detects shock applied to the digital camera; and a control portion having a live view mode controlling so that the generated image data or the image data obtained by subjecting the generated image data to predetermined processing is displayed on the display portion as a moving image in real time, wherein the control portion controls so that, in a case where a live view mode is set, the digital camera comes out of the live view mode first and is shifted to the live view mode again, in accordance with detection results of the shock detecting portion.

As described above, the live view mode is reset as a result of the detection of shock, so that the digital camera can be recovered automatically from a state where a live view display is interrupted by the shock. This can prevent the user from misunderstanding that the digital camera is out of order. Furthermore, when the live view display is interrupted, it is not necessary to perform a manipulation of recovering the live view display manually, so that the operability is satisfactory.

[Note 25]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; a diaphragm that adjusts an amount of light of the subject image formed by the image pickup optical system; a diaphragm adjustment instruction receiving portion that receives an instruction of a user regarding adjustment of an aperture size of the diaphragm so that lightness of the subject image incident upon the image pickup element is equal to that at a time when an image for recording is captured; and a control portion having a live view mode controlling so that the generated image data or image data obtained by subjecting the generated image data to predetermined processing is displayed on the display portion as a moving image in real time, wherein when the diaphragm adjustment instruction receiving portion is manipulated when the movable mirror guides the subject image to the optical view finder, the control portion controls so as to adjust the aperture size of the diaphragm so that the lightness of the subject image incident upon the image pickup element is equal to that at a time when the image for recording is captured and to shift the digital camera to the live view mode.

According to the above configuration, the digital camera is shifted to the live view mode even during the OVF operation, and the depth of field of the image for recording can be checked easily in a live view display before the image is captured, with a simple manipulation of manipulating the diaphragm adjustment instruction receiving portion.

[Note 26]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; a receiving portion that receives a control signal from a remote controller; and a control portion having a live view mode controlling so that the generated image data or the image data obtained by subjecting the generated image data to predetermined processing is displayed on the display portion as a moving image in real time, wherein when the receiving portion receives the control signal from the remote controller, the control portion controls so as to shift the digital camera to the live view mode.

According to the above configuration, when a signal giving an instruction regarding the autofocus operation, an image pickup start signal, a self-timer setting signal, or the like is received from the remote controller, the digital camera is shifted to the live view mode automatically. When an image is captured with the remote controller, the image is captured under the condition that the digital camera is away from the hand (e.g., under the condition that the digital camera is fixed to a tripod, the digital camera is left on a desk, etc.) in many cases. In such a case, an image is likely to be grasped if the image is captured with an electronic viewfinder having a large screen, compared with the case where the image is captured with the optical viewfinder. In the case of receiving a signal from the remote controller, the digital camera is shifted to the live view mode automatically as described above, whereby the time and labor for switching to the live view mode manually are saved, which enhances the operability.

[Note 27]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; a tripod fixing portion that fixes the digital camera to a tripod; and a control portion having a live view mode controlling so that the generated image data or the image data obtained by subjecting the generated image data to predetermined processing is displayed on the display portion as a moving image in real time, wherein when the digital camera is fixed to the tripod by the tripod fixing portion, the control portion controls so as to shift the digital camera to the live view mode.

According to the above configuration, in the case where the digital camera is fixed to the tripod, the digital camera is shifted to the live view mode automatically. When an image is captured under the condition that the digital camera is fixed to the tripod, an image is likely to be grasped if the image is captured with an electronic viewfinder having a large screen, compared with the case where the image is captured with the optical viewfinder. When the digital camera is fixed to the tripod, the digital camera is shifted to the live view mode automatically as described above, whereby the time and labor for switching to the live view mode manually are saved, which enhances the operability.

[Note 28]

The digital camera according to Note 27 further includes a distance-measuring portion that receives the subject image and obtains information on a distance from the subject to the digital camera in a state where the movable mirror is positioned in the optical path, and an autofocus portion that adjusts a focus of the subject image by adjusting the image pickup optical system in accordance with measurement results of the distance-measuring portion, wherein when the digital camera is fixed to the tripod by the tripod fixing portion, the control portion controls the autofocus portion first so that an autofocus operation is performed immediately after the digital camera is fixed to the tripod or after a predetermined time elapses from the time when the digital camera is fixed to the tripod, and thereafter, the control portion controls so that the digital camera is shifted to the live view mode.

[Note 29]

The digital camera according to Note 28 further includes a setting portion that sets the control portion in a live view mode, wherein when the digital camera is fixed to the tripod by the tripod fixing portion, the control portion controls the autofocus portion so that the autofocus operation is performed once, and thereafter, controls so that the digital camera is shifted to the live view mode, in accordance with the setting of the live view mode by the setting portion.

[Note 30]

The digital camera according to Note 27 further includes an autofocus portion that adjusts a focus of the subject image by adjusting the image pickup optical system, using contrast of the image data generated by the image pickup element or image data obtained by subjecting the image data generated by the image pickup element to predetermined processing, wherein when the digital camera is fixed to the tripod by the tripod fixing portion, the control portion controls the autofocus portion so that the autofocus operation is operated immediately after the digital camera is fixed to the tripod by the tripod fixing portion or after a predetermined time elapses from the time when the digital camera is fixed to the tripod.

[Note 31]

The digital camera according to Note 30 further includes a setting portion that sets the control portion in the live view mode, wherein when the digital camera is fixed to the tripod by the tripod fixing portion, the control portion controls so as to shift the digital camera to the live view mode and controls the autofocus portion so that the autofocus operation is performed, in accordance with the setting of the live view mode by the setting portion.

[Note 32]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; a shaking detecting portion that detects shaking of the digital camera; and a control portion having a live view mode controlling so that the generated image data or the image data obtained by subjecting the generated image data to predetermined processing is displayed on the display portion as a moving image in real time, wherein the control portion controls so as to shift the digital camera to the live view mode in accordance with detection results of the shaking detecting portion.

[Note 33]

The digital camera according to Note 32 further includes a distance-measuring portion that receives the subject image and obtains information on a distance from the subject to the digital camera in a state where the movable mirror is positioned in the optical path, and an autofocus portion that adjusts a focus of the subject image by adjusting the image pickup optical system in accordance with measurement results of the distance-measuring portion, wherein the control portion controls so as to shift the digital camera to the live view mode after controlling the autofocus portion so that the autofocus operation is performed first in accordance with the detection results of the shaking detecting portion.

[Note 34]

The digital camera according to Note 33 further includes a setting portion that sets the control portion in the live view mode, wherein the control portion controls so as to shift the digital camera to the live view mode after controlling the autofocus portion so that the autofocus operation is performed first in accordance with the detection results of the shaking detecting portion and the setting of the live view mode by the setting portion.

[Note 35]

The digital camera according to Note 32 further includes an autofocus portion that adjusts a focus of the subject image by adjusting the image pickup optical system, using contrast of the image data generated by the image pickup element or image data obtained by subjecting the image data generated by the image pickup element to predetermined processing, wherein the control portion controls the autofocus portion so that the autofocus operation is performed, in accordance with the detection results of the shaking detecting portion.

[Note 36]

The digital camera according to Note 35 further includes a setting portion that sets the control portion in the live view mode, wherein the control portion controls so as to shift the digital camera to the live view mode and controls the autofocus portion so that the autofocus operation is performed, in accordance with the detection results of the shaking detecting portion and the setting of the live view mode by the setting portion.

[Note 37]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing, and that is held rotatably by the digital camera; and a control portion having a live view mode controlling so that the generated image data or the image data obtained by subjecting the generated image data to predetermined processing is displayed on the display portion as a moving image in real time, wherein the control portion controls so as to shift the digital camera to the live view mode when the display portion is rotated.

According to the above configuration, in the case where the display portion is rotated, the digital camera is shifted to the live view mode automatically. In the case where the display portion is rotated, the user is intended to capture an image using the display portion (electronic viewfinder) in many cases. The digital camera is shifted to the live view mode automatically in the case where the display portion is rotated, whereby time and labor for switching to the live mode manually are saved, which enhances the operability.

[Note 38]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; an output terminal used to output the generated image data or image data obtained by subjecting the generated image data to predetermined processing to an external apparatus; and a control portion that controls in such a manner that, when a terminal from the external apparatus is connected to the output terminal, the movable mirror is not positioned in the optical path of the image pickup optical system, the image pickup element captures the subject image formed by the image pickup optical system to generate image data, and the generated image data or image data obtained by subjecting the generated image data to predetermined processing are output to the external apparatus via the output terminal.

According to the above configuration, when the terminal from the external apparatus is connected to the digital camera, the image data generated by the image pickup element can be output to the external apparatus automatically. In the case where the terminal from the external apparatus is connected to the digital camera, the user attempts to display an image that is being captured in real time on the external apparatus in many cases. In the case where the terminal from the external apparatus is connected to the digital camera, the digital camera is shifted to the live view mode automatically, whereby time and labor for switching to the live mode manually are saved, which enhances the operability.

[Note 39]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that is capable of displaying the generated image data or image data obtained by subjecting the generated image data to predetermined processing by selecting an aspect ratio from a plurality of aspect ratios including an aspect ratio of the optical viewfinder; and a control portion having a live view mode controlling so that the generated image data or the image data obtained by subjecting the generated image data to predetermined processing is displayed on the display portion as a moving image in real time, wherein when the display aspect ratio is set to be an aspect ratio other than the aspect ratio of the optical viewfinder, the control portion controls so as to shift the digital camera to the live view mode.

Since the aspect ratio of the optical viewfinder is set in a fixed manner, an entire image having a composition other than the set aspect ratio may not be displayed, and even if the image can be displayed, it may be too small to see. Thus, an image having a composition other than the aspect ratio of the optical viewfinder can be observed more easily with the electronic viewfinder. In the case where the display aspect ratio is set to be the one other than the aspect ratio of the optical viewfinder, the digital camera is shifted to the live view mode automatically, whereby time and labor for switching to the live mode manually are saved, which enhances the operability.

[Note 40]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; a diaphragm that adjusts an amount of light of the subject image formed by the image pickup optical system; a diaphragm manipulation portion that changes an aperture size of the diaphragm in accordance with a manipulation of a user; and a control portion having a live view mode controlling so that the generated image data or the image data obtained by subjecting the generated image data to predetermined processing is displayed on the display portion as a moving image in real time, wherein when the diaphragm manipulation portion is manipulated, the control portion controls so as to shift the digital camera to the live view mode and display a part of the generated image data or image data obtained by subjecting the generated image data to predetermined processing on the display portion in an enlarged state.

According to the above configuration, the digital camera can be shifted to the live view mode even during the OVF operation in accordance with the manipulation of the diaphragm manipulation portion. This saves the time and labor for switching to the live view mode manually to enhance the operability. Furthermore, since a place where the depth of field is required to be checked can be enlarged instantaneously, so that the depth of field can be checked easily.

[Note 41]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a setting manipulation portion that receives an instruction of a user regarding display of setting information on the digital camera; a display portion that displays the generated image data or image data obtained by subjecting the generated image data to predetermined processing, and displays the setting information on the digital camera in accordance with a manipulation of the setting manipulation portion; and a control portion having a live view mode controlling so that the generated image data or the image data obtained by subjecting the generated image data to predetermined processing is displayed on the display portion as a moving image in real time, wherein when the live view mode is set, the control portion controls so that the digital camera comes out of the live view mode and the setting information on the digital camera is displayed on the display portion, in accordance with the manipulation of the setting manipulation portion.

When the setting information display screen is displayed so as to overlap the live view screen, the live view screen is difficult to see. In such a case, it is convenient to display both the screens separately so that the setting information display screen is observed by the display portion, and the live view screen is observed through the optical viewfinder. However, in such a case, both the manipulation of the setting portion and the manual switching to the optical viewfinder mode are required, which is inconvenient. In accordance with the manipulation of the setting manipulation portion, the digital camera comes out of the live view mode, and the setting information on the digital camera is displayed on the display portion, whereby the operability is enhanced.

[Note 42]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; a control portion having a live view mode controlling so that the generated image data or the image data obtained by subjecting the generated image data to predetermined processing is displayed on the display portion as a moving image in real time; and a power supply manipulation portion that turns on/off a power supply of the digital camera, wherein when the power supply manipulation portion is manipulated in a direction of turning off the power supply of the digital camera under a condition that the live view mode is set, the control portion controls so that the digital camera comes out of the live view mode, and the movable mirror is positioned in the optical path of the image pickup optical system.

According to the above configuration, the digital camera is shifted to the OVF mode before the power supply is turned off, thereby moving down the movable mirror. Therefore, even when the power supply is turned off after that, the subject image can be observed through the optical viewfinder. Furthermore, it is not necessary to switch to the OVF mode manually, which enhances the operability.

[Note 43]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a battery cover that opens/closes a battery accommodating portion accommodating a battery; a display portion that displays the generated image data or image data obtained by subjecting the generated image data to predetermined processing; and a control portion having a live view mode controlling so that the generated image data or the image data obtained by subjecting the generated image data to predetermined processing is displayed on the display portion as a moving image in real time; wherein when the battery cover is opened when the live view mode is set, the control portion controls so that the digital camera comes out of the live view mode, and the movable mirror is positioned in the optical path of the image pickup optical system.

According to the above configuration, the digital camera is shifted to the OVF mode before the battery is pulled out, whereby the movable mirror is moved down. Therefore, even when the power supply is turned off after that, the subject image can be observed through the optical viewfinder. Furthermore, it is not necessary to switch to the OVF mode manually, which enhances the operability.

[Note 44]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; a control portion having a live view mode controlling so that the generated image data or the image data obtained by subjecting the generated image data to predetermined processing is displayed on the display portion as a moving image in real time; and a battery accommodating portion accommodating a battery, wherein when a voltage of the battery accommodated in the battery accommodating portion decreases under a condition that the live view mode is set, the control portion controls so that the digital camera comes out of the live view mode, and the movable mirror is positioned in the optical path of the image pickup optical system.

According to the above configuration, the movable mirror can be moved down before the power supply is turned off due to the decrease in the voltage of the battery. Therefore, even when the power supply is turned off after that, the subject image can be observed through the optical viewfinder. Furthermore, it is not necessary to switch to the OVF mode manually, which enhances the operability.

[Note 45]

A digital camera to which an interchangeable lens included in an image pickup optical system is attachable/detachable, having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; and a control portion having a live view mode controlling so that the generated image data or the image data obtained by subjecting the generated image data to predetermined processing is displayed on the display portion as a moving image in real time, wherein when the attached interchangeable lens is removed when the live view mode is set, the control portion controls so that the digital camera comes out of the live view mode, and the movable mirror is positioned in the optical path of the image pickup optical system.

When the interchangeable lens is removed in the live view mode, the image pickup element is exposed, and dust and the like are likely to adhere to the image pickup element. Therefore, it is necessary to shift the digital camera from the live view mode to the OVF mode before removing the interchangeable lens; however, time and labor are needed for switching to the OVF mode manually. When the attached interchangeable lens is removed when the live view mode is set, the digital camera comes out of the live view mode, and the movable mirror is positioned in the optical path of the image pickup optical system, as described above. Consequently, the movable mirror can be moved down automatically when the interchangeable lens is removed, so that the operability becomes satisfactory. Furthermore, the movable mirror can be moved down exactly even without a manipulation of moving down the movable mirror when the user removes the interchangeable lens. Therefore, dust and the like become unlikely to adhere to the movable mirror.

[Note 46]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; storage means that stores image data generated by the image pickup element or image data obtained by subjecting the image data generated by the image pickup element to predetermined processing; an output terminal used to output the image data stored in the storage means to an external apparatus: and a control portion controls so that, when a terminal from the external apparatus is connected to the output terminal when the image data generated by the image pickup element or image data obtained by subjecting the image data generated by the image pickup element to predetermined processing is displayed as a moving image in real time, the movable mirror is positioned in the optical path of the image pickup optical system, and the image data stored in the storage means is output to the external apparatus via the output terminal.

When the terminal from the external apparatus is connected to the digital camera, the user attempts to display the image data stored in the digital camera or in a memory card attached to the digital camera on the external apparatus in many cases. In such a case, if a live view display is performed on the display portion while the image data is being sent to the external apparatus, the burden on the control portion becomes large. Therefore, in the case of sending the image data to the external apparatus, it is preferable that the digital camera comes out of the live view mode. However, time and labor are needed for allowing the digital camera to come out of the live view mode manually when the digital camera is connected to the external apparatus. Thus, as described above, when the terminal from the external apparatus is connected to the output terminal, the control portion controls so that the movable mirror is positioned in the optical path of the image pickup optical system, and the image data stored in the storage means is output to the external apparatus via the output terminal. Consequently, the digital camera can comes out of the live view mode automatically when the digital camera is connected to the external apparatus, so that the operability is satisfactory. Furthermore, since the digital camera is positioned in the OVF mode simultaneously, it also is possible to observe a real-time image through the optical viewfinder.

[Note 47]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; a display portion that displays the generated image data or image data obtained by subjecting the generated image data to predetermined processing; a distance-measuring portion that receives the subject image and obtains information on a distance from the subject to the digital camera in a state where the movable mirror is positioned in the optical path; an autofocus portion that adjusts a focus of the subject image by adjusting the image pickup optical system in accordance with measurement results of the distance-measuring portion; an AF start instruction receiving portion that receives an indication of a user regarding activation of the autofocus portion; and a control portion having a live view mode controlling so that the generated image data or image data obtained by subjecting the generated image data to predetermined processing is displayed on the display portion as a moving image in real time and a continuous focus mode updating a focus state of the subject image continuously by the autofocus portion when the AF start instruction receiving portion receives an instruction, wherein the control portion is capable of controlling the autofocus portion in the continuous focus mode when the movable mirror guides the subject image to the optical viewfinder, and does not control the autofocus portion in the continuous focus mode in the live view mode.

Consequently, the autofocus operation including the continuous autofocus operation can be realized only with the autofocus operation using the distance-measuring portion.

[Note 48]

A digital camera having a movable mirror provided so as to enter or retract with respect to an optical path of an image pickup optical system for purpose of guiding a subject image to an optical viewfinder includes: an image pickup element that captures the subject image formed by the image pickup optical system to generate image data; storage means that stores the generated image data or image data obtained by subjecting the generated image data to predetermined processing; a display portion that displays the generated image data or image data obtained by subjecting the generated image data to predetermined processing; and a control portion having a live view mode controlling so that the generated image data or image data obtained by subjecting the generated image data to predetermined processing is displayed on the display portion as a moving image in real time, wherein the control portion controls so as to generate a plurality of images reduced in size based on the image data stored in the storage means, subject the plurality of images reduced in size to image processings different from each other, and arrange and display the plurality of images reduced in size on the display portion as a moving image.

Since the plurality of images reduced in size are displayed as a live view screen, the respective images reduced in size can be compared with each other easily. In particular, by electronically realizing the difference in image pickup conditions, an image obtained by capturing an image for recording can be grasped easily.

The present invention is applicable to a digital camera that includes a movable mirror and enables a subject image to be observed through an electronic viewfinder. For example, the present invention is applicable to a single-lens reflex camera and the like. The present invention also is applicable to a camera capable of capturing a moving image as well as a camera for capturing a still image.

What is claimed is:

1. A digital camera having a movable mirror provided so as to enter or retract with respect to an optical path of an image pickup optical system for purpose of guiding a subject image to an optical viewfinder, the digital camera comprising:
   an image pickup element that captures the subject image formed by the image pickup optical system to generate image data;
   a power manipulation portion that enables a user to turn a power supply of the digital camera to an OFF state;
   a display portion that displays the image data generated by the image pickup element or image data obtained by subjecting the image data generated by the image pickup element to predetermined processing; and
   a control portion having a live view mode controlling so that the image data generated by the image pickup element or the image data obtained by subjecting the image data generated by the image pickup element to predetermined processing is displayed on the display portion as a moving image in real time;
   wherein when the user manipulates the power manipulation portion for turning the power supply of the digital camera to the OFF state when the live view mode is set, the control portion controls so that the digital camera comes out of the live view mode and the movable mirror enters the optical path of the image pickup optical system.

2. A digital camera having a movable mirror provided so as to enter or retract with respect to an optical path of an image pickup optical system for purpose of guiding a subject image to an optical viewfinder, the digital camera comprising:
   an image pickup element that captures the subject image formed by the image pickup optical system to generate image data;
   a sleep detection portion operable to detect that the digital camera has not been manipulated by a user for a predetermined period of time;
   a display portion that displays the image data generated by the image pickup element or image data obtained by subjecting the image data generated by the image pickup element to predetermined processing; and
   a control portion having a live view mode controlling so that the image data generated by the image pickup element or the image data obtained by subjecting the image data generated by the image pickup element to predetermined processing is displayed on the display portion as a moving image in real time;

wherein when the sleep detection portion detects that the digital camera has not been manipulated by the user for the predetermined period of time when the live view mode is set, the control portion controls so that the digital camera comes out of the live view mode and the movable mirror enters the optical path of the image pickup optical system.

3. A digital camera having a movable mirror provided so as to enter or retract with respect to an optical path of an image pickup optical system for purpose of guiding a subject image to an optical viewfinder, the digital camera comprising:

an image pickup element that captures the subject image formed by the image pickup optical system to generate image data;

a voltage detection portion operable to detect that a battery voltage of the digital camera is lower than a predetermined value;

a display portion that displays the image data generated by the image pickup element or image data obtained by subjecting the image data generated by the image pickup element to predetermined processing; and a control portion having a live view mode controlling so that the image data generated by the image pickup element or the image data obtained by subjecting the image data generated by the image pickup element to predetermined processing is displayed on the display portion as a moving image in real time;

wherein when the voltage detection portion detects that the battery voltage is lower than the predetermined value when the live view mode is set, the control portion controls so that the digital camera comes out of the live view mode and the movable mirror enters the optical path of the image pickup optical system.

* * * * *

UNITED STATES PATENT AND TRADEMARK OFFICE
CERTIFICATE OF CORRECTION

PATENT NO. : 7,782,394 B2 Page 1 of 1
APPLICATION NO. : 12/540543
DATED : August 24, 2010
INVENTOR(S) : Ueda et al.

It is certified that error appears in the above-identified patent and that said Letters Patent is hereby corrected as shown below:

On Page 2 of the Title page of the patent,

Item (56) References Cited - U.S. PATENT DOCUMENTS

"2006/0035652 A1  2/2006  Kim et al." should read -- 2003/0035652  A1  2/2003  Kubo et al. --

Signed and Sealed this
Eighth Day of March, 2011

David J. Kappos
*Director of the United States Patent and Trademark Office*